United States Patent [19]
Lee et al.

[11] Patent Number: 5,933,535
[45] Date of Patent: Aug. 3, 1999

[54] OBJECT-BASED VIDEO COMPRESSION PROCESS EMPLOYING ARBITRARILY-SHAPED FEATURES

[75] Inventors: Ming-Chieh Lee, Bellevue; William Chambers Powell, III, Seattle, both of Wash.

[73] Assignee: Microsoft Corporation, Redmond, Wash.

[21] Appl. No.: 08/657,272

[22] Filed: Jun. 4, 1996

Related U.S. Application Data

[60] Provisional application No. 60/005,031, Oct. 5, 1995.

[51] Int. Cl.$^6$ ................................. G06K 9/36; G06K 9/46
[52] U.S. Cl. ........................... 382/243; 348/407; 348/699; 345/436
[58] Field of Search ..................................... 382/236, 239, 382/243, 241, 107; 348/407, 699, 700, 413, 416, 431; 345/436, 474

[56] References Cited

U.S. PATENT DOCUMENTS

| | | | |
|---|---|---|---|
| 3,873,972 | 3/1975 | Levine | 340/146.3 AC |
| 4,307,377 | 12/1981 | Pferd et al. | 382/242 |

(List continued on next page.)

FOREIGN PATENT DOCUMENTS

| | | | |
|---|---|---|---|
| 395 293 A2 | 10/1990 | European Pat. Off. | H04N 7/137 |
| 474 307 A2 A3 | 3/1992 | European Pat. Off. | G06F 15/70 |
| 497 586 A2 | 8/1992 | European Pat. Off. | G06F 15/70 |
| 614 318 A3 | 3/1994 | European Pat. Off. | H04N 7/13 |
| 0614318A2 | 9/1994 | European Pat. Off. | H04N 7/13 |
| 614 318 A2 A3 | 9/1994 | European Pat. Off. | H04N 7/13 |
| 625 853 A2 A3 | 11/1994 | European Pat. Off. | H04N 7/13 |
| WO 91/11782 | 8/1991 | WIPO | G06K 9/36 |
| PCT/US96/ 15892 | 2/1997 | WIPO | 348/409 |
| PCT/US96/ 15892 | 4/1997 | WIPO | 348/409 |
| PCT/US97/ 04662 | 6/1997 | WIPO | 382/243 |

OTHER PUBLICATIONS

Strang, Linear Algebra and its Applications, 1988, pp. 145, 159–162, and 442–451, Third Edition.

Chang et al., Transform Coding of Arbitrarily–Shaped Image Segments, Aug. 1993, pp. 83–90.

John Y.A. Wang and Edward H. Adelson, "Representing Moving Images With Layers," IEEE, Transactions on Image Processing, vol. 3, No. 5, Sep. 1994, pp. 625–637.

Didler LaCall, "MPEG: A Video Compression Standard for Multimedia Applications," Communications of the ACM, Apr. 1991, vol. 34, No. 4, pp. 47–58.

Lee et al., A Layered Video Object Coding System Using Sprite and Affine Motion Model, IEEE Transactions on Circuits and Systems for Video Technology, vol. 7, No. 1, Feb. 1997, pp. 130–145.

(List continued on next page.)

*Primary Examiner*—Amelia Au
*Assistant Examiner*—Timothy M. Johnson
*Attorney, Agent, or Firm*—Klarquist Sparkman Campbell Leigh & Whinston LLP

[57] ABSTRACT

Video encoding and decoding processes provide compression and decompression of digitized video signals representing display motion in video sequences of multiple image frames. The encoder process utilizes object- or feature-based video compression to improve the accuracy and versatility of encoding interframe motion and intraframe image features. Video information is compressed relative to objects or features of arbitrary configurations, rather than fixed, regular arrays of pixels as in conventional video compression methods. This reduces the error components and thereby improves the compression efficiency and accuracy. The decoder process decompresses the encoded video information to reconstruct the objects or features of arbitrary configurations.

8 Claims, 30 Drawing Sheets

U.S. PATENT DOCUMENTS

| | | | |
|---|---|---|---|
| 4,630,306 | 12/1986 | West et al. | 382/197 |
| 4,729,020 | 3/1988 | Schaphorst et al. | 348/419 |
| 4,745,633 | 5/1988 | Waksman et al. | 382/56 |
| 4,751,742 | 6/1988 | Meeker | 382/240 |
| 4,754,492 | 6/1988 | Malvar | 382/41 |
| 4,783,833 | 11/1988 | Kawabata et al. | 382/107 |
| 4,802,005 | 1/1989 | Kondo | 358/135 |
| 4,833,721 | 5/1989 | Okutomi et al. | 382/197 |
| 4,905,295 | 2/1990 | Sato | 382/197 |
| 4,912,549 | 3/1990 | Altman et al. | 358/17 |
| 4,961,231 | 10/1990 | Nakayama et al. | 382/197 |
| 4,999,705 | 3/1991 | Puri | 358/136 |
| 5,020,121 | 5/1991 | Rosenberg | 382/56 |
| 5,031,225 | 7/1991 | Tachikawa et al. | 382/185 |
| 5,034,986 | 7/1991 | Karmann et al. | 382/103 |
| 5,067,014 | 11/1991 | Bergen | 382/107 |
| 5,070,465 | 12/1991 | Kato et al. | 395/141 |
| 5,073,955 | 12/1991 | Evers | 382/197 |
| 5,086,477 | 2/1992 | Yu et al. | 382/8 |
| 5,103,305 | 4/1992 | Watanabe | 382/236 |
| 5,103,306 | 4/1992 | Weiman et al. | 358/133 |
| 5,117,287 | 5/1992 | Koike et al. | 358/133 |
| 5,148,497 | 9/1992 | Pentland et al. | 382/249 |
| 5,155,594 | 10/1992 | Bernstein et al. | 348/412 |
| 5,214,504 | 5/1993 | Toriu et al. | 358/105 |
| 5,251,030 | 10/1993 | Tanaka | 358/136 |
| 5,258,836 | 11/1993 | Murata | 358/136 |
| 5,259,040 | 11/1993 | Hanna | 382/107 |
| 5,274,453 | 12/1993 | Maeda | 348/700 |
| 5,294,979 | 3/1994 | Patel et al. | 348/624 |
| 5,295,201 | 3/1994 | Yokohama | 382/48 |
| 5,329,311 | 7/1994 | Ward et al. | 348/180 |
| 5,376,971 | 12/1994 | Kadono et al. | 348/699 |
| 5,424,783 | 6/1995 | Wong | 348/606 |
| 5,459,519 | 10/1995 | Scalise et al. | 348/431 |
| 5,467,442 | 11/1995 | Tsubota et al. | 395/135 |
| 5,469,226 | 11/1995 | David et al. | 348/699 |
| 5,471,535 | 11/1995 | Ikezawa et al. | 382/199 |
| 5,477,272 | 12/1995 | Zhang et al. | 348/407 |
| 5,500,933 | 3/1996 | Schnorf | 345/302 |
| 5,517,327 | 5/1996 | Nakatani et al. | 358/462 |
| 5,546,129 | 8/1996 | Lee | 348/416 |
| 5,557,684 | 9/1996 | Wang et al. | 382/107 |
| 5,570,436 | 10/1996 | Fukushima et al. | 382/300 |
| 5,572,258 | 11/1996 | Yokoyama | 348/415 |
| 5,574,572 | 11/1996 | Malinkowski et al. | 358/451 |
| 5,581,308 | 12/1996 | Lee | 348/699 |
| 5,594,504 | 1/1997 | Ebrahimi | 348/416 |
| 5,598,215 | 1/1997 | Watanabe | 348/416 |
| 5,612,743 | 3/1997 | Lee | 348/409 |
| 5,617,144 | 4/1997 | Lee | 348/416 |
| 5,619,281 | 4/1997 | Jung | 348/699 |
| 5,621,660 | 4/1997 | Chaddha et al. | 395/114 |
| 5,627,591 | 5/1997 | Lee | 348/416 |
| 5,642,166 | 6/1997 | Shin et al. | 348/416 |
| 5,654,771 | 8/1997 | Tekalp et al. | 382/241 |
| 5,684,509 | 11/1997 | Hatanaka et al. | 345/138 |
| 5,684,886 | 11/1997 | Kamada et al. | 382/107 |
| 5,689,306 | 11/1997 | Jung | 348/416 |
| 5,692,063 | 11/1997 | Lee et al. | 382/107 |
| 5,694,487 | 12/1997 | Lee | 382/201 |
| 5,706,417 | 1/1998 | Adelson | 345/429 |
| 5,731,849 | 3/1998 | Kondo et al. | 348/699 |
| 5,734,737 | 3/1998 | Chang et al. | 382/107 |
| 5,761,341 | 6/1998 | Go | 382/232 |
| 5,778,098 | 7/1998 | Lee et al. | 382/236 |

OTHER PUBLICATIONS

Haralick et al., Image Segmentation Techniques, Computer Vision, Graphics and Image Processing, vol. 29, 1985, pp. 100–132.

Chen et al., Image Segmentation as an Estimation Problem, Computer Graphics and Image Processing, vol. 12, 1980, pp. 153–172.

Cover et al., Nearest Neighbor Pattern Classification, IEEE Transactions on Information Theory, vol. IT–13, Jan. 1967, pp. 21–27.

Canny, John, A Computational Approach to Edge Detection, IEEE Transactions on Pattern Analysis and Machine Intelligence, vol. PAMI–8, No. 6, Nov., 1986, pp. 679–698.

Burt et al., Segmentation and Estimation of Image Region Properties Through Cooperative Hierarchial Computation, IEEE Transactions on Systems, Man, and Cybernetics, vol. SMC–11, No. 12, Dec. 1981, pp. 802–809.

Meyer, F., Color Image Segmentation, $4^{th}$ International Conference on Image Processing and its Applications, May 1992, pp. 303–306.

Wong, *Nonlinear Scale–Space Filtering and Multiresolution System*, 1995 IEEE, pp. 774–787.

Defée et al., *Nonlinear Filters in Image Pyramid Generation*, 1991 IEEE, pp. 269–272.

Ranka et al, *Efficient Serial and Parallel Algorithms for Median Filtering*, 1991 IEEE, pp. 1462–1466.

Haddad et al, *Digital Signal Processing, Theory, Applications, and Hardware*, 1991, pp. 257–261.

Orchard, Predictive Motion–Field Segmentation for Image Sequence Coding, IEEE Transactions on Circuits and Systems for Video Technology, vol. 3, No. 1, Feb. 1993, pp. 54–70.

Seferidis et al., General Approach to Block–Matching Motion Estimation, Optical Engineering, vol. 32, No. 7, Jul. 1993, pp. 1464–1474.

Nieweglowski et al., A Novel Video Coding Scheme Based on Temporal Prediction Using Digital Image Warping, IEEE Transactions on Consumer Electronics, vol. 39, No. 3, Aug. 1993, pp. 141–150.

Chang et al., Transform Coding of Arbitrarily–Shaped Image Segments, Proceedings of the ACM Multimedia 93, Aug. 1, 1993, pp. 83–90.

Chen et al., A Block Transform Coder for Arbitrarily Shaped Image Segments, ICIP–94, vol. I/III, Nov. 13, 1994, pp. 85–89.

Franke et al., Constrained Iterative Restoration Techniques: A Powerful Tool in Region Oriented Texture Coding, Signal Processing IV: Theories and Applications, Sep. 1988, pp. 1145–1148.

Pennebaker et al., *JPEG Still Image Data Compression Standard,* Chapter 20, pp. 325–329, 1993.

Sanson, "Motion Affine Models Identification and Application to Television Image Coding," SPIE vol. 1605 Visual Communications and Image Processing '91: Visual Communication, Nov. 11, 1991, pp. 570–581.

Hötter, "Optimization and Efficiency of an Object–Oriented Analysis–Synthesis Coder," IEEE Transactions on Circuits and Systems for Video Technology, Apr. 4, 1994, No. 2, pp. 181–194.

Zakhor et al., "Edge–Based 3–D Camera Motion Estimation with Application to Video Coding," IEEE Transactions on Image Processing, vol. 2., Oct. 2, 1993, pp. 481–498.

Meyer et al., "Region–Based Tracking Using Affine Motion Models in Long Image Sequences," CVGIP: Image Understanding, vol. 60, No. 2, Sep., 1994, pp. 119–140.

Ozer, "Why MPEG is Hot," PC Magazine, Apr. 11, 1995, pp. 130–131.

Fogg, "Survey of Software and Hardware VLC Architectures," SPIE vol. 2186, pp. 29–37.

"Video Coding for Low Bitrate Communication," Draft Recommendation H.263, International Telecommunication Union, Dec. 1995, 51 pages.

Foley et al. *Computer Graphics Principles and Practice*, Addison–Wesley Publishing Company, Inc., 1990, pp. 835–851.

Fig. 9A

INITIAL BLOCK 282 — 262

OBJECT — 266

| 01 | 02 | 03 | 04 | 05 | 06 | 07 | 08 | 09 | 00 | ... |
| 12 | 13 | 14 | 15 | 16 | 17 | 18 | 19 | 10 | 11 | ... |
| 23 | 24 | 25 | 26 | 27 | 28 | 29 | 20 | 21 | 22 | ... |
| 34 | 35 | 36 | 37 | 38 | 39 | 30 | 31 | 32 | 33 | ... |
| 45 | 46 | 47 | 48 | 49 | 40 | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 9C

INITIAL BLOCK SCANNING OBJECT (Step 1)
270(1) — 266

| 01E | 02 | 03 | 04 | 05 | 06 | 07 | 08 | 09 | 00 | ... |
| 12J | 13 | 14 | 15 | 16 | 17 | 18 | 19 | 10 | 11 | ... |
| 23O | 24 | 25 | 26 | 27 | 28 | 29 | 20 | 21 | 22 | ... |
| 34T | 35 | 36 | 37 | 38 | 39 | 30 | 31 | 32 | 33 | ... |
| 45Y | 46 | 47 | 48 | 49 | 40 | 41 | 42 | 43 | 44 | ... |
| 56  | 57 | 58 | 59 | 50 | 51 | 52 | 53 | 54 | 55 | ... |
| 67  | 68 | 69 | 60 | 61 | 62 | 63 | 64 | 65 | 66 | ... |
| 78  | 79 | 70 | 71 | 72 | 73 | 74 | 75 | 76 | 77 | ... |
| 89  | 80 | 81 | 82 | 83 | 84 | 85 | 86 | 87 | 88 | ... |
| 90  | 91 | 92 | 93 | 94 | 95 | 96 | 97 | 98 | 99 | ... |

Fig. 9D

INITIAL BLOCK SCANNING OBJECT (Step 2)
270(2)  270(3) — 266

| 01D | 02E | 03 | 04 | 05 | 06 | 07 | 08 | 09 | 00 | ... |
| 12I | 13J | 14 | 15 | 16 | 17 | 18 | 19 | 10 | 11 | ... |
| 23N | 24O | 25 | 26 | 27 | 28 | 29 | 20 | 21 | 22 | ... |
| 34S | 35T | 36 | 37 | 38 | 39 | 30 | 31 | 32 | 33 | ... |
| 45X | 46Y | 47 | 48 | 49 | 40 | 41 | 42 | 43 | 44 | ... |
| 56  | 57  | 58 | 59 | 50 | 51 | 52 | 53 | 54 | 55 | ... |
| 67  | 68  | 69 | 60 | 61 | 62 | 63 | 64 | 65 | 66 | ... |
| 78  | 79  | 70 | 71 | 72 | 73 | 74 | 75 | 76 | 77 | ... |
| 89  | 80  | 81 | 82 | 83 | 84 | 85 | 86 | 87 | 88 | ... |
| 90  | 91  | 92 | 93 | 94 | 95 | 96 | 97 | 98 | 99 | ... |

INITIAL BLOCK SCANNING OBJECT (Step 5)

270(4)  270(5)  270(6)  270(7)  270(8)

| 01A | 02B | 03C | 04D | 05E | 06 | 07 | 08 | 09 | 00 | ... |
|---|---|---|---|---|---|---|---|---|---|---|
| 12F | 13G | 14H | 15I | 16J | 17 | 18 | 19 | 10 | 11 | ... |
| 23K | 24L | 25M | 26N | 27O | 28 | 29 | 20 | 21 | 22 | ... |
| 34P | 35Q | 36R | 37S | 38T | 39 | 30 | 31 | 32 | 33 | ... |
| 45U | 46V | 47W | 48X | 49Y | 40 | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

INITIAL BLOCK SCANNING OBJECT (Step 6)

270(9)  270(10)  270(11)  270(12)  270(13)

| 01 | 02A | 03B | 04C | 05D | 06E | 07 | 08 | 09 | 00 | ... |
|---|---|---|---|---|---|---|---|---|---|---|
| 12 | 13F | 14G | 15H | 16I | 17J | 18 | 19 | 10 | 11 | ... |
| 23 | 24K | 25L | 26M | 27N | 28O | 29 | 20 | 21 | 22 | ... |
| 34 | 35P | 36Q | 37R | 38S | 39T | 30 | 31 | 32 | 33 | ... |
| 45 | 46U | 47V | 48W | 49X | 40Y | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 9F

INITIAL BLOCK SCANNING OBJECT (Step Q+5)

270(14)  270(15)  270(16)  270(17)  270(18)

| 01 | 02 | 03 | 04 | 05 | 06 | 07 | 08 | 09 | 00 | ... |
|---|---|---|---|---|---|---|---|---|---|---|
| 12A | 13B | 14C | 15D | 16E | 17 | 18 | 19 | 10 | 11 | ... |
| 23F | 24G | 25H | 26I | 27J | 28 | 29 | 20 | 21 | 22 | ... |
| 34K | 35L | 36M | 37N | 38O | 39 | 30 | 31 | 32 | 33 | ... |
| 45P | 46Q | 47R | 48S | 49T | 40 | 41 | 42 | 43 | 44 | ... |
| 56U | 57V | 58W | 59X | 50Y | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 9G

SUBSEQUENT HORIZONTAL BLOCK

```
B  C  D  E  U'   ← 276
G  H  I  J  V'
L  M  N  O  W'
Q  R  S  T  X'
V  W  X  Y  Y'
⎵_____⎵ ⎵⎵
    280      278
```

SUBSEQUENT HORIZONTAL BLOCK SCANNING OBJECT (Step 1)

```
   288(1)
01U'⎤ 02  03  04  05  06  07  08  09  00  ...
12V' ⎪ 13  14  15  16  17  18  19  10  11  ...
23W'⎬ 24  25  26  27  28  29  20  21  22  ...
34X' ⎪ 35  36  37  38  39  30  31  32  33  ...
45Y'⎦ 46  47  48  49  40  41  42  43  44  ...
56    57  58  59  50  51  52  53  54  55  ...
67    68  69  60  61  62  63  64  65  66  ...
78    79  70  71  72  73  74  75  76  77  ...
89    80  81  82  83  84  85  86  87  88  ...
90    91  92  93  94  95  96  97  98  99  ...
```

SUBSEQUENT HORIZONTAL BLOCK SCANNING OBJECT (Step 2)

```
   270'(1) 288(2)
01 E ⎤ 02 U'⎤ 03  04  05  06  07  08  09  00  ...
12 J ⎪ 13 V' ⎪ 14  15  16  17  18  19  10  11  ...
23 O ⎬ 24 W'⎬ 25  26  27  28  29  20  21  22  ...
34 T ⎪ 35 X' ⎪ 36  37  38  39  30  31  32  33  ...
45 Y ⎦ 46 Y'⎦ 47  48  49  40  41  42  43  44  ...
56    57    58  59  50  51  52  53  54  55  ...
67    68    69  60  61  62  63  64  65  66  ...
78    79    70  71  72  73  74  75  76  77  ...
89    80    81  82  83  84  85  86  87  88  ...
90    91    92  93  94  95  96  97  98  99  ...
```

SUBSEQUENT HORIZONTAL BLOCK SCANNING OBJECT (Step 3)

```
   270'(2) 270'(3) 288(3)
01 D ⎤ 02 E ⎤ 03 U'⎤ 04  05  06  07  08  09  00  ...
12 I ⎪ 13 J ⎪ 14 V' ⎪ 15  16  17  18  19  10  11  ...
23 N ⎬ 24 O ⎬ 25 W'⎬ 26  27  28  29  20  21  22  ...
34 S ⎪ 35 T ⎪ 36 X' ⎪ 37  38  39  30  31  32  33  ...
45 X ⎦ 46 Y ⎦ 47 Y'⎦ 48  49  40  41  42  43  44  ...
56    57    58    59  50  51  52  53  54  55  ...
67    68    69    60  61  62  63  64  65  66  ...
78    79    70    71  72  73  74  75  76  77  ...
89    80    81    82  83  84  85  86  87  88  ...
90    91    92    93  94  95  96  97  98  99  ...
```

SUBSEQUENT HORIZONTAL BLOCK SCANNING OBJECT (Step 6)

| | 270'(5) | 270'(6) | 270'(7) | 270'(8) | 288(4) | | | | | |
|---|---|---|---|---|---|---|---|---|---|---|
| 01 | 02 B | 03 C | 04 D | 05 E | 06 U' | 07 | 08 | 09 | 00 | ... |
| 12 | 13 G | 14 H | 15 I | 16 J | 17 V' | 18 | 19 | 10 | 11 | ... |
| 23 | 24 L | 25 M | 26 N | 27 O | 28 W' | 29 | 20 | 21 | 22 | ... |
| 34 | 35 Q | 36 R | 37 S | 38 T | 39 X' | 30 | 31 | 32 | 33 | ... |
| 45 | 46 V | 47 W | 48 X | 49 Y | 40 Y' | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 10E

SUBSEQUENT HORIZONTAL BLOCK SCANNING OBJECT (Step Q+6)

| | 270'(15) | 270'(16) | 270'(17) | 270'(18) | 288(5) | | | | | |
|---|---|---|---|---|---|---|---|---|---|---|
| 01 | 02 | 03 | 04 | 05 | 06 | 07 | 08 | 09 | 00 | ... |
| 12 | 13 B | 14 C | 15 D | 16 E | 17 U' | 18 | 19 | 10 | 11 | ... |
| 23 | 24 G | 25 H | 26 I | 27 J | 28 V' | 29 | 20 | 21 | 22 | ... |
| 34 | 35 L | 36 M | 37 N | 38 O | 39 W' | 30 | 31 | 32 | 33 | ... |
| 45 | 46 Q | 47 R | 48 S | 49 T | 40 X' | 41 | 42 | 43 | 44 | ... |
| 56 | 57 V | 58 W | 59 X | 50 Y | 51 Y' | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

SUBSEQUENT VERTICAL BLOCK ← 294

INITIAL BLOCK SCANNING OBJECT (Step Q+1)

302(1)

| 01 | 02 | 03 | 04 | 05 | 06 | 07 | 08 | 09 | 00 | ... |
| 12 J | 13 | 14 | 15 | 16 | 17 | 18 | 19 | 10 | 11 | ... |
| 23 O | 24 | 25 | 26 | 27 | 28 | 29 | 20 | 21 | 22 | ... |
| 34 T | 35 | 36 | 37 | 38 | 39 | 30 | 31 | 32 | 33 | ... |
| 45 Y | 46 | 47 | 48 | 49 | 40 | 41 | 42 | 43 | 44 | ... |
| 56 E' | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 11C

INITIAL BLOCK SCANNING OBJECT (Step Q+2)

302(2)  302(3)

| 01 | 02 | 03 | 04 | 05 | 06 | 07 | 08 | 09 | 00 | ... |
| 12 I | 13 J | 14 | 15 | 16 | 17 | 18 | 19 | 10 | 11 | ... |
| 23 N | 24 O | 25 | 26 | 27 | 28 | 29 | 20 | 21 | 22 | ... |
| 34 S | 35 T | 36 | 37 | 38 | 39 | 30 | 31 | 32 | 33 | ... |
| 45 X | 46 Y | 47 | 48 | 49 | 40 | 41 | 42 | 43 | 44 | ... |
| 56 D' | 57 E' | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 11D

INITIAL BLOCK SCANNING OBJECT (Step Q+5)

302(4) 302(5) 302(6) 302(7) 302(8)

| 01 | 02 | 03 | 04 | 05 | 06 | 07 | 08 | 09 | 00 | ... |
| 12 F | 13 G | 14 H | 15 I | 16 J | 17 | 18 | 19 | 10 | 11 | ... |
| 23 K | 24 L | 25 M | 26 N | 27 O | 28 | 29 | 20 | 21 | 22 | ... |
| 34 P | 35 Q | 36 R | 37 S | 38 T | 39 | 30 | 31 | 32 | 33 | ... |
| 45 U | 46 V | 47 W | 48 X | 49 Y | 40 | 41 | 42 | 43 | 44 | ... |
| 56 A' | 57 B' | 58 C' | 59 D' | 50 E' | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

304'(4) 304'(5) 304'(6) 304'(7) 304'(8)

INITIAL BLOCK SCANNING OBJECT (Step Q+6)
   302(9) 302(10) 302(11) 302(12) 302(13)

| 01 | 02   | 03   | 04   | 05   | 06   | 07 | 08 | 09 | 00 | ... |
|----|------|------|------|------|------|----|----|----|----|-----|
| 12 | 13 F | 14 G | 15 H | 16 O | 17 J | 18 | 19 | 10 | 11 | ... |
| 23 | 24 K | 25 L | 26 M | 27 N | 28 O | 29 | 20 | 21 | 22 | ... |
| 34 | 35 P | 36 Q | 37 R | 38 S | 39 T | 30 | 31 | 32 | 33 | ... |
| 45 | 46 U | 47 V | 48 W | 49 X | 40 Y | 41 | 42 | 43 | 44 | ... |
| 56 | 57 A'| 58 B'| 59 C'| 50 D'| 51 E'| 52 | 53 | 54 | 55 | ... |
| 67 | 68   | 69   | 60   | 61   | 62   | 63 | 64 | 65 | 66 | ... |
| 78 | 79   | 70   | 71   | 72   | 73   | 74 | 75 | 76 | 77 | ... |
| 89 | 80   | 81   | 82   | 83   | 84   | 85 | 86 | 87 | 88 | ... |
| 90 | 91   | 92   | 93   | 94   | 95   | 96 | 97 | 98 | 99 | ... |

Fig. 11E

INITIAL BLOCK SCANNING OBJECT (Step 2Q+5)
302(14) 302(15) 302(16) 302(17) 302(18)

| 05   | 02   | 03   | 04   |      | 06 | 07 | 08 | 09 | 00 | ... |
|------|------|------|------|------|----|----|----|----|----|-----|
| 18   | 13   | 14   | 15   |      | 17 | 18 | 19 | 10 | 11 | ... |
| 23 F | 24 G | 25 H | 26 I | J    | 28 | 29 | 20 | 21 | 22 | ... |
| 38 K | 35 L | 36 M | 37 N | O    | 39 | 30 | 31 | 32 | 33 | ... |
| 49 P | 46 Q | 47 R | 48 S | T    | 40 | 41 | 42 | 43 | 44 | ... |
| 50 U | 57 V | 58 W | 59 X | Y    | 51 | 52 | 53 | 54 | 55 | ... |
| 61 A'| 68 B'| 69 C'| 60 D'| E'   | 62 | 63 | 64 | 65 | 66 | ... |
| 78   | 79   | 70   | 71   |      | 73 | 74 | 75 | 76 | 77 | ... |
| 89   | 80   | 81   | 82   |      | 84 | 85 | 86 | 87 | 88 | ... |
| 90   | 91   | 92   | 93   |      | 95 | 96 | 97 | 98 | 99 | ... |

Fig. 11F

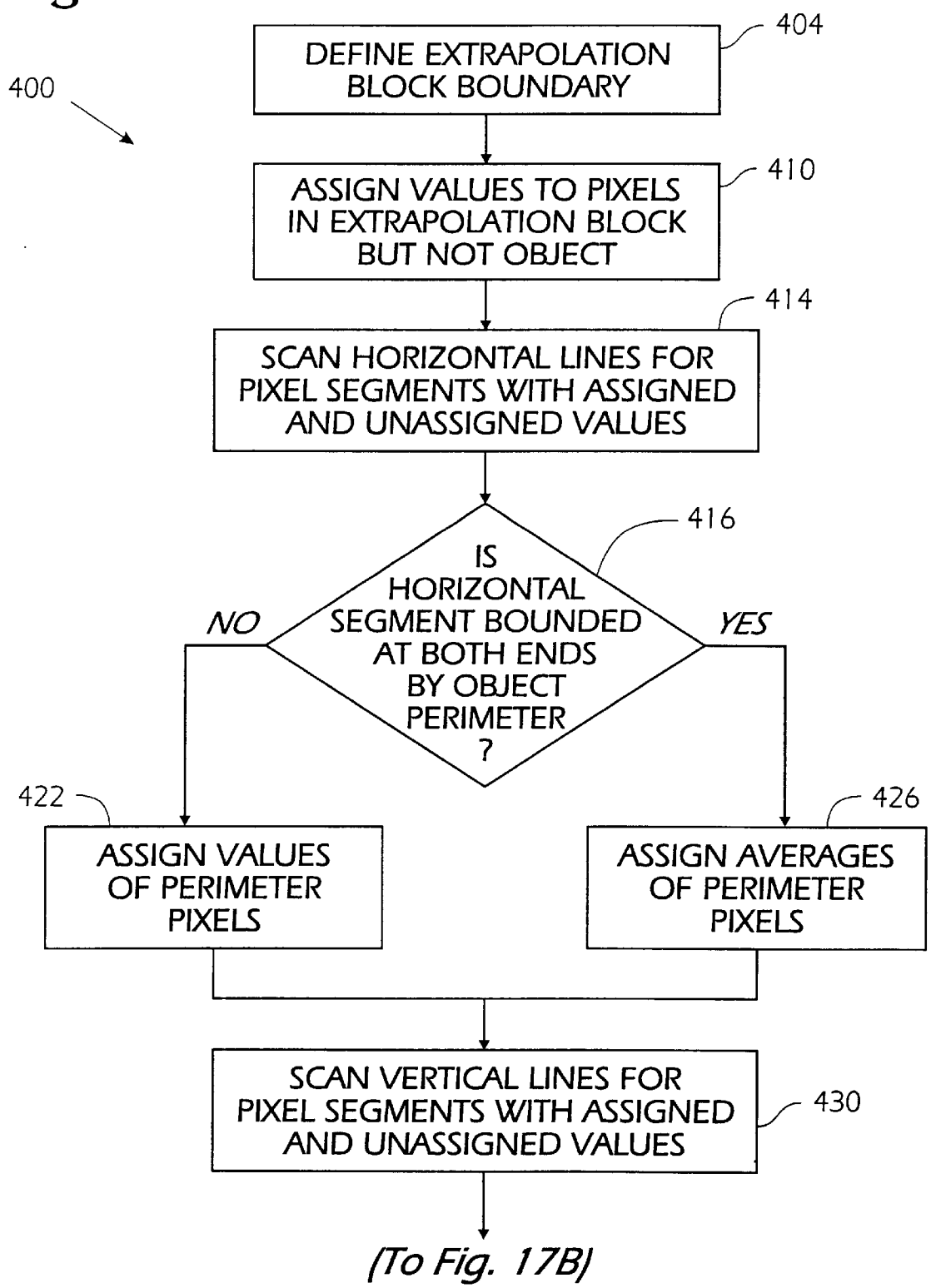

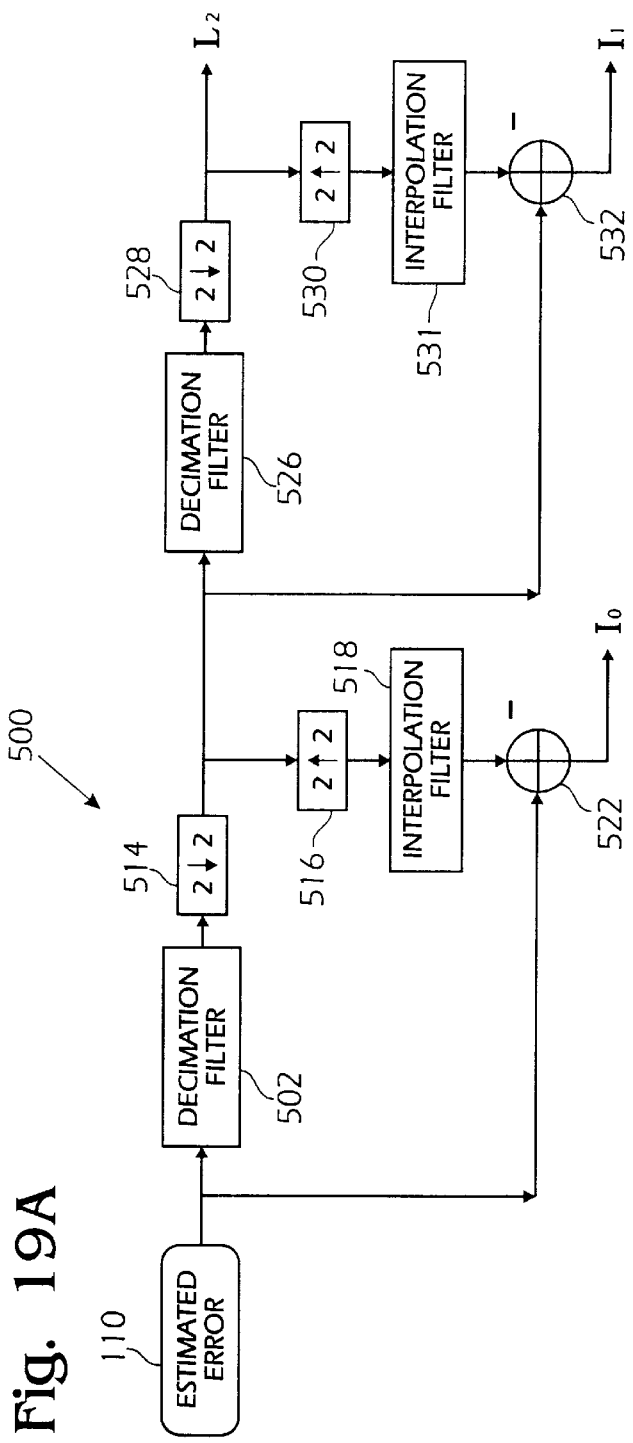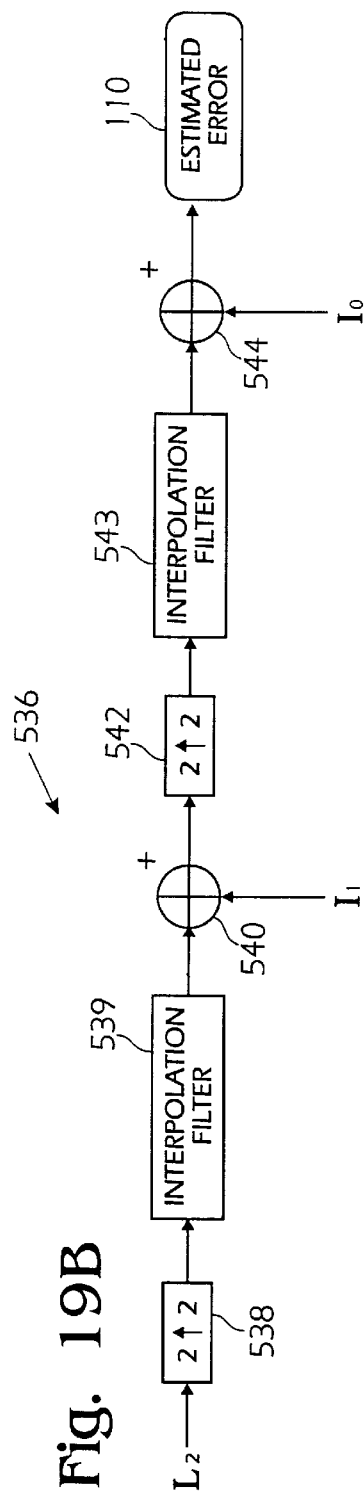

Fig. 3B
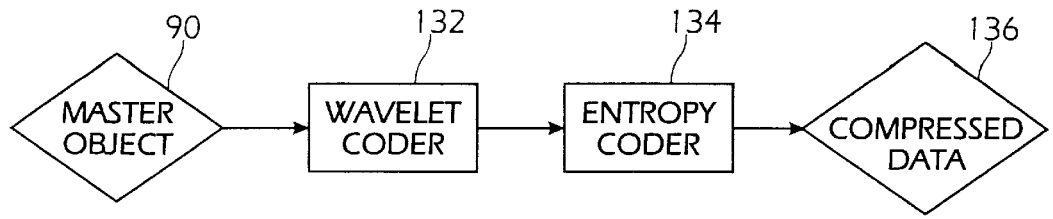
Fig. 23B
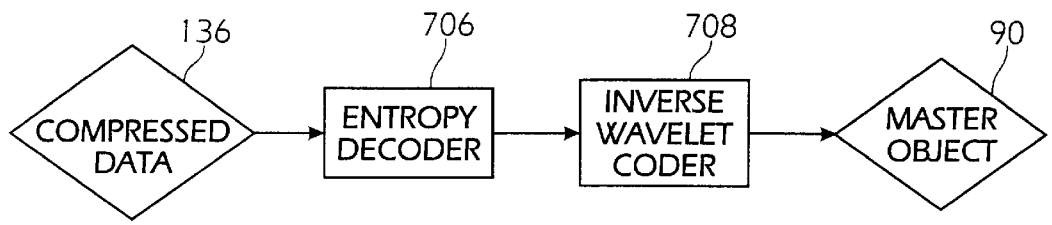
Fig. 20A
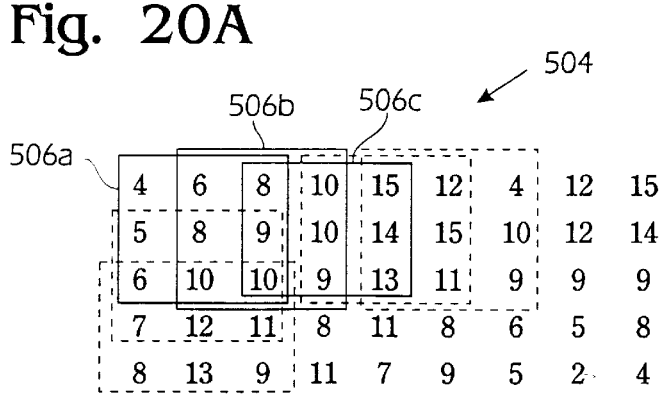
Fig. 20C
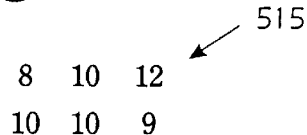
Fig. 20B
8  9  10  12  12
9  10 10  11  11
10 10 10  9   9
Fig. 20D
8  9  10  11   12
9  9  10  10   10.5
10 10 10  9.5  9

OBJECT-BASED VIDEO COMPRESSION PROCESS EMPLOYING ARBITRARILY-SHAPED FEATURES

RELATED APPLICATION

This application claims the benefit of U.S. Provisional Application No. 60/005,031, filed Oct. 5, 1995.

FIELD OF THE INVENTION

The present invention relates to processes for compressing digital video signals and, in particular, to an object-based digital video encoding process with error feedback to increase accuracy.

BACKGROUND OF THE INVENTION

Full-motion video displays based upon analog video signals have long been available in the form of television. With recent increases in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels according to the display resolution of a particular system. As examples, VHS-based systems have display resolutions of 320×480 pixels, NTSC-based systems have display resolutions of 720×486 pixels, and high-definition television (HDTV) systems under development have display resolutions of 1360×1024 pixels.

The amounts of raw digital information included in video sequences are massive. Storage and transmission of these amounts of video information is infeasible with conventional personal computer equipment. With reference to a digitized form of a relatively low resolution VHS image format having a 320×480 pixel resolution, a full-length motion picture of two hours in duration could correspond to 100 gigabytes of digital video information. By comparison, conventional compact optical disks have capacities of about 0.6 gigabytes, magnetic hard disks have capacities of 1–2 gigabytes, and compact optical disks under development have capacities of up to 8 gigabytes.

In response to the limitations in storing or transmitting such massive amounts of digital video information, various video compression standards or processes have been established, including MPEG-1, MPEG-2, and H.26X. These conventional video compression techniques utilize similarities between successive image frames, referred to as temporal or interframe correlation, to provide interframe compression in which pixel-based representations of image frames are converted to motion representations. In addition, the conventional video compression techniques utilize similarities within image frames, referred to as spatial or intraframe correlation, to provide intraframe compression in which the motion representations within an image frame are further compressed. Intraframe compression is based upon conventional processes for compressing still images, such as discrete cosine transform (DCT) encoding.

Although differing in specific implementations, the MPEG-1, MPEG-2, and H.26X video compression standards are similar in a number of respects. The following description of the MPEG-2 video compression standard is generally applicable to the others.

MPEG-2 provides interframe compression and intraframe compression based upon square blocks or arrays of pixels in video images. A video image is divided into transformation blocks having dimensions of 16×16 pixels. For each transformation block $T_N$ in an image frame N, a search is performed across the image of an immediately preceding image frame N−1 or also a next successive video frame N+1 (i.e., bidirectionally) to identify the most similar respective transformation blocks $T_{N+1}$ or $T_{N-1}$.

Ideally, and with reference to a search of the next successive image frame, the pixels in transformation blocks $T_N$ and $T_{N+1}$ are identical, even if the transformation blocks have different positions in their respective image frames. Under these circumstances, the pixel information in transformation block $T_{N+1}$ is redundant to that in transformation block $T_{N+1}$. Compression is achieved by substituting the positional translation between transformation blocks $T_N$ and $T_{N+1}$ for the pixel information in transformation block $T_{N+1}$. In this simplified example, a single translational vector ($\Delta X, \Delta Y$) is designated for the video information associated with the 256 pixels in transformation block $T_{N+1}$.

Frequently, the video information (i.e., pixels) in the corresponding transformation blocks $T_N$ and $T_{N+1}$ are not identical. The difference between them is designated a transformation block error E, which often is significant. Although it is compressed by a conventional compression process such as discrete cosine transform (DCT) encoding, the transformation block error E is cumbersome and limits the extent (ratio) and the accuracy by which video signals can be compressed.

Large transformation block errors E arise in block-based video compression methods for several reasons. The block-based motion estimation represents only translational motion between successive image frames. The only change between corresponding transformation blocks $T_N$ and $T_{N+1}$ that can be represented are changes in the relative positions of the transformation blocks. A disadvantage of such representations is that full-motion video sequences frequently include complex motions other than translation, such as rotation, magnification and shear. Representing such complex motions with simple translational approximations results in significant errors.

Another aspect of video displays is that they typically include multiple image features or objects that change or move relative to each other. Objects may be distinct characters, articles, or scenery within a video display. With respect to a scene in a motion picture, for example, each of the characters (i.e., actors) and articles (i.e., props) in the scene could be a different object.

The relative motion between objects in a video sequence is another source of significant transformation block errors E in conventional video compression processes. Due to the regular configuration and size of the transformation blocks, many of them encompass portions of different objects. Relative motion between the objects during successive image frames can result in extremely low correlation (i.e., high transformation errors E) between corresponding transformation blocks. Similarly, the appearance of portions of objects in successive image frames (e.g., when a character turns) also introduces high transformation errors E.

Conventional video compression methods appear to be inherently limited due to the size of transformation errors E. With the increased demand for digital video display capabilities, improved digital video compression processes are required.

SUMMARY OF THE INVENTION

The present invention includes a video compression encoder process for compressing digitized video signals representing display motion in video sequences of multiple image frames. The encoder process utilizes object-based video compression to improve the accuracy and versatility of encoding interframe motion and intraframe image features. Video information is compressed relative to objects of arbitrary configurations, rather than fixed, regular arrays of pixels as in conventional video compression methods. This reduces the error components and thereby improves the compression efficiency and accuracy. As another benefit, object-based video compression of this invention provides interactive video editing capabilities for processing compressed video information.

In a preferred embodiment, the process or method of this invention includes identifying image features of arbitrary configuration in a first video image frame and defining within the image feature multiple distinct feature points. The feature points of the image feature in the first video image frame are correlated with corresponding feature points of the image feature in a succeeding second video image frame, thereby to determine an estimation of the image feature in the second video image frame. A difference between the estimated and actual image feature in the second video image frame is determined and encoded in a compressed format.

The encoder process of this invention overcomes the shortcomings of the conventional block-based video compression methods. The encoder process preferably uses a multi-dimensional transformation method to represent mappings between corresponding objects in successive image frames. The multiple dimensions of the transformation refer to the number of coordinates in its generalized form. The multi-dimensional transformation is capable of representing complex motion that includes any or all of translation, rotation, magnification, and shear. As a result, complex motion of objects between successive image frames may be represented with relatively low transformation error.

Another source of error in conventional block-based video compression methods is motion between objects included within a transformation block. The object-based video compression or encoding of this invention substantially eliminates the relative motion between objects within transformation blocks. As a result, transformation error arising from inter-object motion also is substantially decreased. The low transformation errors arising from the encoder process of this invention allow it to provide compression ratios up to 300% greater than those obtainable from prior encoder processes such as MPEG-2.

The foregoing and other features and advantages of the preferred embodiment of the present invention will be more readily apparent from the following detailed description, which proceeds with reference to the accompanying drawings.

BRIEF DESCRIPTION OF THE DRAWINGS

FIG. 3B is a functional block diagram of a master object encoder process according to this invention.

FIG. 9A is a schematic representation of a first pixel block used for identifying corresponding pixels in different image frames. FIG. 9B is a schematic representation of an array of pixels corresponding to a search area in a prior image frame where corresponding pixels are sought. FIGS. 9C–9G are schematic representations of the first pixel block being scanned across the pixel array of FIG. 9B to identify corresponding pixels.

FIG. 10A is a schematic representation of a second pixel block used for identifying corresponding pixels in different image frames. FIGS. 10B–10F are schematic representations of the second pixel block being scanned across the pixel array of FIG. 9B to identify corresponding pixels.

FIG. 11A is a schematic representation of a third pixel block used for identifying corresponding pixels in different image frames. FIGS. 11B–11F are schematic representations of the third pixel block being scanned across the pixel array of FIG. 9B.

FIGS. 17A and 17B are a functional block diagram of a precompression extrapolation method for extrapolating image features of arbitrary configuration to a predefined configuration to facilitate compression.

FIGS. 19A and 19B are functional block diagrams of an encoder method and a decoder method, respectively, employing a Laplacian pyramid encoder method in accordance with this invention.

FIGS. 20A–20D are simplified representations of the color component values of an arbitrary set or array of pixels processed according to the encoder process of FIG. 19A.

FIG. 23B is a functional diagram of a master object decoder process according to this invention.

DETAILED DESCRIPTION OF PREFERRED EMBODIMENTS

Figure 1:
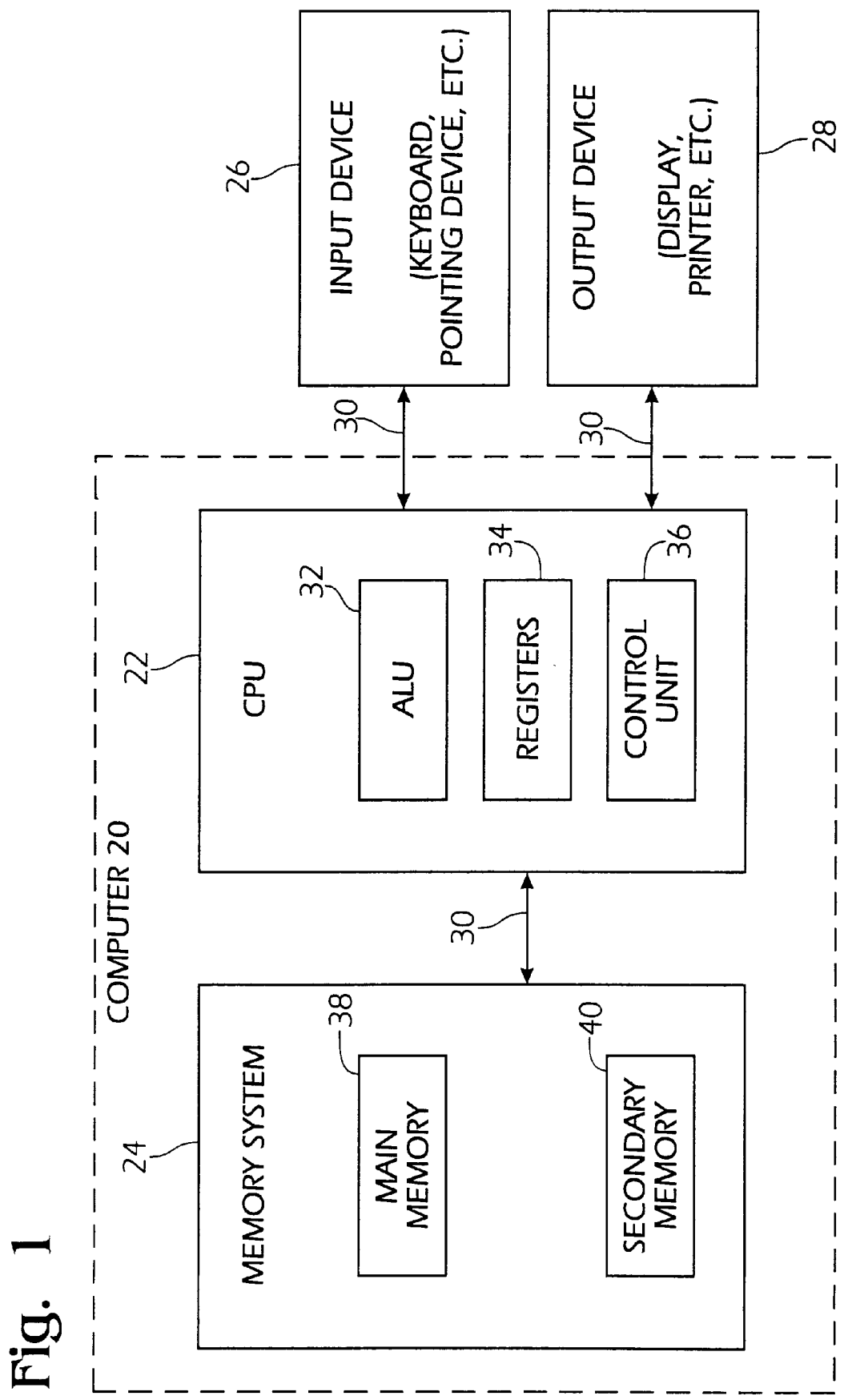
FIG. 1 is a block diagram of a computer system that may be used to implement a method and apparatus embodying the invention.

Referring to FIG. 1, an operating environment for the preferred embodiment of the present invention is a computer system 20, either of a general purpose or a dedicated type, that comprises at least one high speed central processing unit (CPU) 22, in conjunction with a memory system 24, an input device 26, and an output device 28. These elements are interconnected by a bus structure 30.

The illustrated CPU 22 is of familiar design and includes an ALU 32 for performing computations, a collection of registers 34 for temporary storage of data and instructions, and a control unit 36 for controlling operation of the system 20. CPU 22 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 24 includes main memory 38 and secondary storage 40. Illustrated main memory 38 takes the form of 16 megabytes of semiconductor RAM memory. Secondary storage 40 takes the form of long term storage, such as ROM, optical or magnetic disks, flash memory, or tape. Those skilled in the art will appreciate that memory system 24 may comprise many other alternative components.

The input and output devices 26, 28 are also familiar. The input device 26 can comprise a keyboard, a mouse, a physical transducer (e.g., a microphone), etc. The output device 28 can comprise a display, a printer, a transducer (e.g. a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 24.

In accordance with the practices of persons skilled in the art of computer programming, the present invention is described below with reference to symbolic representations of operations that are performed by computer system 20, unless indicated otherwise. Such operations are sometimes referred to as being computer-executed. It will be appreciated that the operations which are symbolically represented include the manipulation by CPU 22 of electrical signals representing data bits and the maintenance of data bits at memory locations in memory system 24, as well as other processing of signals. The memory locations where data bits are maintained are physical locations that have particular electrical, magnetic, or optical properties corresponding to the data bits.

Figure 2A:
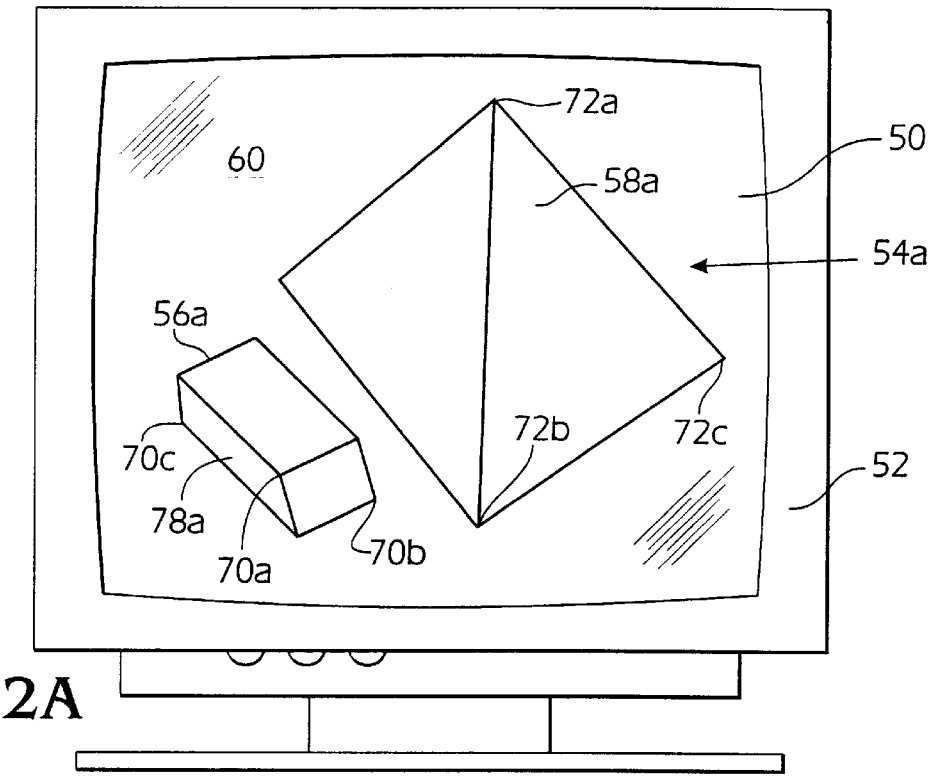
FIGS. 2A and 2B are simplified representations of a display screen of a video display device showing two successive image frames corresponding to a video signal.
Figure 2B:
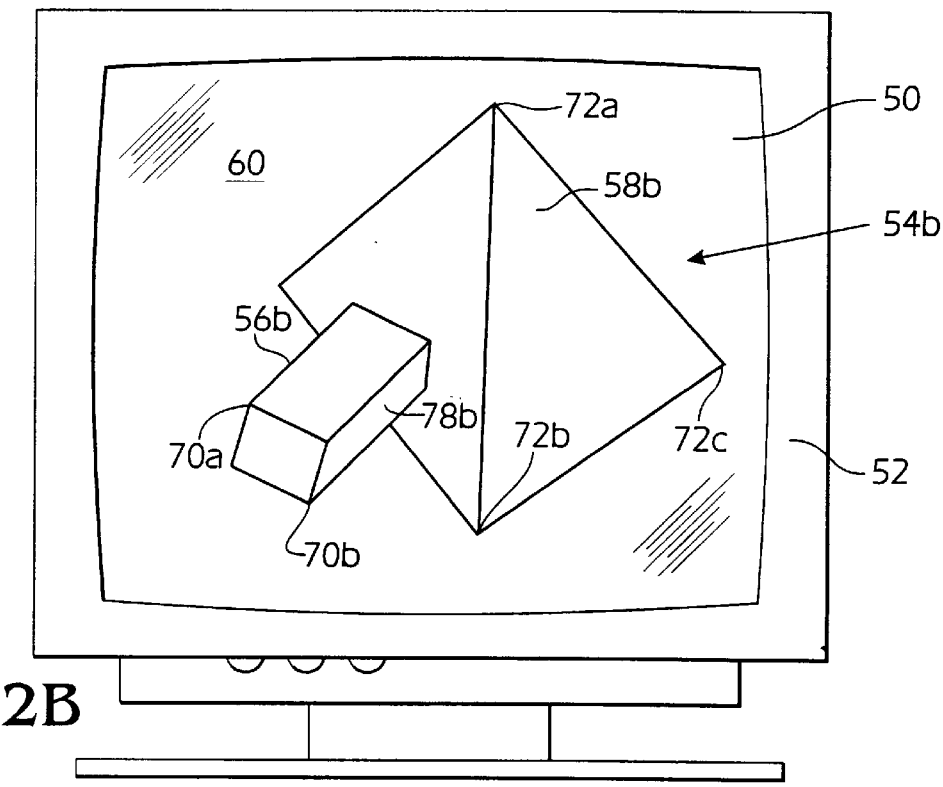

FIGS. 2A and 2B are simplified representations of a display screen 50 of a video display device 52 (e.g., a television or a computer monitor) showing two successive image frames 54a and 54b of a video image sequence represented electronically by a corresponding video signal. Video signals may be in any of a variety of video signal formats including analog television video formats such as NTSC, PAL, and SECAM, and pixelated or digitized video signal formats typically used in computer displays, such as VGA, CGA, and EGA. Preferably, the video signals corresponding to image frames are of a digitized video signal format, either as originally generated or by conversion from an analog video signal format, as is known in the art.

Image frames 54a and 54b each include a rectangular solid image feature 56 and a pyramid image feature 58 that are positioned over a background 60. Image features 56 and 58 in image frames 54a and 54b have different appearances because different parts are obscured and shown. For purposes of the following description, the particular form of an image feature in an image frame is referred to as an object or, alternatively, a mask. Accordingly, rectangular solid image feature 56 is shown as rectangular solid objects 56a and 56b in respective image frames 54a and 54b, and pyramid image feature 58 is shown as pyramid objects 58a and 58b in respective image frames 54a and 54b.

Pyramid image feature 58 is shown with the same position and orientation in image frames 54a and 54b and would "appear" to be motionless when shown in the video sequence. Rectangular solid 56 is shown in frames 54a and 54b with a different orientation and position relative to pyramid 58 and would "appear" to be moving and rotating relative to pyramid 58 when shown in the video sequence. These appearances of image features 58 and 60 are figurative and exaggerated. The image frames of a video sequence typically are displayed at rates in the range of 30–80 Hz. Human perception of video motion typically requires more than two image frames. Image frames 54a and 54b provide, therefore, a simplified representation of a conventional video sequence for purposes of illustrating the present invention. Moreover, it will be appreciated that the present invention is in no way limited to such simplified video images, image features, or sequences and, to the contrary, is applicable to video images and sequences of arbitrary complexity.

Video Compression Encoder Process Overview

Figure 3A:
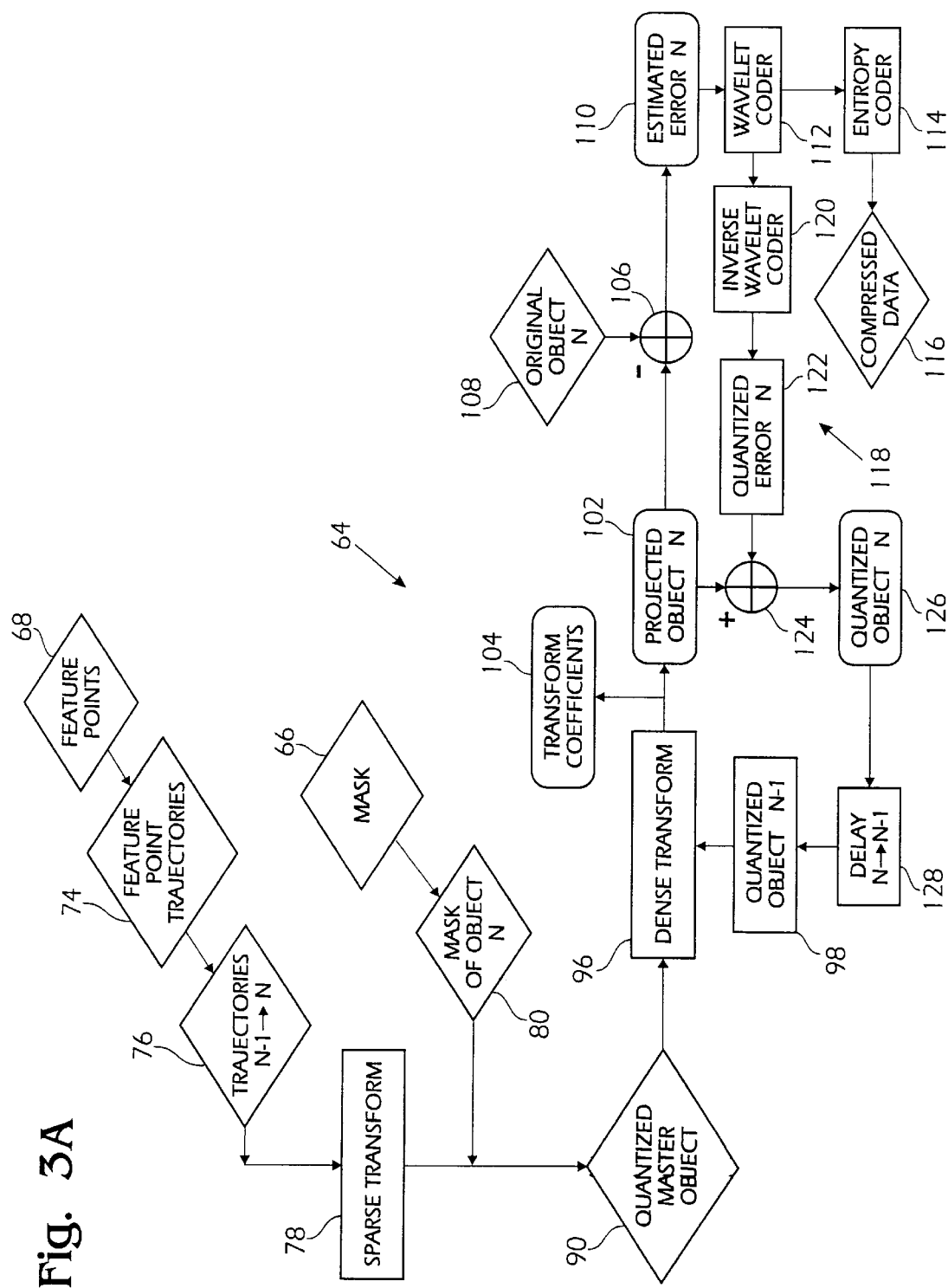
FIG. 3A is a generalized functional block diagram of a video compression encoder process for compressing digitized video signals representing display motion in video sequences of multiple image frames.

FIG. 3A is a generalized functional block diagram of a video compression encoder process 64 for compressing digitized video signals representing display motion in video sequences of multiple image frames. Compression of video information (i.e., video sequences or signals) can provide economical storage and transmission of digital video information in applications that include, for example, interactive or digital television and multimedia computer applications. For purposes of brevity, the reference numerals assigned to function blocks of encoder process 64 are used interchangeably in reference to the results generated by the function blocks.

Conventional video compression techniques utilize similarities between successive image frames, referred to as temporal or interframe correlation, to provide interframe compression in which pixel-based representations of image frames are converted to motion representations. In addition, conventional video compression techniques utilize similarities within image frames, referred to as spatial or intraframe correlation, to provide intraframe compression in which the motion representations within an image frame are further compressed.

In such conventional video compression techniques, including MPEG-1, MPEG-2, and H.26X, the temporal and spatial correlations are determined relative to simple translations of fixed, regular (e.g., square) arrays of pixels. Video information commonly includes, however, arbitrary video motion that cannot be represented accurately by translating square arrays of pixels. As a consequence, conventional video compression techniques typically include significant error components that limit the compression rate and accuracy.

In contrast, encoder process 64 utilizes object-based video compression to improve the accuracy and versatility of encoding interframe motion and intraframe image features. Encoder process 64 compresses video information relative to objects of arbitrary configurations, rather than fixed, regular arrays of pixels. This reduces the error components and thereby improves the compression efficiency and accuracy. As another benefit, object-based video compression provides interactive video editing capabilities for processing compressed video information.

Referring to FIG. 3A, function block 66 indicates that user-defined objects within image frames of a video sequence are segmented from other objects within the image frames. The objects may be of arbitrary configuration and preferably represent distinct image features in a display image. Segmentation includes identifying the pixels in the image frames corresponding to the objects. The user-defined objects are defined in each of the image frames in the video sequence. In FIGS. 2A and 2B, for example, rectangular solid objects 56a and 56b and pyramid objects 58a and 58b are separately segmented.

The segmented objects are represented by binary or multi-bit (e.g., 8-bit) "alphachannel" masks of the objects. The object masks indicate the size, configuration, and position of an object on a pixel-by-pixel basis. For purposes of simplicity, the following description is directed to binary masks in which each pixel of the object is represented by a single binary bit rather than the typical 24-bits (i.e., 8 bits for each of three color component values). Multi-bit (e.g., 8-bit) masks also have been used.

Function block 68 indicates that "feature points" of each object are defined by a user. Feature points preferably are distinctive features or aspects of the object. For example, corners 70a–70c and corners 72a–72c could be defined by a user as feature points of rectangular solid 56 and pyramid 58, respectively. The pixels corresponding to each object mask and its feature points in each image frame are stored in an object database included in memory system 24.

Function block 74 indicates that changes in the positions of feature points in successive image frames are identified and trajectories determined for the feature points between successive image frames. The trajectories represent the direction and extent of movement of the feature points. Function block 76 indicates that trajectories of the feature points in the object between prior frame N−1 and current frame N also is retrieved from the object data base.

Function block 78 indicates that a sparse motion transformation is determined for the object between prior frame N−1 and current frame N. The sparse motion transformation is based upon the feature point trajectories between frames N−1 and N. The sparse motion transformation provides an approximation of the change of the object between prior frame N−1 and current frame N.

Function block 80 indicates that a mask of an object in a current frame N is retrieved from the object data base in memory system 24.

Function block 90 indicates that a quantized master object or "sprite" is formed from the objects or masks 66 corresponding to an image feature in an image frame sequence and feature point trajectories 74. The master object preferably includes all of the aspects or features of an object as it is represented in multiple frames. With reference to FIGS. 2A and 2B, for example, rectangular solid 56 in frame 54b includes a side 78b not shown in frame 54a. Similarly, rectangular solid 56 includes a side 78a in frame 54a not shown in frame 54b. The master object for rectangular solid 56 includes both sides 78a and 78b.

Sparse motion transformation 78 frequently will not provide a complete representation of the change in the object between frames N−1 and N. For example, an object in a prior frame N−1, such as rectangular object 54a, might not include all the features of the object in the current frame N, such as side 78b of rectangular object 54b.

To improve the accuracy of the transformation, therefore, an intersection of the masks of the object in prior frame N−1 and current frame N is determined, such as by a logical AND function as is known in the art. The mask of the object in the current frame N is subtracted from the resulting intersection to identify any portions or features of the object in the current frame N not included in the object in the prior frame N−1 (e.g., side 78b of rectangular object 54b, as described above). The newly identified portions of the object are incorporated into master object 90 so that it includes a complete representation of the object in frames N−1 and N.

Function block 96 indicates that a quantized form of an object 98 in a prior frame N−1 (e.g., rectangular solid object 56a in image frame 54a) is transformed by a dense motion transformation to provide a predicted form of the object 102 in a current frame N (e.g., rectangular solid object 56b in image frame 54b). This transformation provides object-based interframe compression.

The dense motion transformation preferably includes determining an affine transformation between quantized prior object 98 in frame N−1 and the object in the current frame N and applying the affine transformation to quantized prior object 98. The preferred affine transformation is represented by affine transformation coefficients 104 and is capable of describing translation, rotation, magnification, and shear. The affine transformation is determined from a dense motion estimation, preferably including a pixel-by-pixel mapping, between prior quantized object 98 and the object in the current frame N.

Predicted current object 102 is represented by quantized prior object 98, as modified by dense motion transformation 96, and is capable of representing relatively complex motion, together with any new image aspects obtained from master object 90. Such object-based representations are relatively accurate because the perceptual and spatial continuity associated with objects eliminates errors arising from the typically changing relationships between different objects in different image frames. Moreover, the object-based representations allow a user to represent different objects with different levels of resolution to optimize the relative efficiency and accuracy for representing objects of varying complexity.

Function block 106 indicates that for image frame N, predicted current object 102 is subtracted from original object 108 for current frame N to determine an estimated error 110 in predicted object 102. Estimated error 110 is a compressed representation of current object 108 in image frame N relative to quantized prior object 98. More specifically, current object 108 may be decoded or reconstructed from estimated error 110 and quantized prior object 98.

Function block 112 indicates that estimated error 110 is compressed or "coded" by a conventional "lossy" still image compression method such as lattice subband or other wavelet compression or encoding as described in *Multirate Systems and Filter Banks* by Vaidyanathan, PTR Prentice-Hall, Inc., Englewood Cliffs, N.J., (1993) or discrete cosine transform (DCT) encoding as described in *JPEG: Still Image Data Compression Standard* by Pennebaker et al., Van Nostrand Reinhold New York (1993).

As is known in the art, "lossy" compression methods introduce some data distortion to provide increased data compression. The data distortion refers to variations between the original data before compression and the data resulting after compression and decompression. For purposes of illustration below, the compression or encoding of function block 102 is presumed to be wavelet encoding.

Function block 114 indicates that the wavelet encoded estimated error from function block 112 is further compressed or "coded" by a conventional "lossless" still image compression method to form compressed data 116. A preferred conventional "lossless" still image compression method is entropy encoding as described in *JPEG: Still Image Data Compression Standard* by Pennebaker et al. As is known in the art, "lossless" compression methods introduce no data distortion.

An error feedback loop 118 utilizes the wavelet encoded estimated error from function block 112 for the object in frame N to obtain a prior quantized object for succeeding frame N+1. As an initial step in feedback loop 118, function block 120 indicates that the wavelet encoded estimated error from function block 112 is inverse wavelet coded, or wavelet decoded, to form a quantized error 122 for the object in image frame N.

The effect of successively encoding and decoding estimated error 110 by a lossy still image compression method is to omit from quantized error 122 video information that is generally imperceptible by viewers. This information typically is of higher frequencies. As a result, omitting such higher frequency components typically can provide image compression of up to about 200% with only minimal degradation of image quality.

Function block 124 indicates that quantized error 122 and predicted object 102, both for image frame N, are added together to form a quantized object 126 for image frame N. After a timing coordination delay 128, quantized object 126 becomes quantized prior object 98 and is used as the basis for processing the corresponding object in image frame N+1.

Encoder process 64 utilizes the temporal correlation of corresponding objects in successive image frames to obtain improved interframe compression, and also utilizes the spatial correlation within objects to obtain accurate and efficient intraframe compression. For the interframe compression, motion estimation and compensation are performed so that an object defined in one frame can be estimated in a successive frame. The motion-based estimation of the object in the successive frame requires significantly less information than a conventional block-based representation of the object. For the intraframe compression, an estimated error signal for each object is compressed to utilize the spatial correlation of the object within a frame and to allow different objects to be represented at different resolutions. Feedback loop 118 allows objects in subsequent frames to be predicted from fully decompressed objects, thereby preventing accumulation of estimation error.

Encoder process 64 provides as an output a compressed or encoded representation of a digitized video signal representing display motion in video sequences of multiple image frames. The compressed or encoded representation includes object masks 66, feature points 68, affine transform coefficients 104, and compressed error data 116. The encoded representation may be stored or transmitted, according to the particular application in which the video information is used.

FIG. 3B is a functional block diagram of a master object encoder process 130 for encoding or compressing master object 90. Function block 132 indicates that master object 90 is compressed or coded by a conventional "lossy" still image compression method such as lattice subband or other wavelet compression or discrete cosine transform (DCT) encoding. Preferably, function block 132 employs wavelet encoding.

Function block 134 indicates that the wavelet encoded master object from function block 132 is further compressed or coded by a conventional "lossless" still image compression method to form compressed master object data 136. A preferred conventional lossless still image compression method is entropy encoding.

Encoder process 130 provides as an output compressed master object 136. Together with the compressed or encoded representations provided by encoder process 64, compressed master object 136 may be decompressed or decoded after storage or transmission to obtain a video sequence of multiple image frames.

Encoder process 64 is described with reference to encoding video information corresponding to a single object within an image frame. As shown in FIGS. 2A and 2B and indicated above, encoder process 64 is performed separately for each of the objects (e.g., objects 56 and 58 of FIGS. 2A and 2B) in an image frame. Moreover, many video images include a background over which arbitrary numbers of image features or objects are rendered. Preferably, the background is processed as an object according to this invention after all user-designated objects are processed.

Processing of the objects in an image frame requires that the objects be separately identified. Preferably, encoder process 64 is applied to the objects of an image frame beginning with the forward-most object or objects and proceeding successively to the back-most object (e.g., the background). The compositing of the encoded objects into a video image preferably proceeds from the rear-most object (e.g., the background) and proceeds successively to the forward-most object (e.g., rectangular solid 56 in FIGS. 2A and 2B). The layering of encoding objects may be communicated as distinct layering data associated with the objects of an image frame or, alternatively, by transmitting or obtaining the encoded objects in a sequence corresponding to the layering or compositing sequence.

Object Segmentation and Tracking

In a preferred embodiment, the segmentation of objects within image frames referred to in function block 66 allows interactive segmentation by users. The object segmentation of this invention provides improved accuracy in segmenting objects and is relatively fast and provides users with optimal flexibility in defining objects to be segmented.

Figure 4:
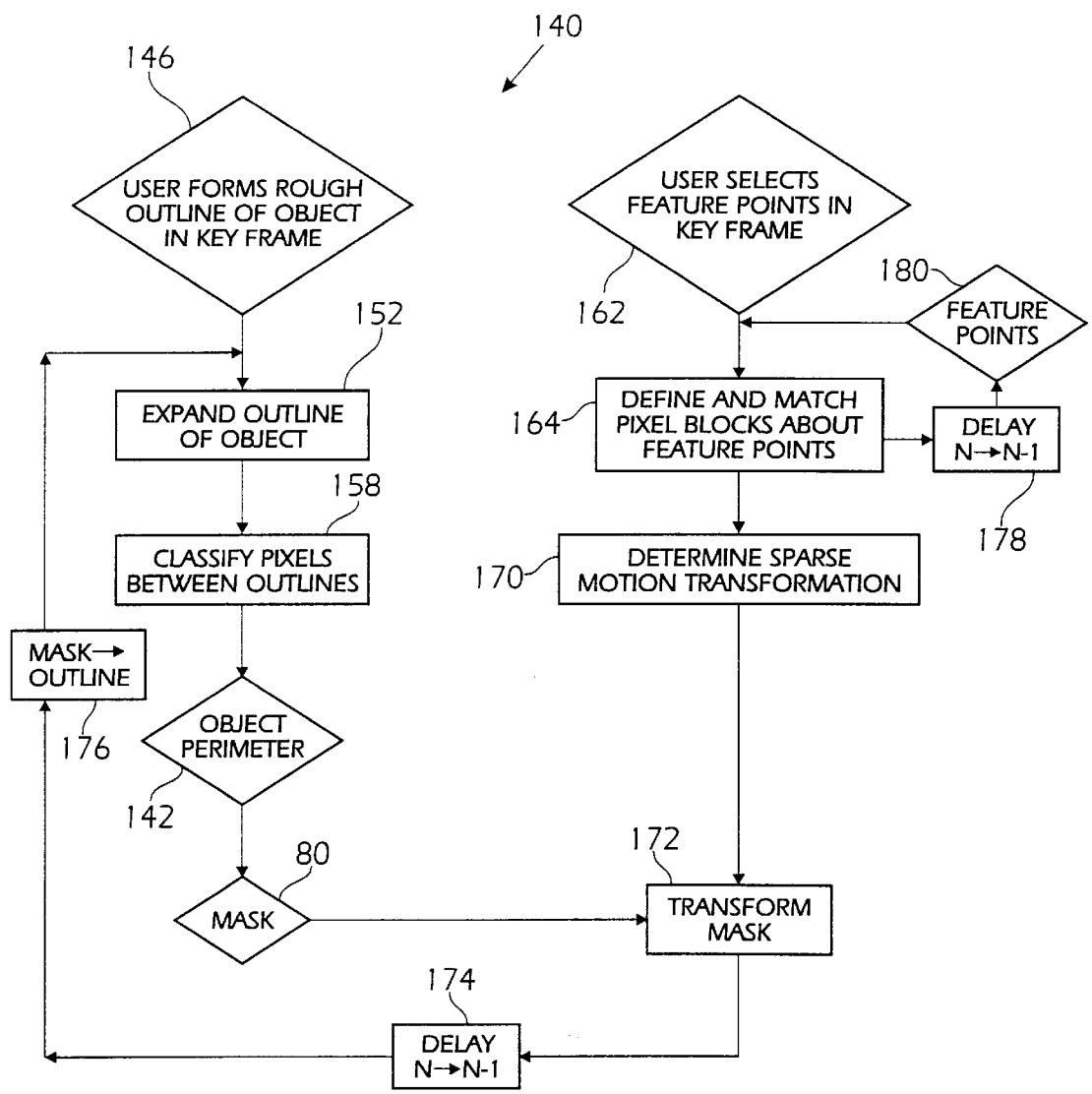
FIG. 4 is a functional block diagram of an object segmentation process for segmenting selected objects from an image frame of a video sequence.

FIG. 4 is a functional block diagram of an object segmentation process 140 for segmenting selected objects from an image frame of a video sequence. Object segmentation according to process 140 provides a perceptual grouping of objects that is accurate and quick and easy for users to define.

Figure 5A:
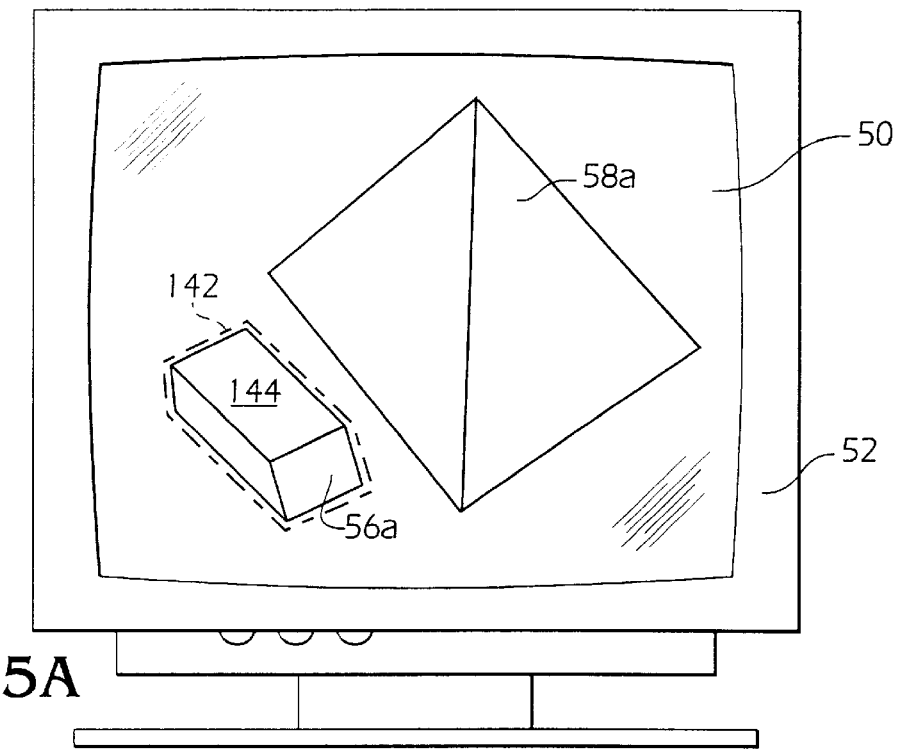
FIG. 5A is simplified representation of display screen of the video display device of FIG. 2A.
Figure 5B:
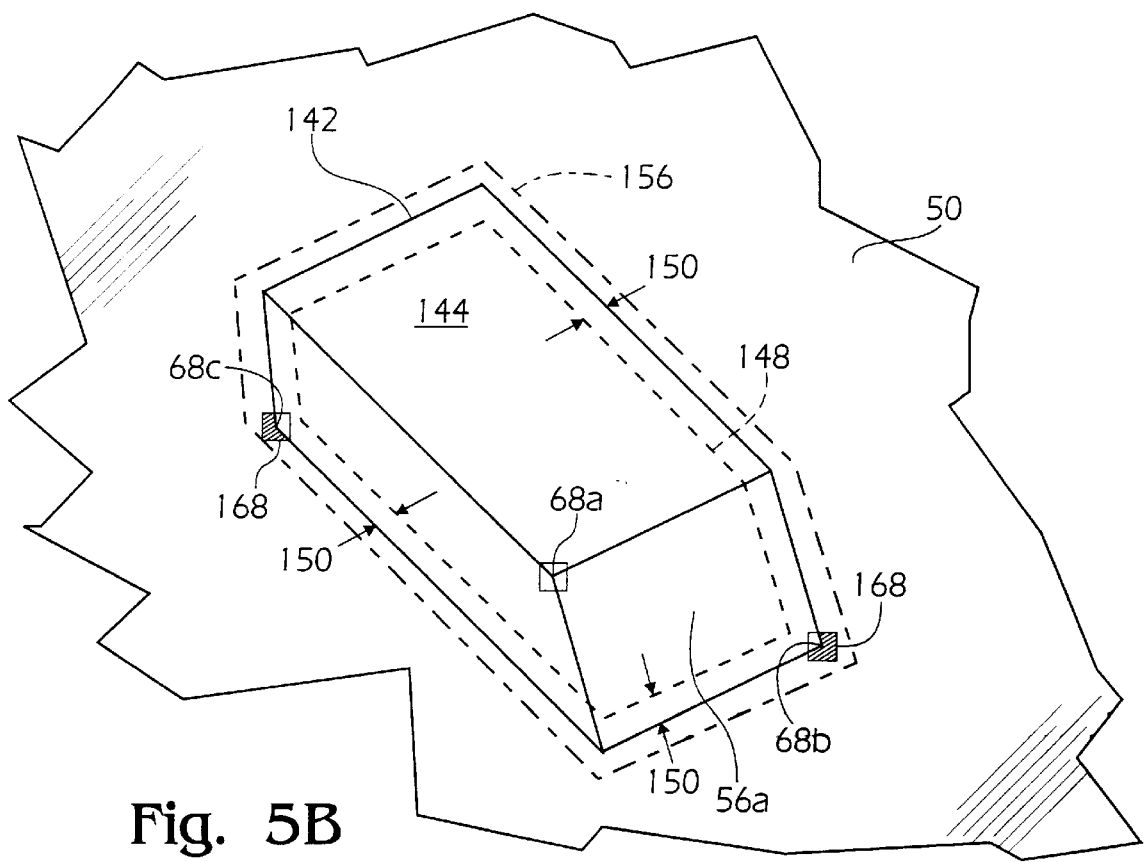
FIG. 5B is an enlarged representation of a portion of the display screen of FIG. 5A.

FIG. 5A is simplified representation of display screen 50 of video display device 52 showing image frame 54a and the segmentation of rectangular solid object 56a. In its rendering on display screen 50, rectangular solid object 56a includes an object perimeter 142 (shown spaced apart from object 56a for clarity) that bounds an object interior 144. Object interior 144 refers to the outline of object 56a on display screen 50 and in general may correspond to an inner surface or, as shown, an outer surface of the image feature. FIG. 5B is an enlarged representation of a portion of display screen 50 showing the semi-automatic segmentation of rectangular solid object 56a. The following description is made with specific reference to rectangular solid object 56a, but is similarly applicable to each object to be segmented from an image frame.

Function block 146 indicates that a user forms within object interior 144 an interior outline 148 of object perimeter 142. The user preferably forms interior outline 148 with a conventional pointer or cursor control device, such as a mouse or trackball. Interior outline 148 is formed within a nominal distance 150 from object perimeter 142. Nominal distance 150 is selected by a user to be sufficiently large that the user can form interior outline 148 relatively quickly within nominal distance 150 of perimeter 142. Nominal distance 150 corresponds, for example, to between about 4 and 10 pixels.

Function block 146 is performed in connection with a key frame of a video sequence. With reference to a scene in a conventional motion picture, for example, the key frame could be the first frame of the multiple frames in a scene. The participation of the user in this function renders object segmentation process 140 semi-automatic, but significantly increases the accuracy and flexibility with which objects are segmented. Other than for the key frame, objects in subsequent image frames are segmented automatically as described below in greater detail.

Function block 152 indicates that interior outline 148 is expanded automatically to form an exterior outline 156. The formation of exterior outline 156 is performed as a relatively simple image magnification of outline 148 so that exterior outline 156 is a user-defined number of pixels from interior outline 148. Preferably, the distance between interior outline 148 and exterior outline 156 is approximately twice distance 150.

Function block 158 indicates that pixels between interior outline 148 and exterior outline 156 are classified according to predefined attributes as to whether they are within object interior 144, thereby to identify automatically object perimeter 142 and a corresponding mask 80 of the type described with reference to FIG. 3A. Preferably, the image attributes include pixel color and position, but either attribute could be used alone or with other attributes.

In the preferred embodiment, each of the pixels in interior outline 148 and exterior outline 156 defines a "cluster center" represented as a five-dimensional vector in the form of (r, g, b, x, y). The terms r, g, and b correspond to the respective red, green, and blue color components associated with each of the pixels, and the terms x and y correspond to the pixel locations. The m-number of cluster center vectors corresponding to pixels in interior outline 148 are denoted as $\{I_0, I_1, \ldots, I_{m-1}\}$, and the n-number of cluster center vectors corresponding pixels in exterior outline 156 are denoted as $\{O_0, O_1, \ldots, O_{n-1}\}$.

Pixels between the cluster center vectors $I_i$ and $O_j$ are classified by identifying the vector to which each pixel is closest in the five-dimensional vector space. For each pixel, the absolute distance $d_i$ and $d_j$ to each of respective cluster center vectors $I_i$ and $O_j$ is computed according to the following equations:

$$d_i = w_{color}(|r-r_i|+|g-g_i|+|b-b_i|)+w_{coord}(|x-x_i|+|y-y_i|), \ 0 \leq i < m,$$

$$d_j = w_{color}(|r-r_j|+|g-g_j|+|b-b_j|)+w_{coord}(|x-x_j|+|y-y_j|), \ 0 \leq j < n,$$

in which $w_{color}$ and $w_{coord}$ are weighting factors for the respective color and pixel position information. Weighting factors $w_{color}$ and $w_{coord}$ are of values having a sum of 1 and otherwise selectable by a user. Preferably, weighting factors $w_{color}$ and $w_{coord}$ are of an equal value of 0.5. Each pixel is associated with object interior 144 or exterior according to the minimum five-dimensional distance to one of the cluster center vectors $I_i$ and $O_j$.

Function block 162 indicates that a user selects at least two, and preferable more (e.g. 4 to 6), feature points in each object of an initial or key frame. Preferably, the feature points are relatively distinctive aspects of the object. With reference to rectangular solid image feature 56, for example, corners 70a–70c could be selected as feature points.

Function block 164 indicates that a block 166 of multiple pixels centered about each selected feature point (e.g., corners 70a–70c) is defined and matched to a corresponding block in a subsequent image frame (e.g., the next successive image frame). Pixel block 166 is user defined, but preferably includes a 32×32 pixel array that includes only pixels within image interior 144. Any pixels 168 (indicated by cross-hatching) of pixel block 166 falling outside object interior 144 as determined by function block 158 (e.g., corners 70b and 70c) are omitted. Pixel blocks 166 are matched to the corresponding pixel blocks in the next image frame according to a minimum absolute error identified by a conventional block match process or a polygon match process, as described below in greater detail.

Function block 170 indicates that a sparse motion transformation of an object is determined from the corresponding feature points in two successive image frames. Function block 172 indicates that mask 80 of the current image frame is transformed according to the sparse motion transformation to provide an estimation of the mask 80 for the next image frame. Any feature point in a current frame not identified in a successive image frame is disregarded.

Function block 174 indicates that the resulting estimation of mask 80 for the next image frame is delayed by one frame, and functions as an outline 176 for a next successive cycle. Similarly, function block 178 indicates that the corresponding feature points also are delayed by one frame, and utilized as the initial feature points 180 for the next successive frame.

Polygon Match Method

Figure 6:
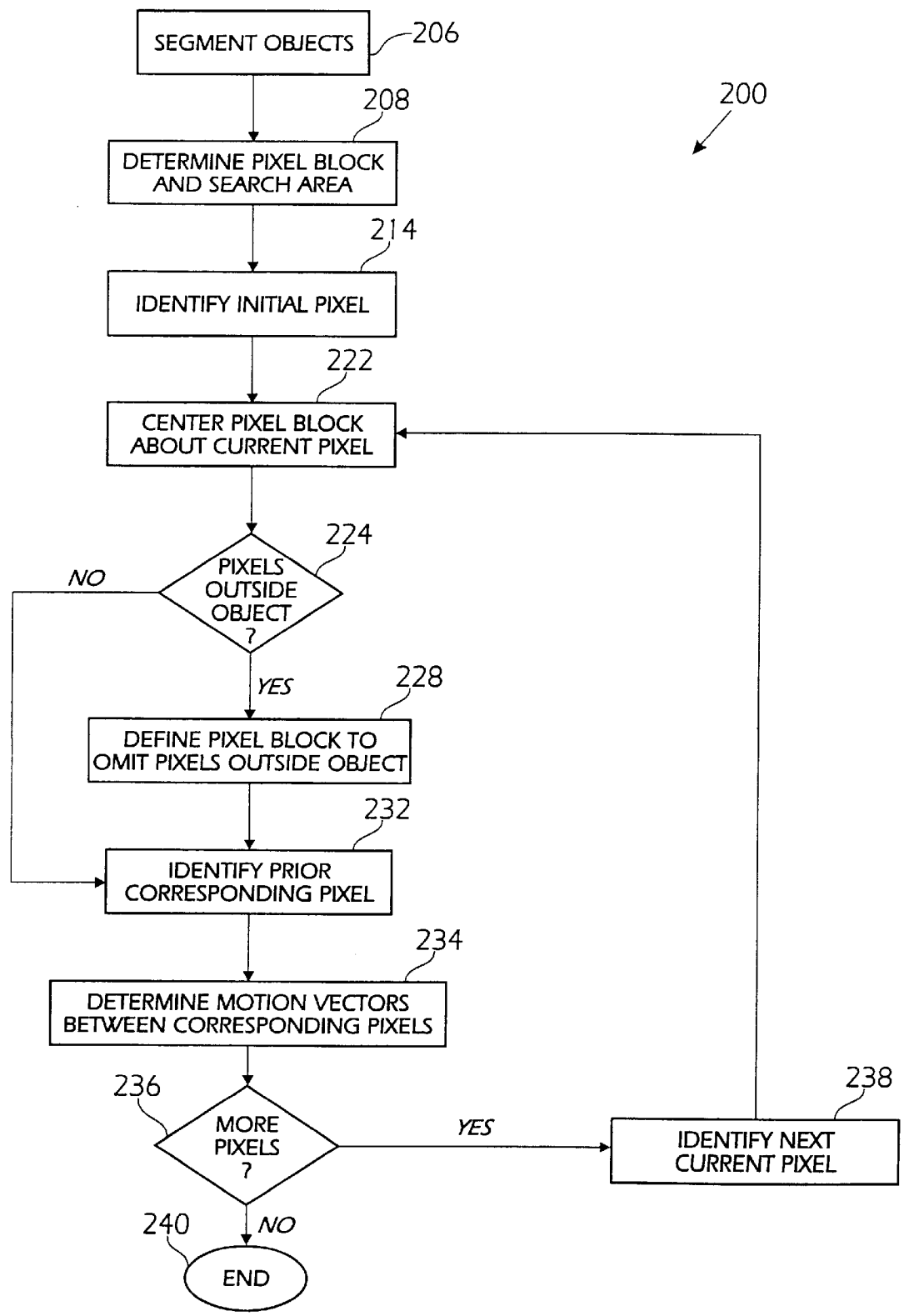
FIG. 6 is a functional block diagram of a polygon match process for determining a motion vector for corresponding pairs of pixels in corresponding objects in successive image frames.

FIG. 6 is a functional block diagram of a polygon match process 200 for determining a motion vector for each corresponding pair of pixels in successive image frames. Such a dense motion vector determination provides the basis for determining the dense motion transformations 96 of FIG. 3A.

Polygon match process 200 is capable of determining extensive motion between successive image frames like the conventional block match process. In contrast to the conventional block match process, however, polygon match process 200 maintains its accuracy for pixels located near or at an object perimeter and generates significantly less error. A preferred embodiment of polygon match method 200 has improved computational efficiency.

Figure 7A:
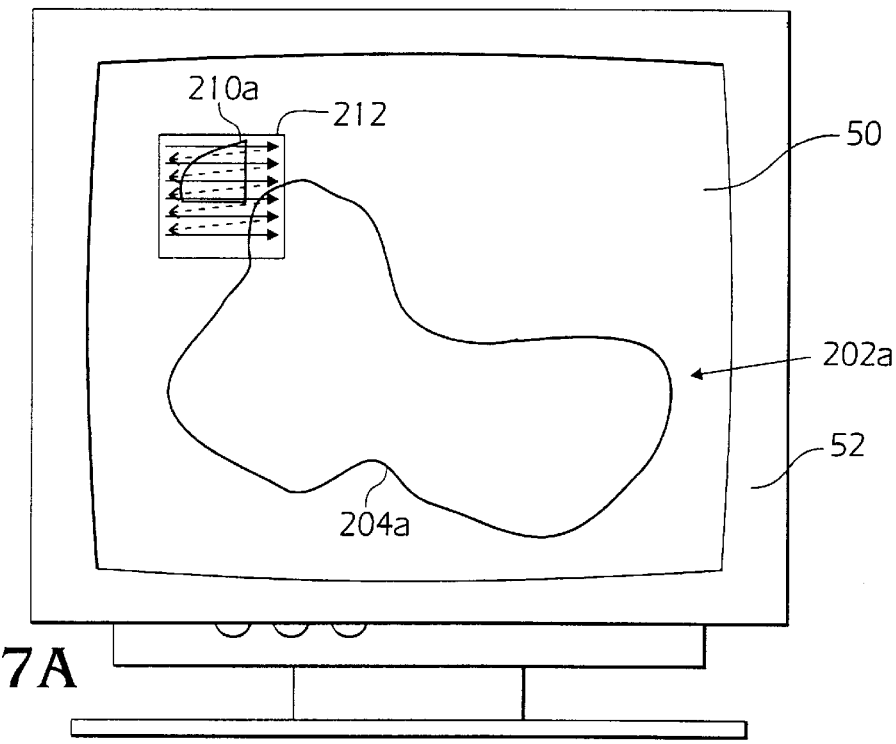
FIGS. 7A and 7B are simplified representations of a display screen showing two successive image frames with two corresponding objects.

Polygon block method 200 is described with reference to FIGS. 7A and 7B, which are simplified representations of display screen 50 showing two successive image frames 202a and 202b in which an image feature 204 is rendered as objects 204a and 204b, respectively.

Function block 206 indicates that objects 204a and 204b for image frames 202a and 202b are identified and segmented by, for example, object segmentation method 140.

Function block 208 indicates that dimensions are determined for a pixel block 210b (e.g., 15×15 pixels) to be applied to object 204b and a search area 212 about object 204a. Pixel block 210b defines a region about each pixel in object 204b for which region a corresponding pixel block 210a is identified in object 204a. Search area 212 establishes a region within which corresponding pixel block 210a is sought. Preferably, pixel block 210b and search area 212 are right regular arrays of pixels and of sizes defined by the user.

Function block 214 indicates that an initial pixel 216 in object 204b is identified and designated the current pixel. Initial pixel 216 may be defined by any of a variety of criteria such as, for example, the pixel at the location of greatest vertical extent and minimum horizontal extent. With the pixels on display screen 50 arranged according to a coordinate axis 220 as shown, initial pixel 216 may be represented as the pixel of object 214b having a maximum y-coordinate value and a minimum x-coordinate value.

Function block 222 indicates that pixel block 210b is centered at and extends about the current pixel.

Figure 7B:
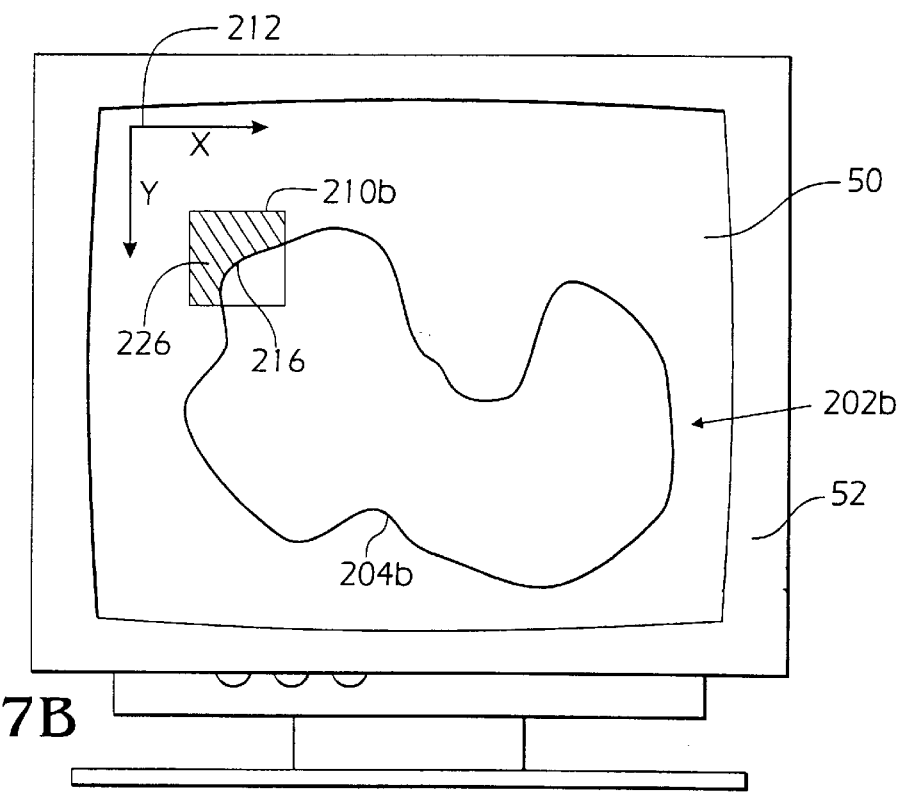

Function block 224 represents an inquiry as to whether pixel block 210b includes pixels that are not included in object 204b (e.g., pixels 226 shown by cross-hatching in FIG. 7B). This inquiry is made with reference to the objects identified according to function block 206. Whenever pixels within pixel block 210b positioned at the current pixel fall outside object 204b, function block 224 proceeds to function block 228 and otherwise proceeds to function block 232.

Function block 228 indicates that pixels of pixel block 210b falling outside object 204b (e.g., pixels 226) are omitted from the region defined by pixel block 210b so that it includes only pixels within object 204b. As a result, pixel block 210b defines a region that typically would be of a polygonal shape more complex than the originally defined square or rectangular region.

Function block 232 indicates that a pixel in object 204a is identified as corresponding to the current pixel in object 204b. The pixel in object 204a is referred to as the prior corresponding pixel. Preferably, the prior corresponding pixel is identified by forming a pixel block 210a about each pixel in search area 212 and determining a correlation between the pixel block 210a and pixel block 210b about the current pixel in object 204b. Each correlation between pixel blocks 210a and 210b may be determined, for example, by an absolute error. The prior corresponding pixel is identified by identifying the pixel block 210a in search area 212 for which the absolute error relative to pixel block 210b is minimized. A summed absolute error E for a pixel block 210a relative to pixel block 210b may be determined as:

$$E = \sum_{i=0}^{m-1} \sum_{j=0}^{n-1} (|r_{ij} - r_{ij}'| + |g_{ij} - g_{ij}'| + |b_{ij} - b_{ij}'|),$$

in which the terms $r_{ij}$, $g_{ij}$, and $b_{ij}$ correspond to the respective red, green, and blue color components associated with each of the pixels in pixel block 210b and the terms $r_{ij}'$, $g_{ij}'$, and $b_{ij}'$ correspond to the respective red, green, and blue color components associated with each of the pixels in pixel block 210a.

As set forth above, the summations for the absolute error E imply pixel blocks having pixel arrays having m×n pixel dimensions. Pixel blocks 210b of polygonal configuration are accommodated relatively simply by, for example, defining zero values for the color components of all pixels outside polygonal pixel blocks 210b.

Function block 234 indicates that a motion vector MV between each pixel in object 204b and the corresponding prior pixel in object 204a is determined. A motion vector is defined as the difference between the locations of the pixel in object 204b and the corresponding prior pixel in object 204a:

$$MV = (x_i - x_k', y_j - y_l'),$$

in which the terms $x_i$ and $y_j$ correspond to the respective x- and y-coordinate positions of the pixel in pixel block 210b, and the terms $x_k'$ and $y_l'$ correspond to the respective x- and y-coordinate positions of the corresponding prior pixel in pixel block 210a.

Function block 236 represents an inquiry as to whether object 204b includes any remaining pixels. Whenever object 204b includes remaining pixels, function block 236 proceeds to function block 238 and otherwise proceeds to end block 240.

Function block 238 indicates that a next pixel in object 204b is identified according to a predetermined format or sequence. With the initial pixel selected as described above in reference to function block 214, subsequent pixels may be defined by first identifying the next adjacent pixel in a row (i.e., of a common y-coordinate value) and, if object 204 includes no other pixels in a row, proceeding to the first or left-most pixel (i.e., of minimum x-coordinate value) in a next lower row. The pixel so identified is designated the current pixel and function block 238 returns to function block 222.

Polygon block method 200 accurately identifies corresponding pixels even if they are located at or near an object perimeter. A significant source of error in conventional block matching processes is eliminated by omitting or disregarding pixels of pixel blocks 210b falling outside object 204b. Conventional block matching processes rigidly apply a uniform pixel block configuration and are not applied with reference to a segmented object. The uniform block configurations cause significant errors for pixels adjacent the perimeter of an object because the pixels outside the object can undergo significant changes as the object moves or its background changes. With such extraneous pixel variations included in conventional block matching processes, pixels in the vicinity of an object perimeter cannot be correlated accurately with the corresponding pixels in prior image frames.

For each pixel in object 204b, a corresponding prior pixel in object 204a is identified by comparing pixel block 210b with a pixel block 210a for each of the pixels in prior object 204a. The corresponding prior pixel is the pixel in object 204a having the pixel block 210a that best correlates to pixel block 210b. If processed in a conventional manner, such a determination can require substantial computation to identify each corresponding prior pixel. To illustrate, for pixel blocks having dimensions of n×n pixels, which are significantly smaller than a search area 212 having dimensions of m×m pixels, approximately $n^2 \times m^2$ calculations are required to identify each corresponding prior pixel in the prior object 204a.

Pixel Block Correlation Process

Figure 8:
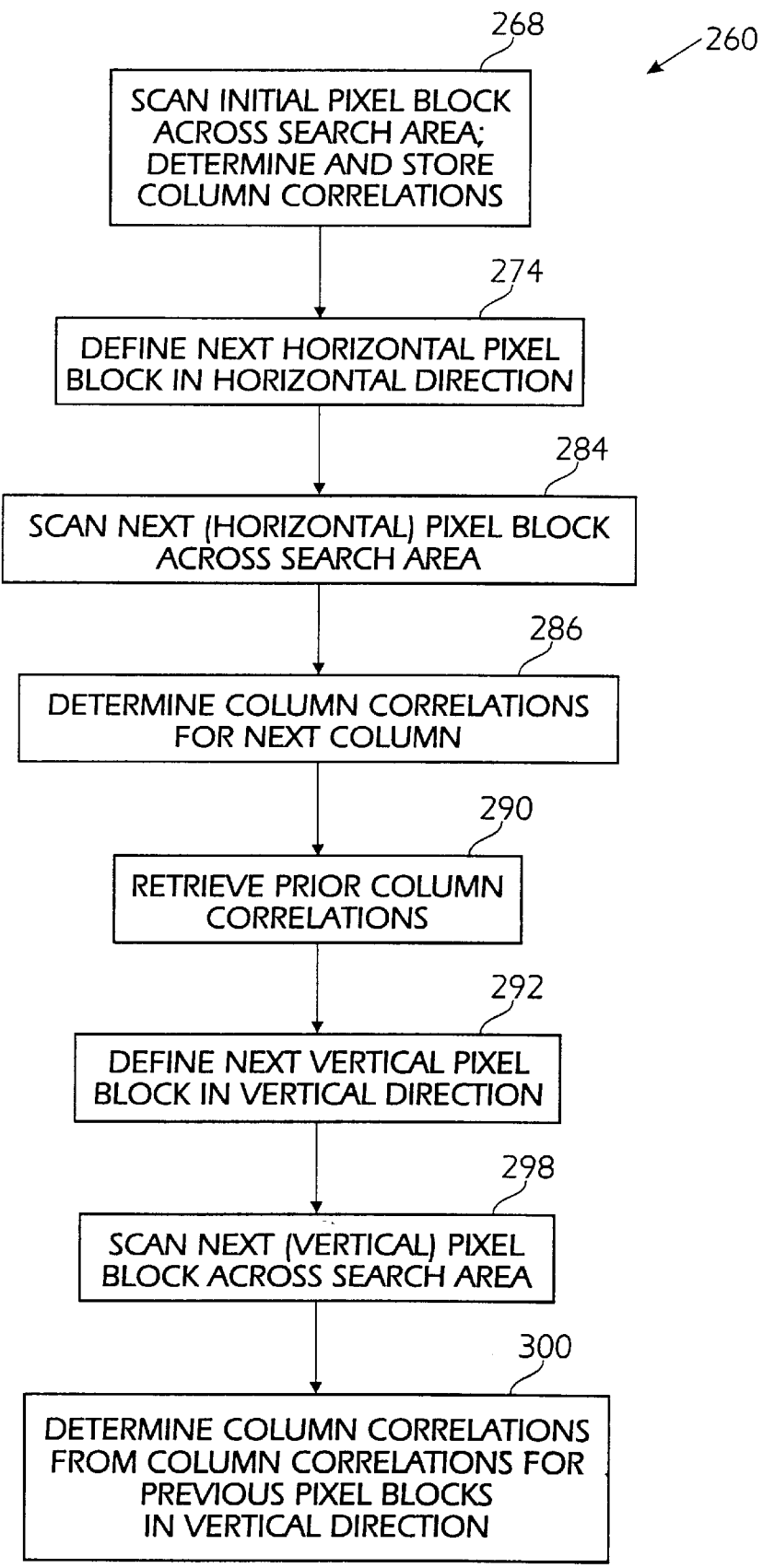
FIG. 8 is a functional block diagram of an alternative pixel block correlation process.

FIG. 8 is a functional block diagram of a modified pixel block correlation process 260 that preferably is substituted for the one described with reference to function block 232. Modified correlation process 260 utilizes redundancy inherent in correlating pixel blocks 210b and 210a to significantly reduce the number of calculations required.

Correlation process 260 is described with reference to FIGS. 9A–9G and 10A–10G, which schematically represent arbitrary groups of pixels corresponding to successive image frames 202a and 202b. In particular, FIG. 9A is a schematic representation of a pixel block 262 having dimensions of 5×5 pixels in which each letter corresponds to a different pixel. The pixels of pixel block 262 are arranged as a right regular array of pixels that includes distinct columns 264. FIG. 9B represents an array of pixels 266 having dimensions of q×q pixels and corresponding to a search area 212 in a prior image frame 202a. Each of the numerals in FIG. 9B represents a different pixel. Although described with reference to a conventional right regular pixel block 262, correlation process 260 is similarly applicable to polygonal pixel blocks of the type described with reference to polygon match process 200.

Function block 268 indicates that an initial pixel block (e.g., pixel block 262) is defined with respect to a central pixel M and scanned across a search area 212 (e.g., pixel array 266) generally in a raster pattern (partly shown in FIG. 7A) as in a conventional block match process. FIGS. 9C–9G schematically illustrate five of the approximately $q^2$ steps in the block matching process between pixel block 262 and pixel array 266.

Although the scanning of pixel block 262 across pixel array 266 is performed in a conventional manner, computations relating to the correlation between them are performed differently according to this invention. In particular, a correlation (e.g., an absolute error) is determined and stored for each column 264 of pixel block 262 in each scan position. The correlation that is determined and stored for each column 264 of pixel block 262 in each scanned position is referred to as a column correlation 270, several of which are symbolically indicated in FIGS. 9C–9G by referring to the correlated pixels. To illustrate, FIG. 9C shows a column correlation 270(1) that is determined for the single column 264 of pixel block 262 aligned with pixel array 266. Similarly, FIG. 9D shows column correlations 270(2) and 270(3) that are determined for the two columns 264 of pixel block 262 aligned with pixel array 266. FIGS. 9E–9G show similar column correlations with pixel block 262 at three exemplary subsequent scan positions relative to pixel array 266.

The scanning of initial pixel block 262 over pixel array 266 provides a stored array or database of column correlations. With pixel block 262 having r-number of columns 264, and pixel array 266 having q×q pixels, the column correlation database includes approximately $rq^2$ number of column correlations. This number of column correlations is only approximate because pixel block 262 preferably is initially scanned across pixel array 266 such that pixel M is aligned with the first row of pixels in pixel array 266.

The remaining steps beginning with the one indicated in FIG. 9C occur after two complete scans of pixel block 262 across pixel array 266 (i.e., with pixel M aligned with the first and second rows of pixel array 266).

Function block 274 indicates that a next pixel block 276 (FIG. 10A) is defined from, for example, image frame 202b with respect to a central pixel N in the same row as pixel M. Pixel block 276 includes a column 278 of pixels not included in pixel block 262 and columns 280 of pixels included in pixel block 262. Pixel block 276 does not include a column 282 (FIG. 9A) that was included in pixel block 262. Such an incremental definition of next pixel block 276 is substantially the same as that used in conventional block matching processes.

Function block 284 indicates that pixel block 276 is scanned across pixel array 266 in the manner described above with reference to function block 268. As with FIGS. 9C–9G, FIGS. 10B–10G represent the scanning of pixel block 276 across pixel array 266.

Function block 286 indicates that for column 278 a column correlation is determined and stored at each scan position. Accordingly, column correlations 288(1)–288(5) are made with respect to the scanned positions of column 278 shown in respective FIGS. 10B–10F.

Figures 10A, 10B, 10C, 10D:
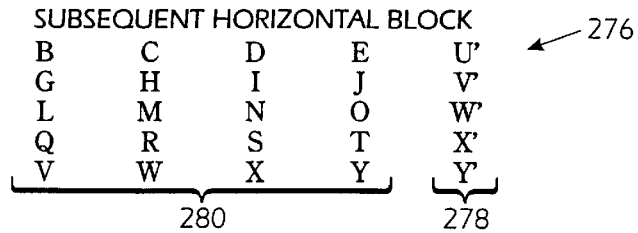

Function block 290 indicates that for each of columns 280 in pixel block 276 a stored column determination is retrieved for each scan position previously computed and stored in function block 268. For example, column correlation 270(1) of FIG. 9C is the same as column correlation 270'(1) of FIG. 10C. Similarly, column correlations 270'(2), 270'(3), 270'(5)–270'(8), and 270'(15)—270'(18) of FIGS. 10D–10F are the same as the corresponding column correlations in FIGS. 9D, 9E, and 9G. For pixel block 276, therefore, only one column correlation 288 is calculated for each scan position. As a result, the number of calculations required for pixel block 276 is reduced by nearly 80 percent.

Function block 292 indicates that a subsequent pixel block 294 (FIG. 11A) is defined with respect to a central pixel R in the next successive row relative to pixel M. Pixel block 294 includes columns 296 of pixels that are similar to but distinct from columns 264 of pixels in pixel block 262 of FIG. 9A. In particular, columns 296 include pixels A'–E' not included in columns 264. Such an incremental definition of subsequent pixel block 294 is substantially the same as that used in conventional block matching processes.

Function block 298 indicates that pixel block 294 is scanned across pixel array 266 (FIG. 9B) in the manner described above with reference to function blocks 268 and 276. FIGS. 11B–11F represent the scanning of pixel block 294 across pixel array 266.

Function block 300 indicates that a column correlation is determined and stored for each of columns 296. Accordingly, column correlations 302(1)–302(18) are made with respect to the scanned positions of columns 296 shown in FIGS. 11B–11F.

Each of column correlations 302(1)–302(18) may be calculated in an abbreviated manner with reference to column correlations made with respect to pixel block 262 (FIG. 9A).

For example, column correlations 302(4)–302(8) of FIG. 11D include subcolumn correlations 304'(4)–304'(8) that are the same as subcolumn correlations 304(4)–304(8) of FIG. 9E. Accordingly, column correlations 302(4)–302(8) may be determined from respective column correlations 270(4)–270(8) by subtracting from the latter correlation values for pixels 01A, 02B, 03C, 04D, and 05E to form subcolumn correlations 304(4)–304(8), respectively. Column correlations 302(4)–302(8) may be obtained by adding correlation values for the pixel pairs 56A', 57B', 58C', 59D' and 50E' to the respective subcolumn correlation values 304(4)–304(8), respectively.

The determination of column correlations 302(4)–302(8) from respective column correlations 270(4)–270(8) entails subtracting individual pixel correlation values corresponding to the row of pixels A–E of pixel block 262 not included in pixel block 294, and adding pixel correlation values for the row of pixels A'–E' included in pixel block 294 but not pixel block 262. This method substitutes for each of column correlations 302(4)–302(8), one substraction and one addition for the five additions that would be required to determine each column correlation in a conventional manner. With pixel blocks of larger dimensions as are preferred, the improvement of this method over conventional calculation methods is even greater. Conventional block matching processes identify only total block correlations for each scan position of initial pixel block 262 relative to pixel array 266. As a consequence, all correlation values for all pixels must be calculated separately for each scan position. In contrast, correlation process 260 utilizes stored column correlations 270 to significantly reduce the number of calculations required. The improvements in speed and processor resource requirements provided by correlation process 260 more than offset the system requirements for storing the column correlations.

It will be appreciated that correlation process 260 has been described with reference to FIGS. 9–11 to illustrate specific features of this invention. As shown in the illustrations, this invention includes recurring or cyclic features that are particularly suited to execution by a computer system. These recurring or cyclic features are dependent upon the dimensions of pixel blocks and pixel arrays and are well understood and can be implemented by persons skilled in the art.

Multi-Dimensional Transformation

Figure 12:
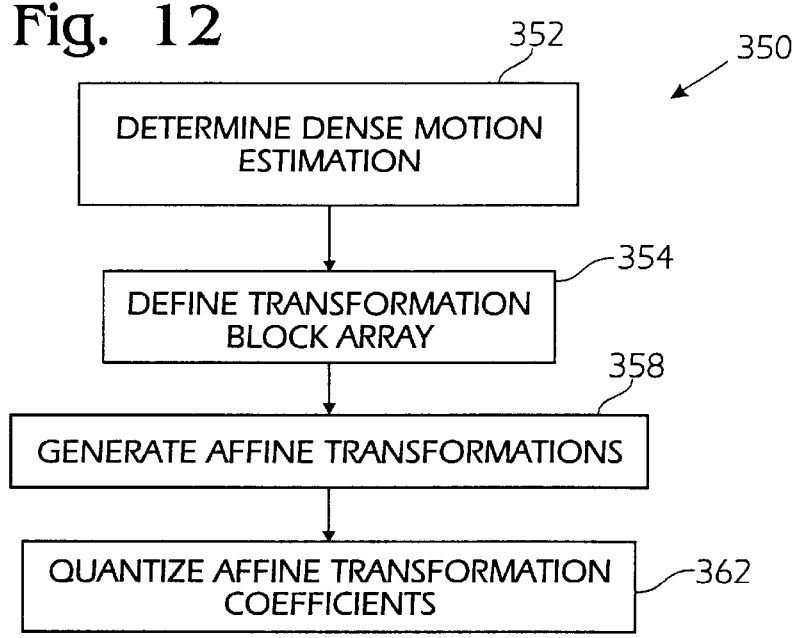
FIG. 12 is a function block diagram of a multi-dimensional transformation method that includes generating a mapping between objects in first and second successive image frames and quantitizing the mapping for transmission or storage.
Figure 13:
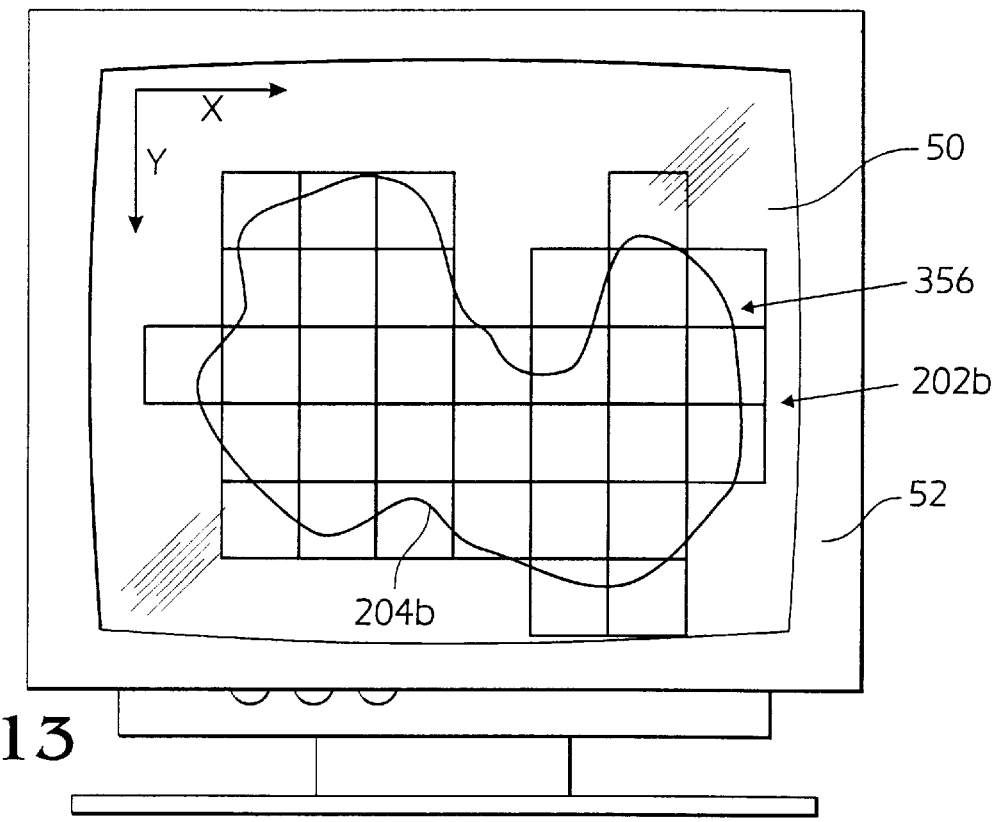
FIG. 13 is a simplified representation of a display screen showing the image frame of FIG. 7B for purposes of illustrating the multi-dimensional transformation method of FIG. 12.

FIG. 12 is a functional block diagram of a transformation method 350 that includes generating a multi-dimensional transformation between objects in first and second successive image frames and quantitizing the mapping for transmission or storage. The multi-dimensional transformation preferably is utilized in connection with function block 96 of FIG. 3. Transformation method 350 is described with reference to FIG. 7A and FIG. 13, the latter of which like FIG. 7B is a simplified representation of display screen 50 showing image frame 202b in which image feature 204 is rendered as object 204b.

Transformation method 350 preferably provides a multi-dimensional affine transformation capable of representing complex motion that includes any or all of translation, rotation, magnification, and shear. Transformation method 350 provides a significant improvement over conventional video compression methods such a MPEG-1, MPEG-2, and H.26X, which are of only one dimension and represent only translation. In this regard, the dimensionality of a transformation refers to the number of coordinates in the generalized form of the transformation, as described below in greater detail. Increasing the accuracy with which complex motion is represented according to this invention results in fewer errors than by conventional representations, thereby increasing compression efficiency.

Function block 352 indicates that a dense motion estimation of the pixels in objects 204a and 204b is determined. Preferably, the dense motion estimation is obtained by polygon match process 200. As described above, the dense motion estimation includes motion vectors between pixels at coordinates $(x_i, y_i)$ in object 204b of image frame 202b and corresponding pixels at locations $(x_i', y_i')$ of object 204a in image frame 202a.

Function block 354 indicates that an array of transformation blocks 356 is defined to encompass object 204b. Preferably, transformation blocks 356 are right regular arrays of pixels having dimensions of, for example, 32×32 pixels.

Function block 358 indicates that a multi-dimensional affine transformation is generated for each transformation block 356. Preferably, the affine transformations are of first order and represented as:

$$x_i' = ax_i + by_i + c$$

$$y_i' = dx_i + ey_i + f,$$

and are determined with reference to all pixels for which the motion vectors have a relatively high confidence. These affine transformations are of two dimensions in that $x_i$ and $y_i$ are defined relative to two coordinates: $x_i$ and $y_i$.

The relative confidence of the motion vectors refers to the accuracy with which the motion vector between corresponding pixels can be determined uniquely relative to other pixels. For example, motion vectors between particular pixels that are in relatively large pixel arrays and are uniformly colored (e.g., black) cannot typically be determined accurately. In particular, for a black pixel in a first image frame, many pixels in the pixel array of the subsequent image frame will have the same correlation (i.e., absolute value error between pixel blocks).

In contrast, pixel arrays in which pixels correspond to distinguishing features typically will have relatively high correlations for particular corresponding pixels in successive image frames.

The relatively high correlations are preferably represented as a minimal absolute value error determination for particular pixel. Motion vectors of relatively high confidence may, therefore, be determined relative to such uniquely low error values. For example, a high confidence motion vector may be defined as one in which the minimum absolute value error for the motion vector is less than the next greater error value associated with the pixel by a difference amount that is greater than a threshold difference amount. Alternatively, high confidence motion vectors may be defined with respect to the second order derivative of the absolute error values upon which the correlations are determined. A second order derivative of more than a particular value would indicate a relatively high correlation between specific corresponding pixels.

With n-number of pixels with such high-confidence motion vectors, the preferred affine transformation equations are solved with reference to n-number of corresponding pixels in image frames 202a and 202b. Images frames must include at least three corresponding pixels in image frames 202a and 202b with high confidence motion vectors to solve for the six unknown coefficients a, b, c, d, e, and f of the preferred affine transformation equations. With the preferred dimensions, each of transformation blocks 356 includes $2^{10}$ pixels of which significant numbers typically have relatively high confidence motion vectors. Accordingly, the affine transformation equations are over-determined in that a significantly greater number of pixels are available to solve for the coefficients a, b, c, d, e, and f.

The resulting n-number of equations may be represented by the linear algebraic expression:

$$\begin{bmatrix} X_0 & Y_0 & 1 \\ X_1 & Y_1 & 1 \\ X_2 & Y_2 & 1 \\ \vdots & \vdots & \vdots \\ X_{n-1} & Y_{n-1} & 1 \end{bmatrix} \begin{bmatrix} a \\ b \\ c \end{bmatrix} = \begin{bmatrix} X'_0 \\ X'_1 \\ X'_2 \\ \vdots \\ X'_{N-1} \end{bmatrix}$$

$$\begin{bmatrix} X_0 & Y_0 & 1 \\ X_1 & Y_1 & 1 \\ X_2 & Y_2 & 1 \\ \vdots & \vdots & \vdots \\ X_{n-1} & Y_{n-1} & 1 \end{bmatrix} \begin{bmatrix} d \\ e \\ f \end{bmatrix} = \begin{bmatrix} Y'_0 \\ Y'_1 \\ Y'_2 \\ \vdots \\ Y'_{N-1} \end{bmatrix}$$

Preferably these equations are solved by a conventional singular value decomposition (SVD) method, which provides a minimal least-square error for the approximation of the dense motion vectors. A conventional SVD method is described, for example, in *Numerical Recipes in C*, by Press et al., Cambridge University Press, (1992).

As described above, the preferred two-dimensional affine transformation equations are capable of representing translation, rotation, magnification, and shear of transformation blocks 356 between successive image frames 202a and 202b. In contrast, conventional motion transformation methods used in prior compression standards employ simplified transformation equations of the form:

$x_i'=x_i+g$ $y_i'=y_i+h$

The prior simplified transformation equations represent motion by only two coefficients, g and h, which represents only one-third the amount of information (i.e., coefficients) obtained by the preferred multi-dimensional transformation equations. To obtain superior compression of the information obtained by transformation method 350 relative to conventional compression methods, the dimensions of transformation block 356 preferably are more than three times larger than the corresponding 16×16 pixel blocks employed in MPEG-1 and MPEG-2 compression methods. The preferred 32×32 pixel dimensions of transformation blocks 356 encompass four times the number of pixels employed in the transformation blocks of conventional transformation methods. The larger dimensions of transformation blocks 356, together with the improved accuracy with which the affine transformation coefficients represent motion of the transformation blocks 356, allow transformation method 350 to provide greater compression than conventional compression methods.

It will be appreciated that the affine coefficients generated according to the present invention typically would be non-integer, floating point values that could be difficult to compress adequately without adversely affecting their accuracy. Accordingly, it is preferable to quantize the affine transformation coefficient to reduce the bandwidth required to store or transmit them.

Figure 14:
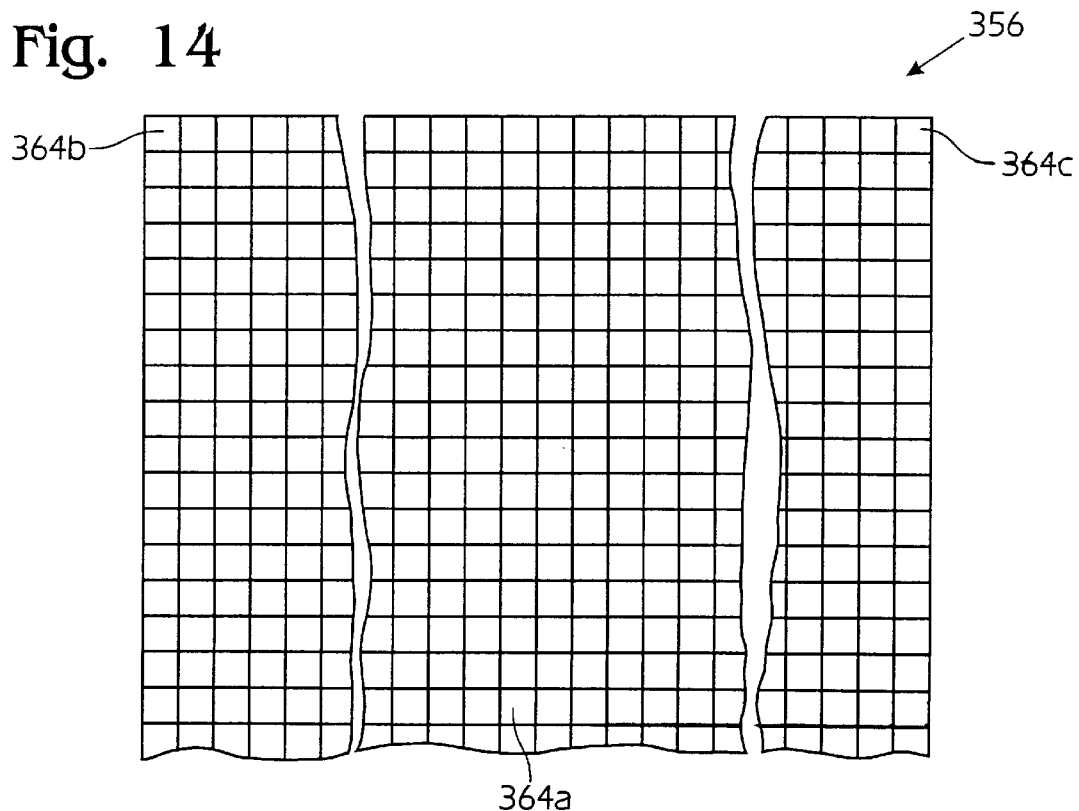
FIG. 14 is an enlarged simplified representation showing three selected pixels of a transformation block used in the quantization of affine transformation coefficients determined by the method of FIG. 12.

Function block 362 indicates that the affine transformation coefficients generated with reference to function block 358 are quantized to reduce the bandwidth required to store or transmit them. FIG. 14 is an enlarged fragmentary representation of a transformation block 356 showing three selected pixels, 364a, 364b, and 364c from which the six preferred affine transformation coefficients a–f may be determined.

Pixels 364a–364c are represented as pixel coordinates $(x_1, y_1)$, $(x_2, y_2)$, and $(x_3, y_3)$, respectively. Based upon the dense motion estimation of function block 352, pixels 364a–364c have respective corresponding pixels $(x_1', y_1')$, $(y_2', y_2')$, $(x_3', y_3')$ in preceding image frame 202a. As is conventional, pixel locations $(x_i, y_i)$ are represented by integer values and are solutions to the affine transformation equations upon which the preferred affine transformation coefficients are based. Accordingly, selected pixels 364a–364c are used to calculate the corresponding pixels from the preceding image frame 202a, which typically will be floating point values.

Quantization of these floating point values is performed by converting to integer format the difference between corresponding pixels $(x_i-x_i', y_i-y_i')$. The affine transformation coefficients are determined by first calculating the pixel values $(x_i', y_i')$ from the difference vectors and the pixel values $(x_i, y_i)$, and then solving the multi-dimensional transformation equations of function block 358 with respect to the pixel values $(x_i', y_i')$.

As shown in FIG. 14, pixels 364a–364c preferably are distributed about transformation block 356 to minimize the sensitivity of the quantization to local variations within transformation block 356. Preferably, pixel 364a is positioned at or adjacent the center of transformation block 356, and pixels 364b and 364c are positioned at upper corners. Also in the preferred embodiment, the selected pixels for each of the transformation blocks 356 in object 204b have the same positions, thereby allowing the quantization process to be performed efficiently.

Another aspect of the quantization method of function block 362 is that different levels of quantization may be used to represent varying degrees of motion. As a result, relatively simple motion (e.g., translation) may be represented by fewer selected pixels 364 than are required to represent complex motion. With respect to the affine transformation equations described above, pixel 364a $(x_1, y_1)$ from object 204b and the corresponding pixel $(x_1', y_1')$ from object 204a are sufficient to solve simplified affine transformation equations of the form:

$x_1'=y_1+c$ $y_1'=y_1+f,$ which represent translation between successive image frames. Pixel 364a specifically is used because its central position generally represents translational motion independent of the other types of motion. Accordingly, a user may selectively represent simplified motion such as translation with simplified affine transformation equations that require one-third the data required to represent complex motion.

Similarly, a pair of selected pixels $(x_1, y_1)$ (e.g., pixel 364a) and $(x_2, y_2)$ (i.e., either of pixels 364b and 364c) from object 204b and the corresponding pixels $(x_1', y_1')$ and $(x_2', y_2')$ from object 204a are sufficient to solve simplified affine transformation equations of the form:

$$x_i' = ax_i + c$$

$$y_i' = ey_i + f,$$

which are capable of representing motions that include translation and magnification between successive image frames. In the simplified form:

$$x' = a\cos\theta x + \sin\theta y + c$$

$$y' = -\sin\theta x + a\cos\theta y + f$$

the corresponding pairs of selected pixels are capable of representing motions that include translation, rotation, and isotropic magnification. In this simplified form, the common coefficients of the x and y variables allow the equations to be solved by two corresponding pairs of pixels.

Accordingly, a user may selectively represent moderately complex motion that includes translation, rotation, and magnification with partly simplified affine transformation equations. Such equations would require two-thirds the data required to represent complex motion. Adding the third selected pixel $(x_3, y_3)$ from object 204b, the corresponding pixel $(x_3', y_3')$ from object 204a, and the complete preferred affine transformation equations allows a user also to represent shear between successive image frames.

A preferred embodiment of transformation method 350 (FIG. 12) is described as using uniform transformation blocks 356 having dimensions of, for example, 32×32 pixels. The preferred multi-dimensional affine transformations described with reference to function block 358 are determined with reference to transformation blocks 356. It will be appreciated that the dimensions of transformation blocks 356 directly affect the compression ratio provided by this method.

Fewer transformation blocks 356 of relatively large dimensions are required to represent transformations of an object between image frames than the number of transformation blocks 356 having smaller dimensions. A consequence of uniformly large transformation blocks 356 is that correspondingly greater error can be introduced for each transformation block. Accordingly, uniformly sized transformation blocks 356 typically have moderate dimensions to balance these conflicting performance constraints.

Transformation Block Optimization

Figure 16:
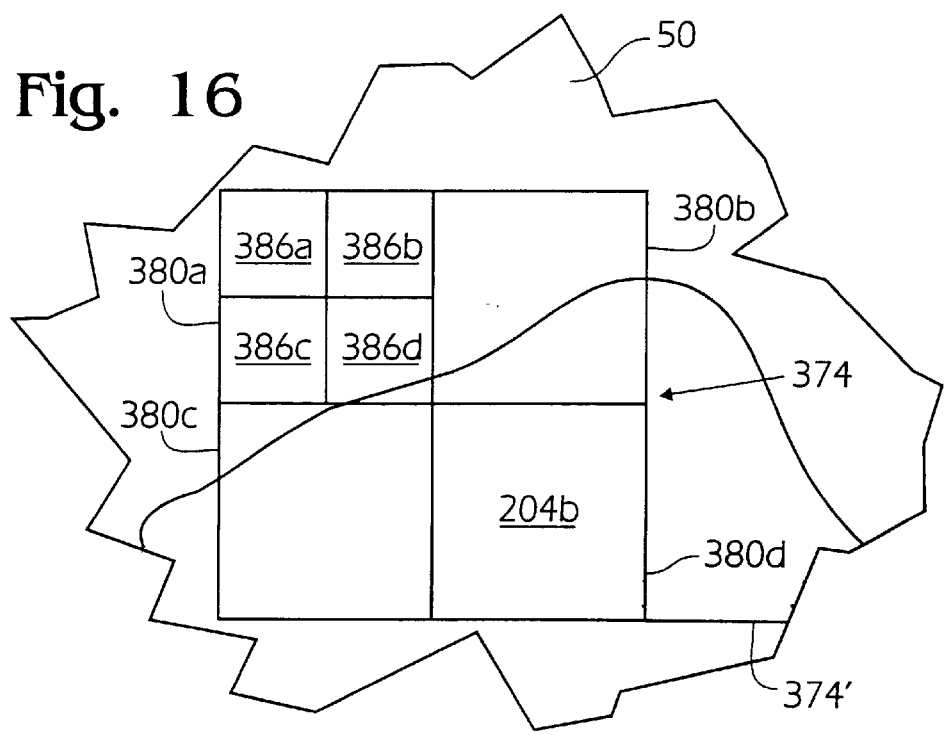
FIG. 16 is a simplified fragmentary representation of a display screen showing the image frame of FIG. 7B for purposes of illustrating the transformation block optimization method of FIG. 15.
Figure 15:
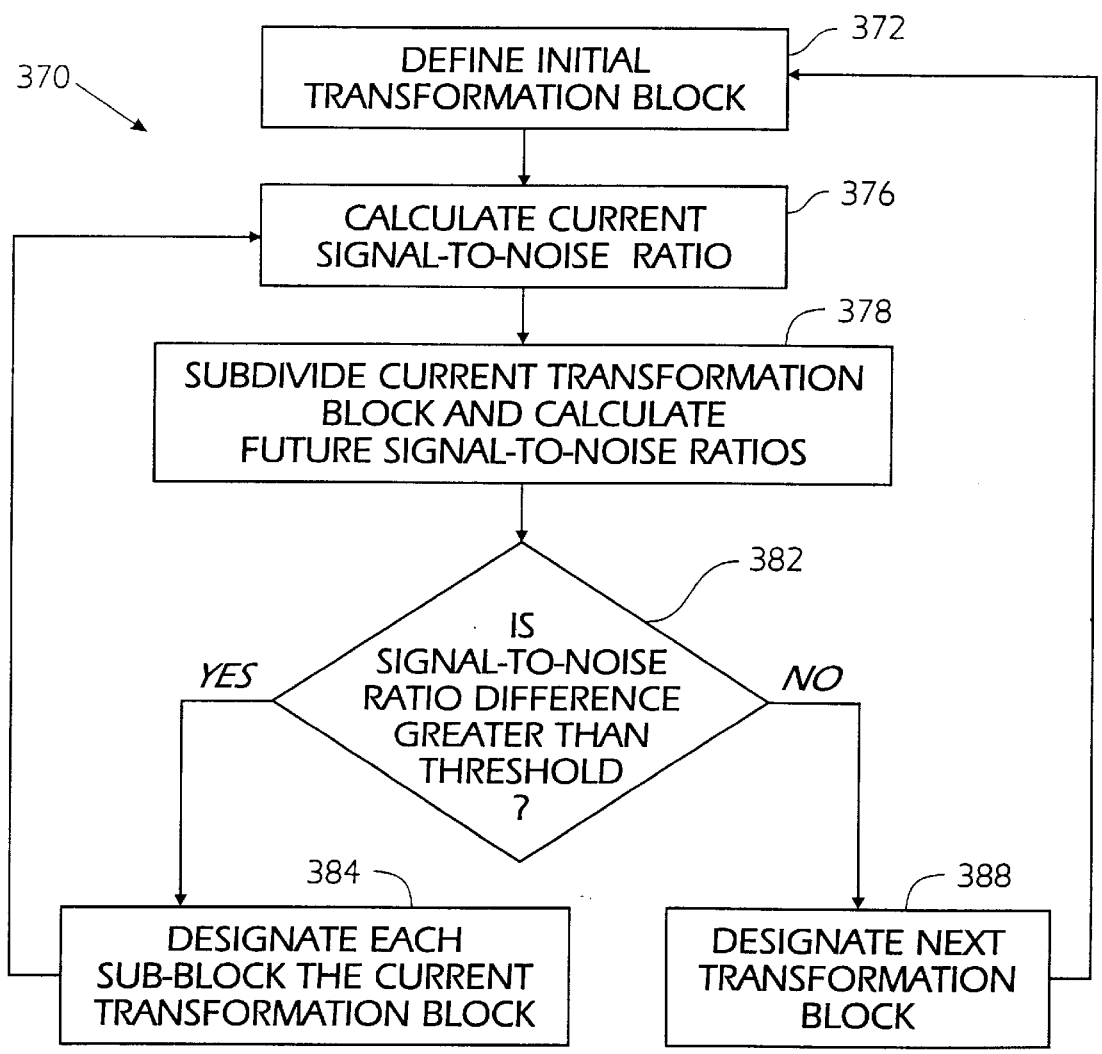
FIG. 15 is a functional block diagram of a transformation block optimization method utilized in an alternative embodiment of the multi-dimensional transformation method of FIG. 12.

FIG. 15 is a functional block diagram of a transformation block optimization method 370 that automatically selects transformation block dimensions that provide a minimal error threshold. Optimization method 370 is described with reference to FIG. 16, which is a simplified representation of display screen 50 showing a portion of image frame 202b with object 204b.

Function block 372 indicates that an initial transformation block 374 is defined with respect to object 204b. Initial transformation block 374 preferably is of maximal dimensions that are selectable by a user and are, for example, 64×64 pixels. Initial transformation block 374 is designated the current transformation block.

Function block 376 indicates that a current peak signal-to-noise ratio (SNR) is calculated with respect to the current transformation block. The signal-to-noise ratio preferably is calculated as the ratio of the variance of the color component values of the pixel within the current transformation block (i.e., the signal) to the variance of the color components values of the pixels associated with estimated error 110 (FIG. 3).

Function block 378 indicates that the current transformation block (e.g., transformation block 374) is subdivided into, for example, four equal sub-blocks 380a–380d, affine transformations are determined for each of sub-blocks 380a–380d, and a future signal-to-noise ratio is determined with respect to the affine transformations. The future signal-to-noise ratio is calculated in substantially the same manner as the current signal-to-noise ratio described with reference to function block 376.

Inquiry block 382 represents an inquiry as to whether the future signal-to-noise ratio is greater than the current signal-to-noise ratio by more than a user-selected threshold amount. This inquiry represents a determination that further subdivision of the current transformation block (e.g., transformation block 374) would improve the accuracy of the affine transformations by at least the threshold amount. Whenever the future signal-to-noise ratio is greater than the current signal-to-noise ratio by more than the threshold amount, inquiry block 382 proceeds to function block 384, and otherwise proceeds to function block 388.

Function block 384 indicates that sub-blocks 380a–380d are successively designated the current transformation block, and each are analyzed whether to be further subdivided. For purposes of illustration, sub-block 380a is designated the current transformation and processed according to function block 376 and further sub-divided into sub-blocks 386a–386d. Function block 388 indicates that a next successive transformation block 374' is identified and designated an initial or current transformation block.

Precompression Extrapolation Method

Figure 17B:
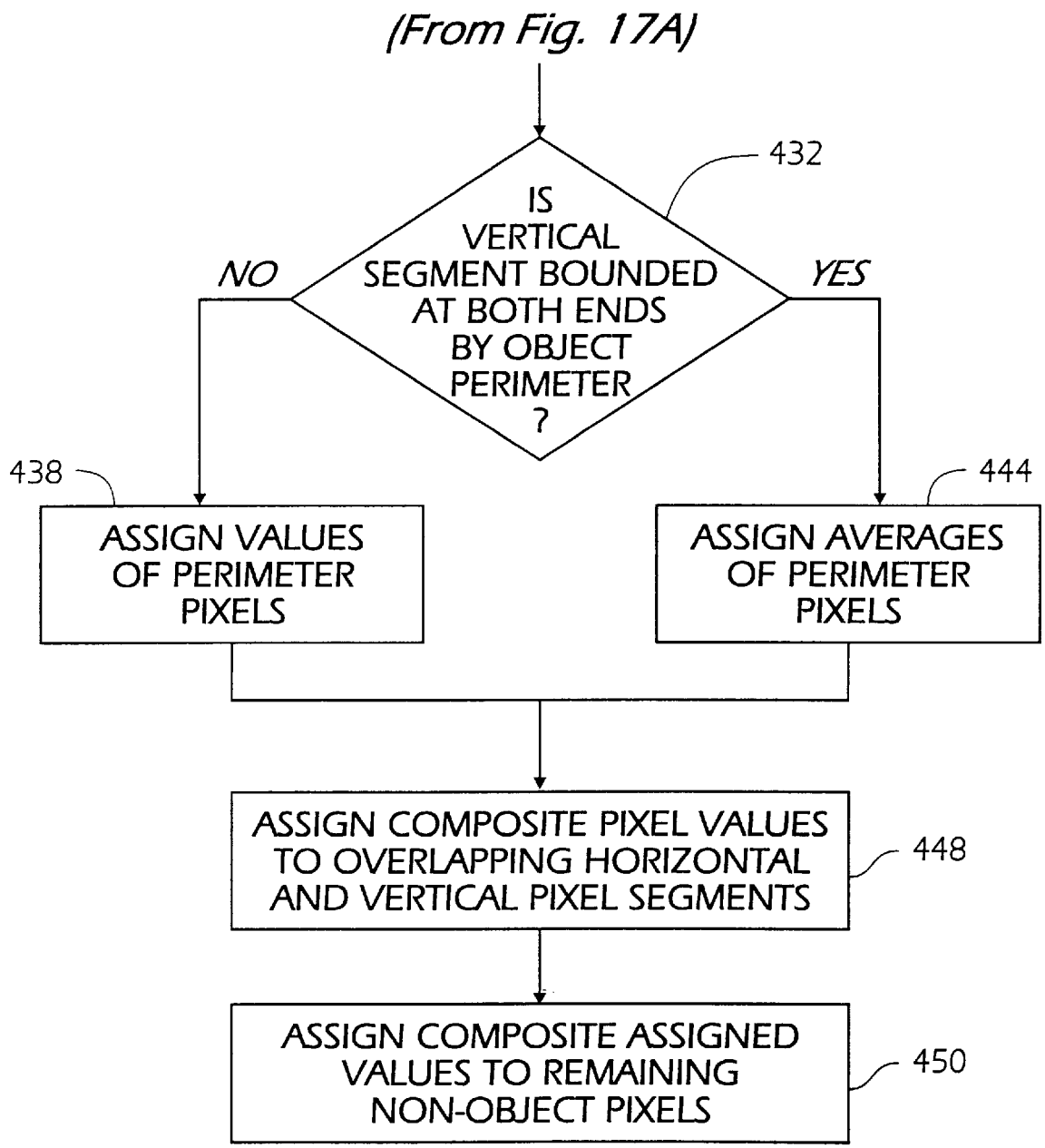

FIGS. 17A and B are a functional block diagram of a precompression extrapolation method 400 for extrapolating image features of arbitrary configuration to a predefined configuration to facilitate compression in accordance with function block 112 of encoder process 64 (both of FIG. 3). Extrapolation method 400 allows the compression of function block 112 to be performed in a conventional manner such as DCT or lattice or other wavelet compression, as described above.

Conventional still image compression methods such as lattice or other wavelet compression or discrete cosine transforms (DCT) operate upon rectangular arrays of pixels. As described above, however, the methods of the present invention are applicable to image features or objects of arbitrary configuration. Extrapolating such objects or image features to a rectangular pixel array configuration allows use of conventional still image compression methods such as lattice or other wavelet compression or DCT. Extrapolation method 400 is described below with reference to FIGS. 18A–18D, which are representations of display screen 50 on which a simple object 402 is rendered to show various aspects of extrapolation method 400.

Figure 18A:
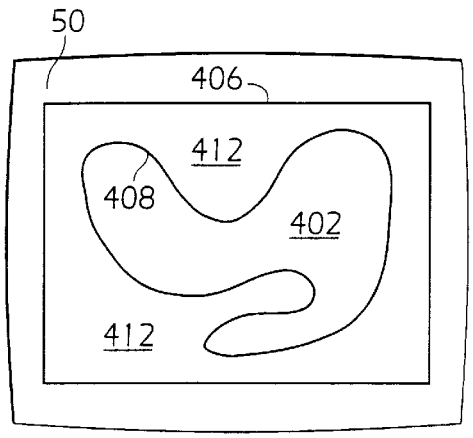
FIGS. 18A–18D are representations of a display screen on which a simple object is rendered to show various aspects of the extrapolation method of FIG. 14.

Function block 404 indicates that an extrapolation block boundary 406 is defined about object 402. Extrapolation block boundary 406 preferably is rectangular. Referring to FIG. 18A, the formation of extrapolation block boundary 406 about object 402 is based upon an identification of a perimeter 408 of object 402 by, for example, object segmentation method 140 (FIG. 4). Extrapolation block boundary 406 is shown encompassing object 402 in its entirety for purposes of illustration. It will be appreciated that extrapolation block boundary 406 could alternatively encompass only a portion of object 402. As described with reference to object segmentation method 140, pixels included in object 402 have color component values that differ from those of pixels not included in object 402.

Function block 410 indicates that all pixels 412 bounded by extrapolation block boundary 406 and not included in object 402 are assigned a predefined value such as, for example, a zero value for each of the color components.

Function block 414 indicates that horizontal lines of pixels within extrapolation block boundary 406 are scanned to identify horizontal lines with horizontal pixel segments having both zero and non-zero color component values.

Figure 18B:
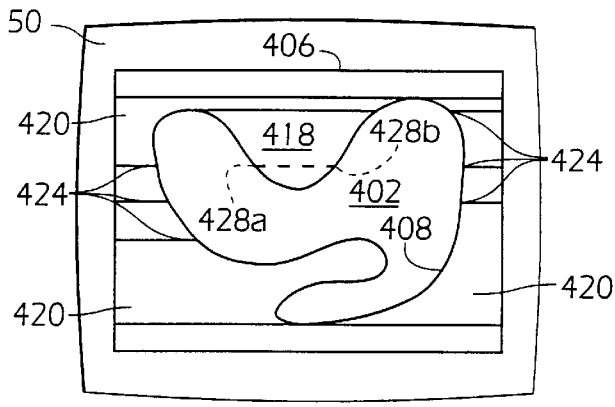

Function block 416 represents an inquiry as to whether the horizontal pixel segments having color component values of zero are bounded at both ends by perimeter 408 of object 402. Referring to FIG. 18B, region 418 represents horizontal pixel segments having color component values of zero that are bounded at both ends by perimeter 408. Regions 420 represent horizontal pixel segments that have color component values of zero and are bounded at only one end by perimeter 408. Function block 416 proceeds to function block 426 for regions 418 in which the pixel segments have color component values of zero bounded at both ends by perimeter 408 of object 402, and otherwise proceeds to function block 422.

Function block 422 indicates that the pixels in each horizontal pixel segment of a region 420 is assigned the color component values of a pixel 424 (only exemplary ones shown) in the corresponding horizontal lines and perimeter 408 of object 402. Alternatively, the color component values assigned to the pixels in regions 420 are functionally related to the color component values of pixels 424.

Function block 426 indicates that the pixels in each horizontal pixel segment in region 418 are assigned color component values corresponding to, and preferably equal to, an average of the color component values of pixels 428a and 428b that are in the corresponding horizontal lines and on perimeter 408.

Function block 430 indicates that vertical lines of pixels within extrapolation block boundary 406 are scanned to identify vertical lines with vertical pixel segments having both zero and non-zero color component values.

Figure 18C:
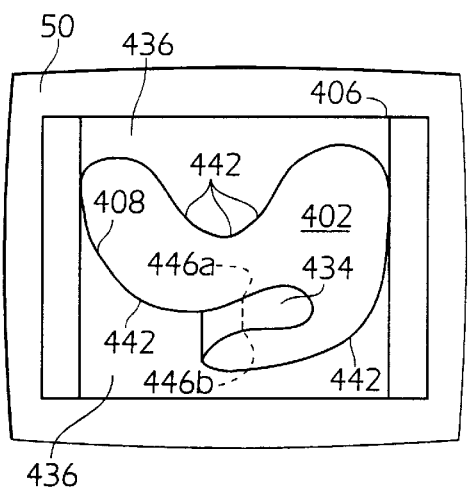

Function block 432 represents an inquiry as to whether the vertical pixel segments in vertical lines having color component values of zero are bounded at both ends by perimeter 408 of object 402. Referring to FIG. 18C, region 434 represents vertical pixel segments having color component values of zero that are bounded at both ends by perimeter 408. Regions 436 represent vertical pixel segments that have color component values of zero and are bounded at only one end by perimeter 408. Function block 432 proceeds to function block 444 for region 434 in which the vertical pixel segments have color component values of zero bounded at both ends by perimeter 408 of object 402, and otherwise proceeds to function block 438.

Function block 438 indicates that the pixels in each vertical pixel segment of region 436 are assigned the color component values of pixels 442 (only exemplary ones shown) in the vertical lines and perimeter 408 of object 402. Alternatively, the color component values assigned to the pixels in region 436 are functionally related to the color component values of pixels 442.

Function block 444 indicates that the pixels in each vertical pixel segment in region 434 are assigned color component values corresponding to, and preferably equal to, an average of the color component values of pixels 446a and 446b that are in the horizontal lines and on perimeter 408.

Function block 448 indicates that pixels that are in both horizontal and vertical pixel segments that are assigned color component values according to this method are assigned composite color component values that relate to, and preferably are the average of, the color component values otherwise assigned to the pixels according to their horizontal and vertical pixel segments.

Examples of pixels assigned such composite color component values are those pixels in regions 418 and 434.

Figure 18D:
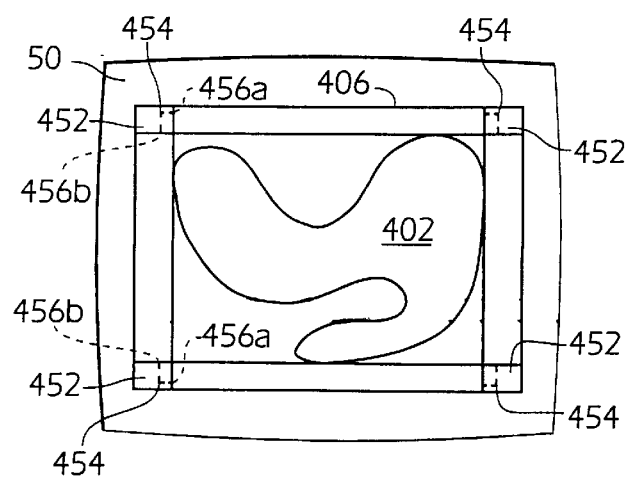

Function block 450 indicates that regions 452 of pixels bounded by extrapolation block boundary 406 and not intersecting perimeter 408 of object 402 along a horizontal or vertical line are assigned composite color component values that are related to, and preferably equal to the average of, the color component values assigned to adjacent pixels. Referring to FIG. 18D, each of pixels 454 in regions 452 is assigned a color component value that preferably is the average of the color component values of pixels 456a and 456b that are aligned with pixel 454 along respective horizontal and vertical lines and have non-zero color component values previously assigned by this method.

A benefit of object extrapolation process 400 is that is assigns smoothly varying color component values to pixels not included in object 402 and therefore optimizes the compression capabilities and accuracy of conventional still image compression methods. In contrast, prior art zero padding or mirror image methods, as described by Chang et al., "Transform Coding of Arbitrarily-Shaped Image Segments," ACM Multimedia, pp. 83–88, June, 1993, apply compression to extrapolated objects that are filled with pixels having zero color components values such as those applied in function block 410. The drastic image change than occurs between an object and the zero-padded regions introduces high frequency changes that are difficult to compress or introduce image artifacts upon compression. Object extrapolation method 400 overcomes such disadvantages.

Alternative Encoder Method

FIG. 19A is a functional block diagram of an encoder method 500 that employs a Laplacian pyramid encoder with unique filters that maintain nonlinear aspects of image features, such as edges, while also providing high compression. Conventional Laplacian pyramid encoders are described, for example, in the Laplacian Pyramid as a Compact Image Code by Burt and Addleson, IEEE Trans. Comm., Vol. 31, No. 4, pp. 532–540, April 1983. Encoder method 500 is capable of providing the encoding described with reference to function block 112 of video compression encoder process 64 shown in FIG. 3, as well as whenever else DCT on wavelet encoding is suggested or used. By way of example, encoder method 500 is described with reference to encoding of estimated error 110 (FIG. 3).

A first decimation filter 502 receives pixel information corresponding to an estimated error 110 (FIG. 3) and filters the pixels according to a filter criterion. In a conventional Laplacian pyramid method, the decimation filter is a low-pass filter such as a Gaussian weighting function. In accordance with encoder method 500, however, decimation filter 502 preferably employs a median filter and, more specifically, a 3×3 nonseparable median filter.

To illustrate, FIG. 20A is a simplified representation of the color component values for one color component (e.g., red) for an arbitrary set or array of pixels 504. Although described with particular reference to red color component values, this illustration is similarly applied to the green and blue color component values of pixels 504.

With reference to the preferred embodiment of decimation filter 502, filter blocks 506 having dimensions of 3×3 pixels are defined among pixels 504. For each pixel block 506, the median pixel intensity value is identified or selected. With reference to pixel blocks 506a–506c, for example, decimation filter 502 provides the respective values of 8, 9, and 10, which are listed as the first three pixels 512 in FIG. 20B.

It will be appreciated, however, that decimation filter 502 could employ other median filters according to this invention. Accordingly, for each group of pixels having associated color component values of $\{a_0, a_1, \ldots, a_{n-1}\}$ the median filter would select a median value $a_M$.

A first 2×2 down sampling filter 514 samples alternate pixels 512 in vertical and horizontal directions to provide additional compression. FIG. 20C represents a resulting compressed set of pixels 515.

A 2×2 up sample filter 516 inserts a pixel of zero value in place of each pixel 512 omitted by down sampling filter 514, and interpolation filter 518 assigns to the zero-value pixel a pixel value of an average of the opposed adjacent pixels, or a previous assigned value if the zero-value pixel is not between an opposed pair of non-zero value pixels. To illustrate, FIG. 20D represents a resulting set or array of value pixels 520.

A difference 522 is taken between the color component values of the set of pixels 504 and the corresponding color component values for set of pixels 520 to form a zero-order image component $I_0$.

A second decimation filter 526 receives color component values corresponding to the compressed set of pixels 515 generated by first 2×2 down sampling filter 514. Decimation filter 526 preferably is the same as decimation filter 502 (e.g., a 3×3 nonseparable median filter). Accordingly, decimation filter 526 functions in the same manner as decimation filter 502 and delivers a resulting compressed set or array of pixels (not shown) to a second 2×2 down sampling filter 528.

Down sampling filter 528 functions in the same manner as down sampling filter 514 and forms a second order image component $L_2$ that also is delivered to a 2×2 up sample filter 530 and an interpolation filter 531 that function in the same manner as up sample filter 516 and interpolation filter 518, respectively. A difference 532 is taken between the color component values of the set of pixels 515 and the resulting color component values provided by interpolation filter 531 to form a first-order image component $I_1$.

The image components $I_0$, $I_1$, and $L_2$ are respective $$n \times n, \frac{n}{2} \times \frac{n}{2}, \frac{n}{4} \times \frac{n}{4}$$

sets of color component values that represent the color component values for an n×n array of pixels 504.

Image component $I_0$ maintains the high frequency components (e.g., edges) of an image represented by the original set of pixel 504. Image components $I_1$ and $L_2$ represent low frequency aspects of the original image. Image components $I_0$, $I_1$ and $L_2$ provide relative compression of the original image. Image component $I_0$ and $I_1$ maintain high frequency features (e.g., edges) in a format that is highly compressible due to the relatively high correlation between the values of adjacent pixels. Image component $L_2$ is not readily compressible because it includes primarily low frequency image features, but is a set of relatively small size.

FIG. 19B is a functional block diagram of a decoder method 536 that decodes or inverse encodes image components $I_0$, $I_1$, and $L_2$ generated by encoder method 500. Decoder method 536 includes a first 2×2 up sample filter 538 that receives image component $L_2$ and interposes a pixel of zero value between each adjacent pair of pixels. An interpolation filter 539 assigns to the zero-value pixel a pixel value that preferably is an average of the values of the adjacent pixels, or a previous assigned value if the zero-value pixel is not between an opposed pair of non-zero-value pixels. First 2×2 up sample filter 538 operates in substantially the same manner as up sample filters 516 and 530 of FIG. 19A, and interpolation filter 539 operates in substantially the same manner as interpolation filters 518 and 531.

A sum 540 is determined between image component $I_1$ and the color component values corresponding to the decompressed set of pixels generated by first 2×2 up sample filter 538 and interpolation filter 539. A second 2×2 up sample filter 542 interposes a pixel of zero value between each adjacent pair of pixels generated by sum 540. An interpolation filter 543 assigns to the zero-value pixel a pixel value that includes an average of the values of the adjacent pixels, or a previous assigned value if the zero-value pixel is not between an opposed pair of non-zero-value pixels. Up sample filter 542 and interpolation filter 543 are substantially the same as up sample filter 538 and interpolation filter 539, respectively.

A sum 544 sums the image component $I_0$ with the color component values corresponding to the decompressed set of pixels generated by second 2×2 up sample filter 542 and interpolation filter 543. Sum 544 provides decompressed estimated error 110 corresponding to the estimated error 110 delivered to encoder process 500.

Transform Coding of Motion Vectors

Conventional video compression encoder processes, such as MPEG-1 or MPEG-2, utilize only sparse motion vector fields to represent the motion of significantly larger pixel arrays of a regular size and configuration. The motion vector fields are sparse in that only one motion vector is used to represent the motion of a pixel array having dimensions of, for example, 16×16 pixels. The sparse motion vector fields, together with transform encoding of underlying images or pixels by, for example, discrete cosine transform (DCT) encoding, provide conventional video compression encoding.

In contrast, video compression encoding process 64 (FIG. 3) utilizes dense motion vector fields in which motion vectors are determined for all, or virtually all, pixels of an object. Such dense motion vector fields significantly improve the accuracy with which motion between corresponding pixels is represented. Although the increased accuracy can significantly reduce the errors associated with conventional sparse motion vector field representations, the additional information included in dense motion vector fields represent an increase in the amount of information representing a video sequence. In accordance with this invention, therefore, dense motion vector fields are themselves compressed or encoded to improve the compression ratio provided by this invention.

Figure 21:
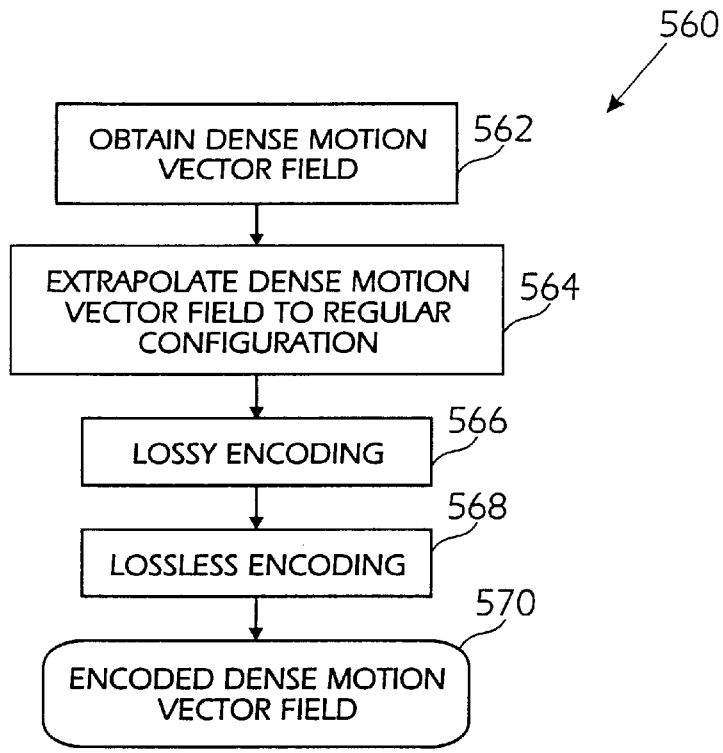
FIG. 21 is a functional block diagram of a motion vector encoding process according to this invention.

FIG. 21 is a functional block diagram of a motion vector encoding process 560 for encoding or compressing motion vector fields and, preferably, dense motion vector fields such as those generated in accordance with dense motion transformation 96 of FIG. 3. It will be appreciated that such dense motion vector fields from a selected object typically will have greater continuity or "smoothness" than the underlying pixels corresponding to the object. As a result, compression or encoding of the dense motion vector fields will attain a greater compression ratio than would compression or encoding of the underlying pixels.

Function block 562 indicates that a dense motion vector field is obtained for an object or a portion of an object in accordance with, for example, the processes of function block 96 described with reference to FIG. 3. Accordingly, the dense motion vector field will correspond to an object or other image portion of arbitrary configuration or size.

Function block 564 indicates that the configuration of the dense motion vector field is extrapolated to a regular, preferably rectangular, configuration to facilitate encoding or compression. Preferably, the dense motion vector field configuration is extrapolated to a regular configuration by precompression extrapolation method 400 described with reference to FIGS. 17A and 17B. It will be appreciated that conventional extrapolation methods, such as a mirror image method, could alternatively be utilized.

Function block 566 indicates that the dense motion vector field with its extrapolated regular configuration is encoded or compressed according to conventional encoding transformations such as, for example, discrete cosine transformation (DCT) or lattice or other wavelet compression, the former of which is preferred.

Function block 568 indicates that the encoded dense motion vector field is further compressed or encoded by a conventional lossless still image compression method such as entropy encoding to form an encoded dense motion vector field 570. Such a still image compression method is described with reference to function block 114 of FIG. 3.

Compression of Quantized Objects from Previous Video Frames

Referring to FIG. 3A, video compression encoder process 64 uses quantized prior object 126 determined with reference to a prior frame N-1 to encode a corresponding object in a next successive frame N. As a consequence, encoder process 64 requires that quantized prior object 126 be stored in an accessible memory buffer. With conventional video display resolutions, such a memory buffer would require a capacity of at least one-half megabyte to store the quantized prior object 126 for a single video frame. Higher resolution display formats would require correspondingly larger memory buffers.

Figure 22:
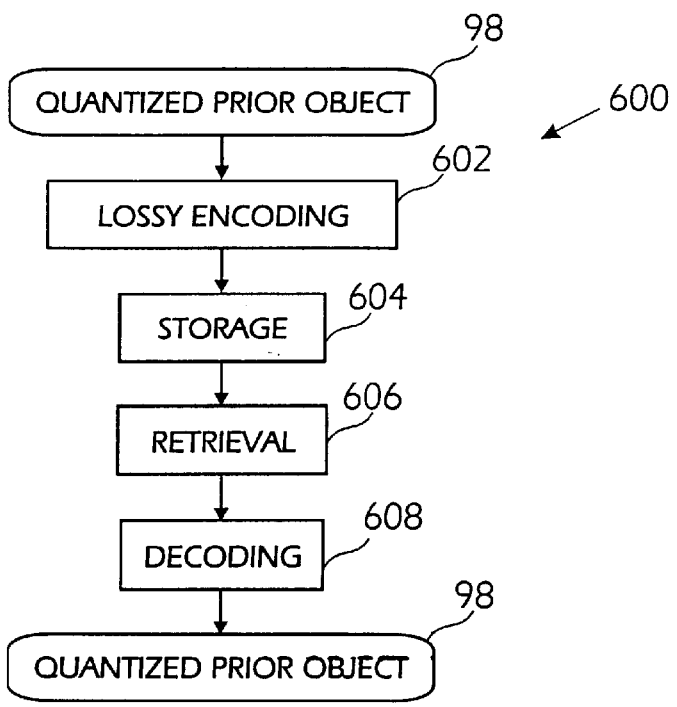
FIG. 22 is a functional block diagram of an alternative quantized object encoder-decoder process.

FIG. 22 is a functional block diagram of a quantized object encoder-decoder (codec) process 600 that compresses and selectively decompresses quantized prior objects 126 to reduce the required capacity of a quantized object memory buffer.

Function block 602 indicates that each quantized object 126 in an image frame is encoded on a block-by-block manner by a lossy encoding or compression method such as discrete cosine transform (DCT) encoding or lattice sub-band or other wavelet compression. As shown in FIG. 21, lossy encoded information can undergo additional lossless encoding. Alternatively, lossless encoding alone can be used.

Function block 604 indicates that the encoded or compressed quantized objects are stored in a memory buffer (not shown).

Function block 606 indicates that encoded quantized objects are retrieved from the memory buffer in anticipation of processing a corresponding object in a next successive video frame.

Function block 608 indicates that the encoded quantized object is inverse encoded by, for example, DCT or wavelet decoding according to the encoding processes employed with respect to function block 602.

Codec process 600 allows the capacity of the corresponding memory buffer to be reduced by up to about 80%, depending upon the overall video compression ratio and the desired quality of the resultant video. Moreover, it will be appreciated that codec process 600 is similarly applicable to the decoder process corresponding to video compression encoder process 64.

Video Compression Decoder Process Overview

Video compression encoder process 64 of FIG. 3 provides encoded or compressed representations of video signals corresponding to video sequences of multiple image frames. The compressed representations include object masks 66, feature points 68, affine transform coefficients 104, and compressed error data 116 from encoder process 64 and compressed master objects 136 from encoder process 130. These compressed representations facilitate storage or transmission of video information, and are capable of achieving compression ratios of up to 300 percent greater than those achievable by conventional video compression methods such as MPEG-2.

It will be appreciated, however, that retrieving such compressed video information from data storage or receiving transmission of the video information requires that it be decoded or decompressed to reconstruct the original video signal so that it can be rendered by a display device such as video display device 52 (FIGS. 2A and 2B). As with conventional encoding processes such as MPEG-1, MPEG-2, and H.26X, the decompression or decoding of the video information is substantially the inverse of the process by which the original video signal is encoded or compressed.

Figure 23A:
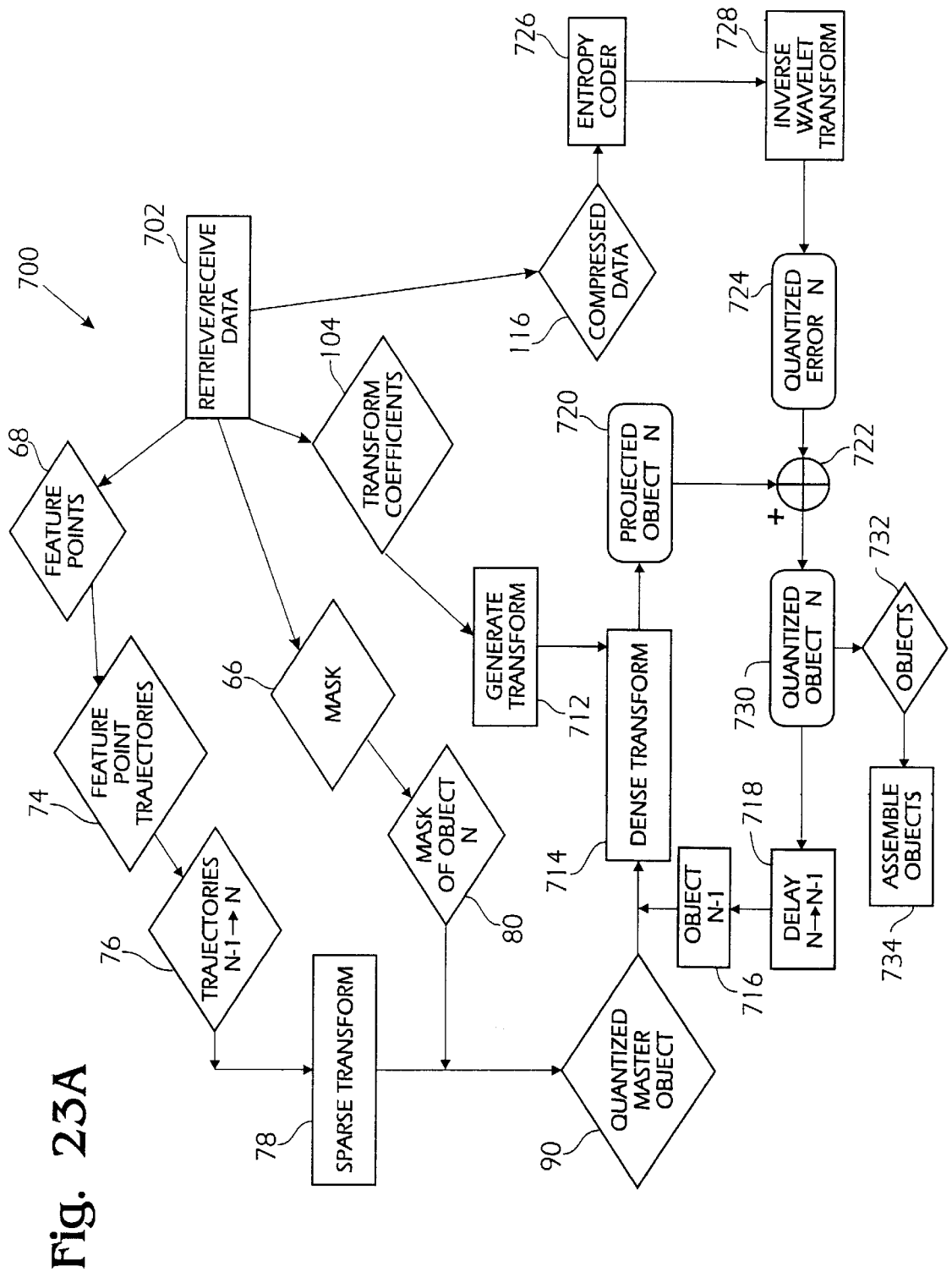
FIG. 23A is a generalized functional block diagram of a video compression decoder process matched to the encoder process of FIG. 3.

FIG. 23A is a functional block diagram of a video compression decoder process 700 for decompressing video information generated by video compression encoder process 64 of FIG. 3. For purposes of consistency with the description of encoder process 64, decoder process 700 is described with reference to FIGS. 2A and 2B. Decoder process 700 retrieves from memory or receives as a transmission encoded video information that includes object masks 66, feature points 68, compressed master objects 136, affine transform coefficients 104, and compressed error data 116.

Decoder process 700 performs operations that are the inverse of those of encoder process 64 (FIG. 3). Accordingly, each of the above-described preferred operations of encoder process 64 having a decoding counterpart would similarly be inversed.

Function block 702 indicates that masks 66, feature points 68, transform coefficients 104, and compressed error data 116 are retrieved from memory or received as a transmission for processing by decoder process 700.

FIG. 23B is a functional block diagram of a master object decoder process 704 for decoding or decompressing compressed master object 136. Function block 706 indicates that compressed master object data 136 are entropy decoded by the inverse of the conventional lossless entropy encoding method in function block 134 of FIG. 3B. Function block 708 indicates that the entropy decoded master object from function block 706 is decoded according to an inverse of the conventional lossy wavelet encoding process used in function block 132 of FIG. 3B.

Function block 712 indicates that dense motion transformations, preferably multi-dimensional affine transformations, are generated from affine coefficients 104. Preferably, affine coefficients 104 are quantized in accordance with transformation method 350 (FIG. 12), and the affine transformations are generated from the quantized affine coefficients by performing the inverse of the operations described with reference to function block 362 (FIG. 12).

Function block 714 indicates that a quantized form of an object 716 in a prior frame N−1 (e.g., rectangular solid object 56a in image frame 54a) provided via a timing delay 718 is transformed by the dense motion transformation to provide a predicted form of the object 720 in a current frame N (e.g., rectangular solid object 56b in image frame 54b).

Function block 722 indicates that for image frame N, predicted current object 720 is added to a quantized error 724 generated from compressed error data 116. In particular, function block 726 indicates that compressed error data 116 is decoded by an inverse process to that of compression process 114 (FIG. 3A). In the preferred embodiment, function blocks 114 and 726 are based upon a conventional lossless still image compression method such as entropy encoding.

Function block 728 indicates that the entropy decoded error data from function block 726 is further decompressed or decoded by a conventional lossy still image compression method corresponding to that utilized in function block 112 (FIG. 3A). In the preferred embodiment, the decompression or decoding of function block 728 is by a lattice subband or other wavelet process or a discrete cosine transform (DCT) process.

Function block 722 provides quantized object 730 for frame N as the sum of predicted object 720 and quantized error 724, representing a reconstructed or decompressed object 732 that is delivered to function block 718 for reconstruction of the object in subsequent frames.

Function block 734 indicates that quantized object 732 is assembled with other objects of a current image frame N to form a decompressed video signal.

Simplified Chain Encoding

Masks, objects, sprites, and other graphical features, commonly are represented by their contours. As shown in and explained with reference to FIG. 5A, for example, rectangular solid object 56a is bounded by an object perimeter or contour 142. A conventional process of encoding or compressing contours is referred to as chain encoding.

Figure 24A:
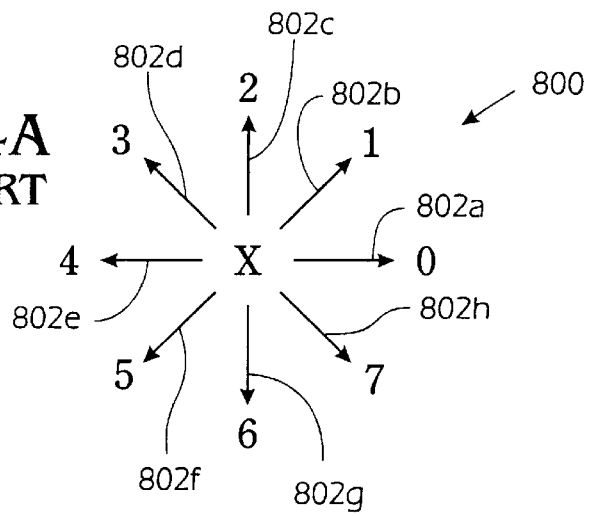
FIG. 24A is a diagrammatic representation of a conventional chain code format.

FIG. 24A shows a conventional eight-point chain code 800 from which contours on a conventional rectalinear pixel array are defined. Based upon a current pixel location X, a next successive pixel location in the contour extends in one of directions 802a–802h. The chain code value for the next successive pixel is the numeric value corresponding to the particular direction 802. As examples, the right, horizontal direction 802a corresponds to the chain code value O, and the downward, vertical direction 802g corresponds to the chain code value 6. Any continuous contour can be described from eight-point chain code 800.

Figure 24B:
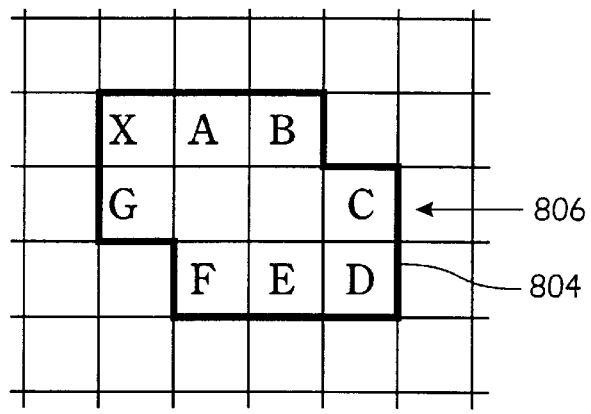
FIG. 24B is a simplified representation of an exemplary contour for processing with the chain code format of FIG. 24A.

With reference to FIG. 24B, a contour 804 represented by pixels 806 designated X and A–G can be encoded in a conventional manner by the chain code sequence {00764432}. In particular, beginning from pixel x, pixels A and B are positioned in direction 0 relative to respective pixels X and A. Pixel C is positioned in direction 7 relative to pixel B. Remaining pixels D–G are similarly positioned in directions corresponding to the chain code values listed above. In a binary representation, each conventional chain code value is represented by three digital bits.

Figure 25B:
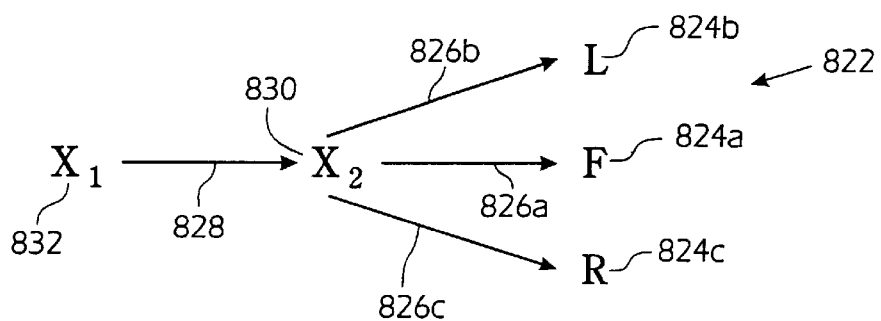
FIG. 25B is a diagrammatic representation of a chain code format of the present invention.
Figure 25A:
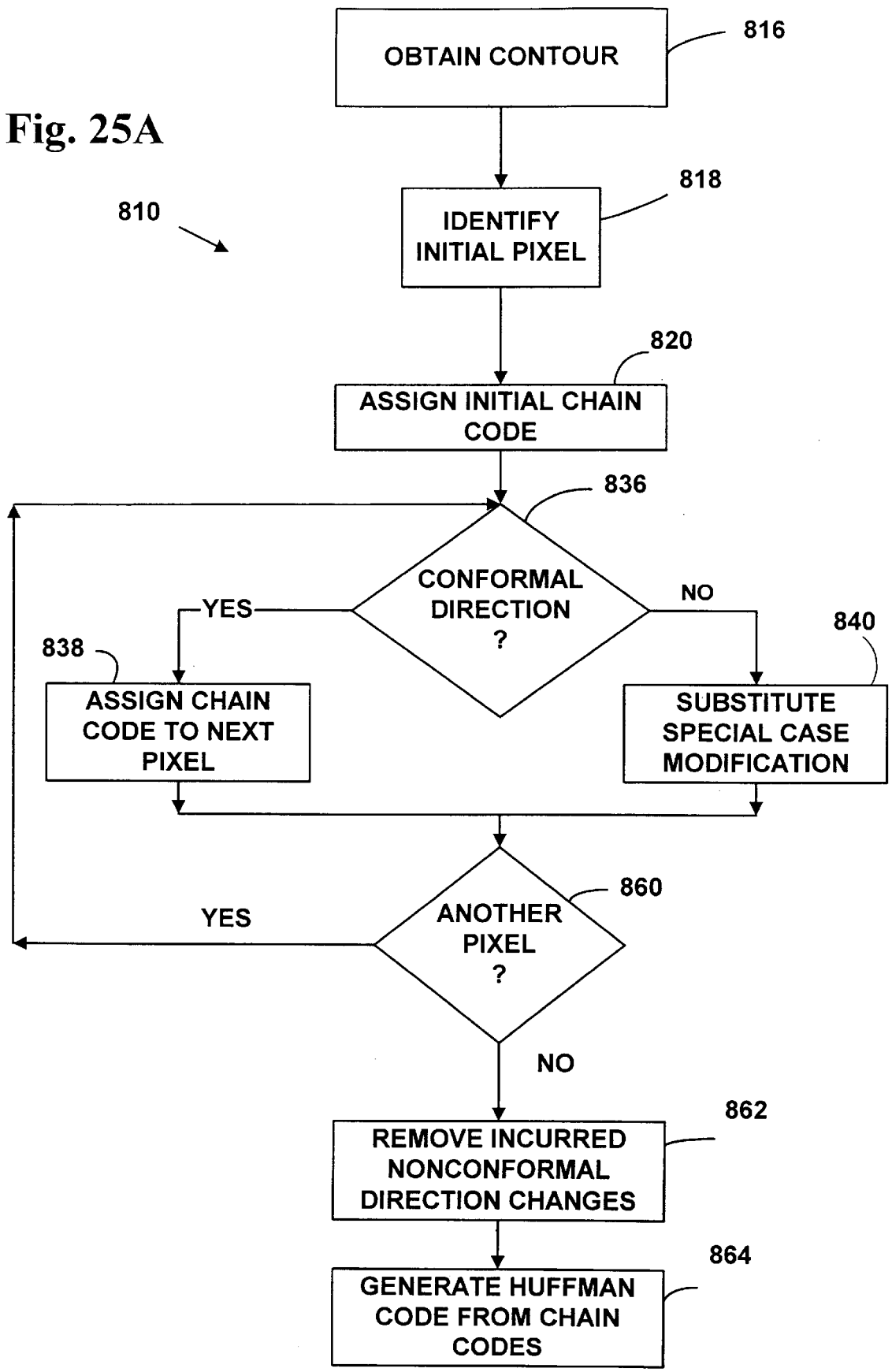
FIG. 25A is a functional block diagram of a chain coding process of this invention.

FIG. 25A is a functional block diagram of a chain code process 810 of the present invention capable of providing contour compression ratios at least about twice those of conventional chain code processes. Chain code process 810 achieves such improved compression ratios by limiting the number of chain codes and defining them relative to the alignment of adjacent pairs of pixels. Based upon experimentation, it has been discovered that the limited chain codes of chain code process 810 directly represent more than 99.8% of pixel alignments of object or mask contours. Special case chain code modifications accommodate the remaining less than 0.2% of pixel alignment as described below in greater detail.

Function block 816 indicates that a contour is obtained for a mask, object, or sprite. The contour may be obtained, for example, by object segmentation process 140 described with reference to FIGS. 4 and 5.

Function block 818 indicates that an initial pixel in the contour is identified. The initial pixel may be identified by common methods such as, for example, a pixel with minimal X-axis and Y-axis coordinate positions.

Function block 820 indicates that a predetermined chain code is assigned to represent the relationship between the initial pixel and the next adjacent pixel in the contour. Preferably, the predetermined chain code is defined to correspond to the forward direction.

FIG. 25B is a diagrammatic representation of a three-point chain code 822 of the present invention. Chain code 822 includes three chain codes 824a, 824b, and 824c that correspond to a forward direction 826a, a leftward direction 826b, and a rightward direction 826c, respectfully. Directions 826a–826c are defined relative to a preceding alignment direction 828 between a current pixel 830 and an adjacent pixel 832 representing the preceding pixel in the chain code.

Preceding alignment direction 828 may extend in any of the directions 802 shown in FIG. 24A, but is shown with a specific orientation (i.e., right, horizontal) for purposes of illustration. Direction 826a is defined, therefore, as the same as direction 828. Directions 826b and 826c differ from direction 828 by leftward and rightward displacements of one pixel.

It has been determined experimentally that slightly more than 50% of chain codes 824 correspond to forward direction 826a, and slightly less than 25% of chain codes 824 correspond to each of directions 826b and 826c.

Function block 836 represents an inquiry as to whether the next adjacent pixel in the contour conforms to one of directions 826. Whenever the next adjacent pixel in the contour conforms to one of directions 826, function block 836 proceeds to function block 838, and otherwise proceeds to function block 840.

Function block 838 indicates that the next adjacent pixel is assigned a chain code 824 corresponding to its direction 826 relative to the direction 828 along which the adjacent preceding pair of pixels are aligned.

Function block 840 indicates that a pixel sequence conforming to one of directions 826 is substituted for the actual nonconformal pixel sequence. Based upon experimentation, it has been determined that such substitutions typically will arise in fewer than 0.2% of pixel sequences in a contour and may be accommodated by one of six special-case modifications.

Figure 25C:
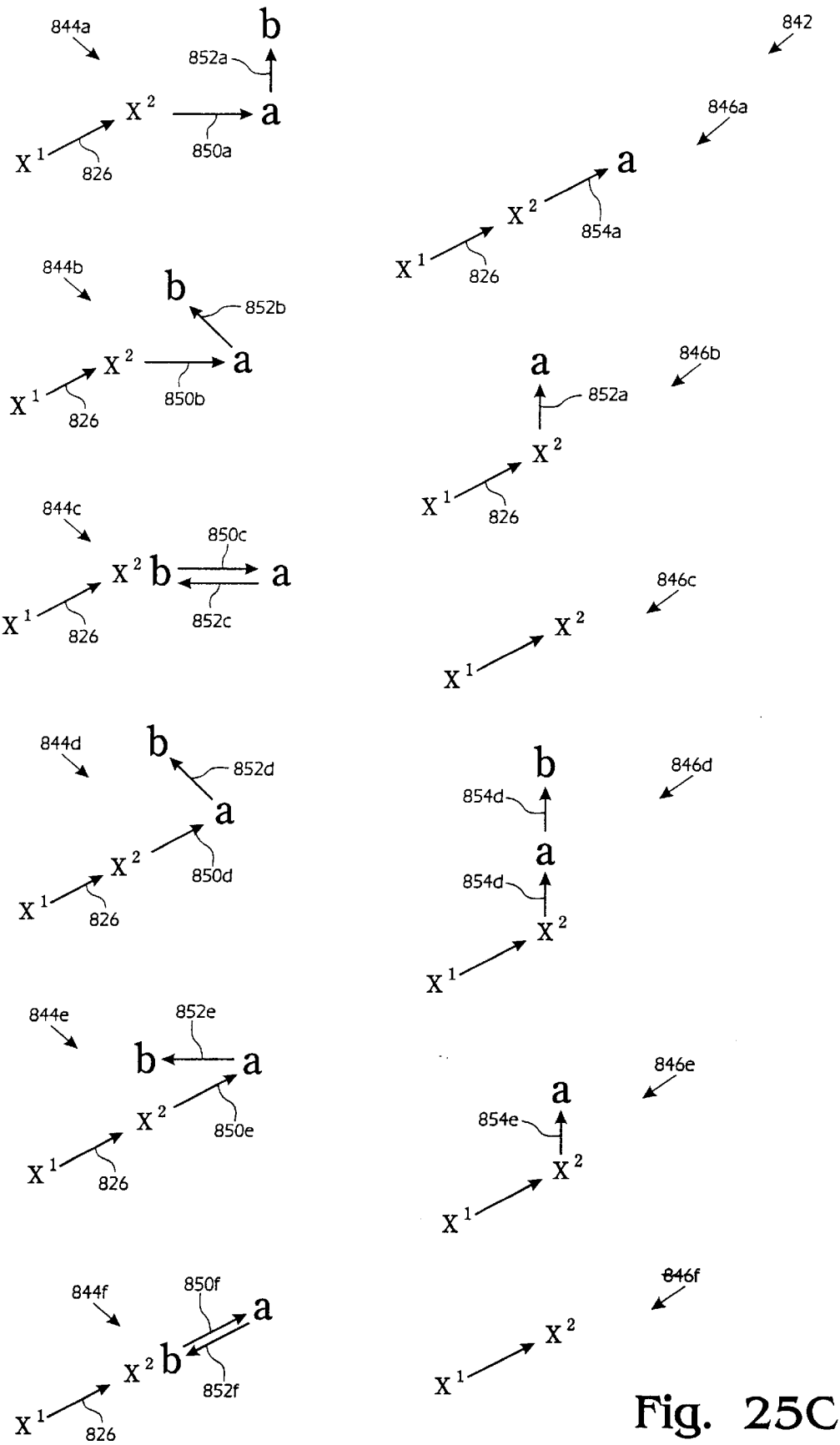
FIG. 25C is a diagrammatic representation of special case chain code modifications used in the process of FIG. 25A.

FIG. 25C is a diagrammatic representation of the six special-case modifications 842 for converting nonconformal pixel sequences to pixel sequences that conform to directions 826. Within each modification 842, a pixel sequence 844 is converted to a pixel sequence 846. In each of pixel sequences 844 of adjacent respective pixels $X^1, X^2, A, B$, the direction between pixels A and B does not conform to one of directions 826 due to the alignment of pixel A relative to the alignment of pixels $X^1$ and $X^2$.

In pixel sequence 844a, initial pixel alignments 850a and 852a represent a nonconformal right-angle direction change. Accordingly, in pixel sequence 846a, pixel A of pixel sequence 844a is omitted, resulting in a pixel direction 854a that conforms to pixel direction 826a. Pixel sequence modifications 842b–842f similarly convert nonconformal pixel sequences 844b–844f to conformal sequences 846b–846f, respectively.

Pixel sequence modifications 842 omit pixels that cause pixel direction alignments that change by 90° or more relative to the alignments of adjacent preceding pixels X1 and X2. One effect is to increase the minimum radius of curvature of a contour representing a right angle to three pixels. Pixel modifications 842 cause, therefore, a minor loss of extremely fine contour detail. According to this invention, however, it has been determined that the loss of such details is acceptable under most viewing conditions.

Function block 860 represents an inquiry as to whether there is another pixel in the contour to be assigned a chain code. Whenever there is another pixel in the contour to be assigned a chain code, function block returns to function block 836, and otherwise proceeds to function block 862.

Function block 862 indicates that nonconformal pixel alignment directions introduced or incurred by the process of function block 840 are removed. In a preferred embodiment, the nonconformal direction changes may be omitted simply by returning to function block 816 and repeating process 810 until no nonconformed pixel sequences remain, which typically is achieved in fewer than 8 iterations. In an alternative embodiment, such incurred nonconformal direction changes may be corrected in "real-time" by checking for and correcting any incurred nonconformal direction changes each time a nonconformal direction change is modified.

Function block 864 indicates that a Huffman code is generated from the resulting simplified chain code. With chain codes 824a–824c corresponding to directions 826A–826C that occur for about 50%, 25% and 25% of pixels in a contour, respective Huffman codes of 0, 11, and 10 are assigned. Such first order Huffman codes allow chain process 810 to represent contours at a bit rate of less than 1.5 bits per pixel in the contour. Such a bitrate represents approximately a 50% compression ratio improvement over conventional chain code processes.

It will be appreciated that higher order Huffman coding can provide higher compression ratios. Higher order Huffman coding includes, for example, assigning predetermined values to preselected sequences of first order Huffman codes.

Sprite Generation

The present invention includes generating sprites for use in connection with encoding determinate motion video (movie). Bitmaps are accreted into bitmap series that comprise a plurality of sequential bitmaps of sequential images from an image source. Accretion is used to overcome the problem of occluded pixels where objects or figures move relative to one another or where one figure occludes another similar to the way a foreground figure occludes the background. For example, when a foreground figure moves and reveals some new background, there is no way to build that new background from a previous bitmap unless the previous bitmap was first enhanced by including in it the pixels that were going to be uncovered in the subsequent bitmap. This method takes an incomplete image of a figure and looks forward in time to find any pixels that belong to the image but are not to be immediately visible. Those pixels are used to create a composite bitmap for the figure. With the composite bitmap, any future view of the figure can be created by distorting the composite bitmap.

The encoding process begins by an operator identifying the figures and the parts of the figures of a current bitmap from a current bitmap series. Feature or distortion points are selected by the operator on the features of the parts about which the parts of the figures move. A current grid of triangles is superimposed onto the parts of the current bitmap. The triangles that constitute the current grid of triangles are formed by connecting adjacent distortion points. The distortion points are the vertices of the triangles. The current location of each triangle on the current bitmap is determined and stored to the storage device. A portion of data of the current bitmap that defines the first image within the current location of each triangle is retained for further use.

A succeeding bitmap that defines a second image of the current bitmap series is received from the image source, and the figures and the parts of the figure are identified by the operator. Next, the current grid of triangles from the current bitmap is superimposed onto the succeeding bitmap. The distortion points of current grid of triangles are realigned to coincide with the features of the corresponding figures on the succeeding bitmap. The realigned distortion points form a succeeding grid of triangles on the succeeding bitmap of the second image. The succeeding location of each triangle on the succeeding bitmap is determined and stored to the storage device. A portion of data of the succeeding bitmap that defines the second image within the succeeding location of each triangle is retained for further use.

The process of determining and storing the current and succeeding locations of each triangle is repeated for the plurality of sequential bitmaps of the current bitmap series. When that process is completed, an average image of each triangle in the current bitmap series is determined from the separately retained data. The average image of each triangle is stored to the storage device.

During playback, the average image of each triangle of the current bitmap series and the current location of each triangle of the current bitmap are retrieved from the storage device. A predicted bitmap is generated by calculating a transformation solution for transforming the average image of each triangle in the current bitmap series to the current location of each triangle of the current bitmap and applying the transformation solution to the average image of each triangle. The predicted bitmap is passed to the monitor for display.

In connection with a playback determinate motion video (video game) in which the images are determined by a controlling program at playback, a sprite bitmap is stored in its entirety on a storage device. The sprite bitmap comprises a plurality of data bits that define a sprite image. The sprite bitmap is displayed on a monitor, and the parts of the sprite are identified by an operator and distortion points are selected for the sprite's parts.

A grid of triangles is superimposed onto the parts of the sprite bitmap. The triangles that constitute the grid of triangles are formed by connecting adjacent distortion points. The distortion points are the vertices of the triangles. The location of each triangle of the sprite bitmap is determined and stored to the storage device.

During playback, a succeeding location of each triangle is received from a controlling program. The sprite bitmap and the succeeding location of each triangle on the sprite bitmap are recalled from the storage device and passed to the display processor. The succeeding location of each triangle is also passed to the display processor.

Figure 26:
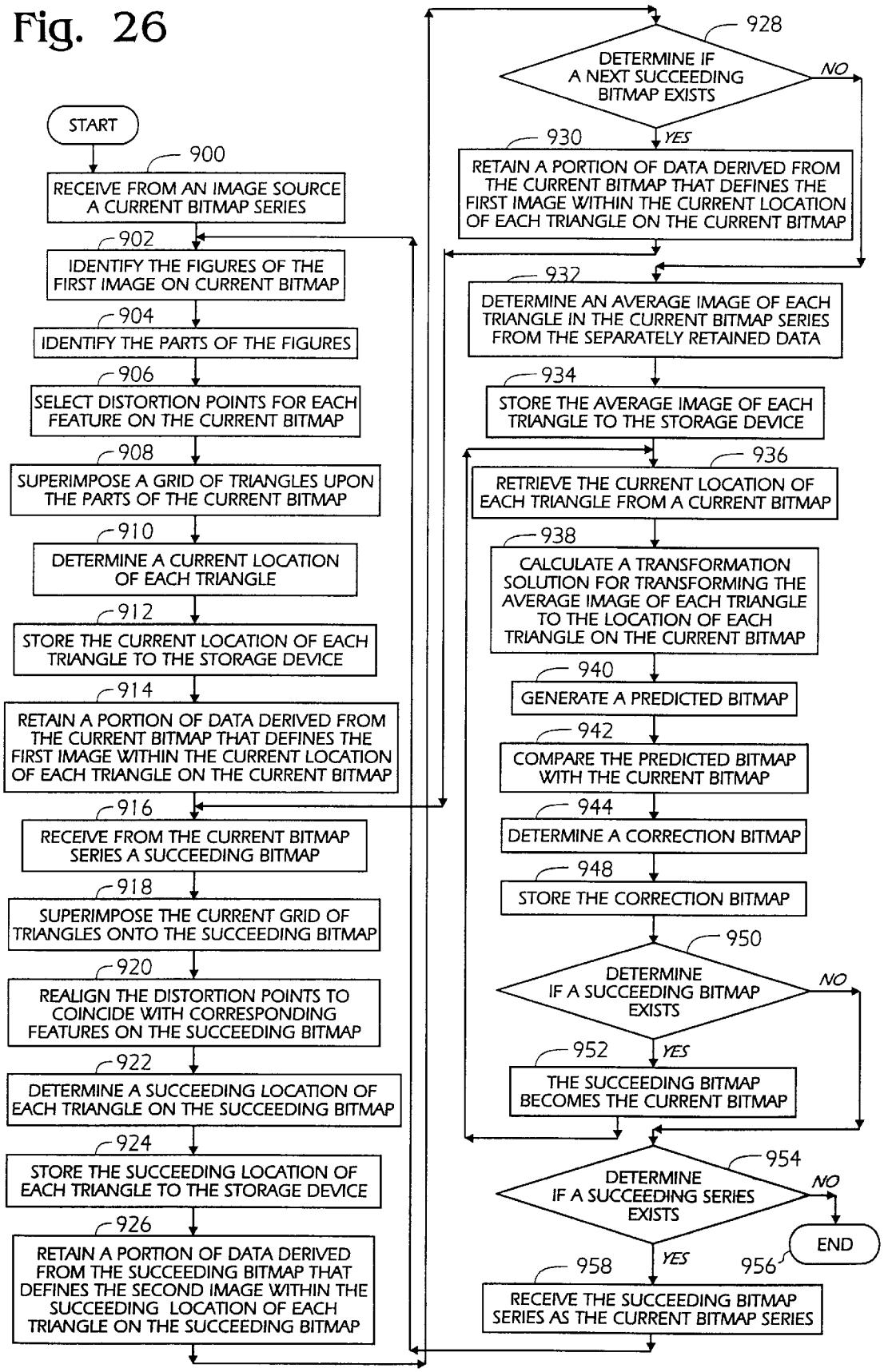
FIG. 26 is a functional block diagram of a sprite generating or encoding process.

A transformation solution is calculated for each triangle on the sprite bitmap. A succeeding bitmap is then generated in the display processor by applying the transformation solution of each triangle derived from the sprite bitmap the defines the sprite image within the location of each triangle. The display processor passes the succeeding sprite bitmap to a monitor for display. This process is repeated for each succeeding location of each triangle requested by the controlling program As shown in FIG. 26, an encoding procedure for a movie motion video begins at step 900 by the CPU 22 receiving from an image source a current bitmap series. The current bitmap series comprises a plurality of sequential bitmaps of sequential images. The current bitmap series has a current bitmap that comprises a plurality of data bits which define a first image from the image source. The first image comprises at least one figure having at least one part.

Proceeding to step 902, the first image is displayed to the operator on the monitor 28. From the monitor 28, the figures of the first image on the current bitmap are identified by the operator. The parts of the figure on the current bitmap are then identified by the operator at step 904.

Next, at step 906, the operator selects feature or distortion points on the current bitmap. The distortion points are selected so that the distortion points coincide with features on the bitmap where relative movement of a part is likely to occur. It will be understood by those skilled in the art that the figures, the parts of the figures and the distortion points on a bitmap may be identified by the computer system 20 or by assistance from it. It is preferred, however, that the operator identify the figures, the parts of the figures and the distortion points on a bitmap.

Figure 27A:
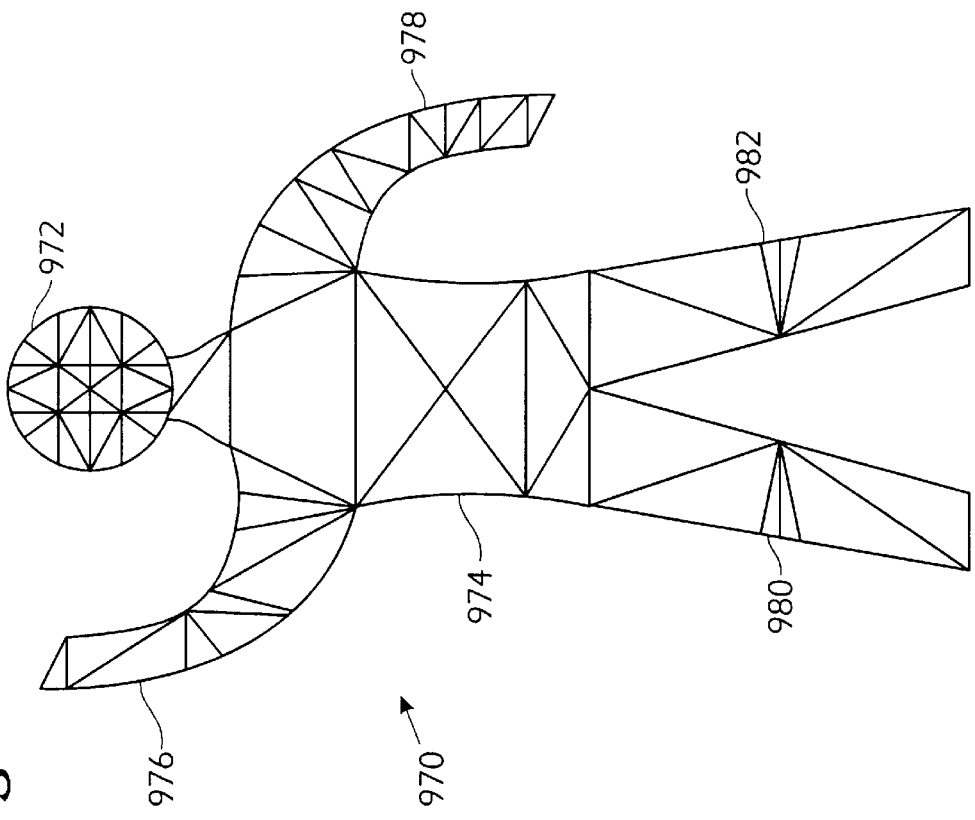
FIGS. 27A and 27B are respective first and second objects defined by bitmaps and showing grids of triangles superimposed over the objects in accordance with the process of FIG. 26.

Proceeding to step 908, a current grid of triangles is superimposed onto the parts of the current bitmap by the computer system 20. With reference to FIG. 27A, the current grid comprises triangles formed by connecting adjacent distortion points. The distortion points form the vertices of the triangles. More specifically, the first image of the current bit map comprises a figure, which is a person 970. The person 970 has six parts corresponding to a head 972, a torso 974, a right arm 976, a left arm 978, right leg 980, and a left leg 982. Distortion points are selected on each part of the person 970 so that the distortion points coincide with features where relative movement of a part is likely to occur. A current grid is superimposed over each part with the triangles of each current grid formed by connecting adjacent distortion points. Thus, the distortion points form the vertices of the triangles.

At step 910, the computer system 20 determines a current location of each triangle on the current bitmap. The current location of each triangle on the current bitmap is defined by the location of the distortion points that form the vertices of the triangle. At step 912, the current location of each triangle is stored to the storage device. A portion of data derived from the current bitmap that defines the first image within the current location of each triangle is retained at step 914.

Next, at step 916, a succeeding bitmap of the current bitmap series is received by the CPU 22. The succeeding bitmap comprises a plurality of data bits which define a second image of the current bitmap series. The second image may or may not include figures that correspond to the figures in the first image. For the following steps, the second image is assumed to have figures that corresponds to the figures in the first image. At step 918, the current grid of triangles is superimposed onto the succeeding bitmap. The second image with the superimposed triangular grid is displayed to the operator on the monitor 28.

Figure 27B:
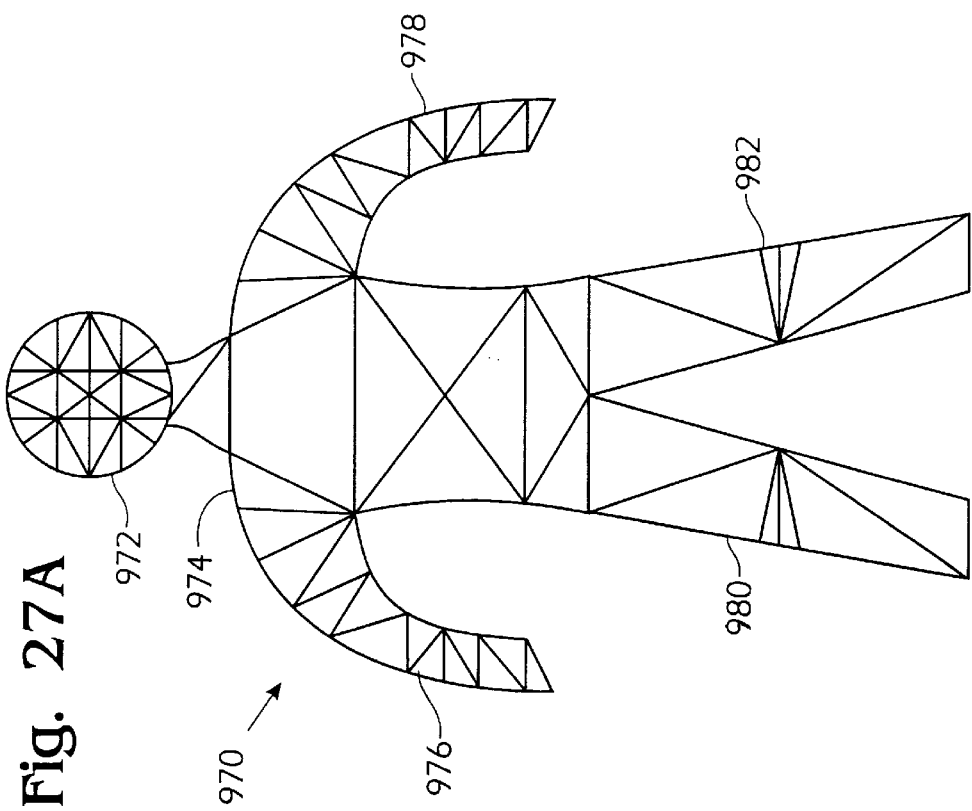

At step 920, the distortion points are realigned to coincide with corresponding features on the succeeding bitmap by the operator with assistance from the computer system 20. The computer system 20 realigns the distortion using block matching. Any mistakes are corrected by the operator. With reference to FIG. 27B, the realigned distortion points form a succeeding grid of triangles. The realigned distortion points are the vertices of the triangles. More specifically, the second image of the succeeding bitmap of person 200 includes head 972, torso 974, right arm 976, left arm 978, right leg 980, and left leg 982. In the second image, however, the right arm 980 is raised. The current grids of the first image have been superimposed over each part and their distortion points realigned to coincide with corresponding features on the second image. The realigned distortion points define succeeding grids of triangles. The succeeding grids comprise triangles formed by connecting the realigned distortion points. Thus, the realigned distortion point form the vertices of the triangles of the succeeding grids.

Proceeding to step 922, a succeeding location of each triangle of the succeeding bitmap is determined by the computer system 20. At step 924, the succeeding location of each triangle on the succeeding bitmap is stored the storage device. A portion of data derived from the succeeding bitmap that defines the second image within the succeeding location of each triangle is retained at step 926. Step 926 leads to decisional step 928 where it is determined if a next succeeding bitmap exists.

If a next succeeding bitmap exists, the YES branch of decisional step 928 leads to step 930 where the succeeding bitmap becomes the current bitmap. Step 930 returns to step 916 where a succeeding bitmap of the current bitmap series is received by the CPU 22. If a next succeeding bitmap does not exist, the NO branch of decisional step 928 leads to step 932 where an average image for each triangle of the current bitmap series is determined. The average image is the median value of the pixels of a triangle. Use of the average image makes the process less susceptible to degeneration. Proceeding to step 934, the average image of each triangle of the current bitmap series is stored to the storage device.

Next, at step 936, the current location of each triangle on the current bitmap is retrieved from the storage device. An affine transformation solution for transforming the average image of each triangle to the current location of the triangle on the current bitmap is then calculated by the computer system 20 at step 938. At step 940, a predicted bitmap is generated by applying the transformation solution of the average image of each triangle to the current location of each triangle on the current bitmap. The predicted bitmap is compared with the current bitmap at step 942.

At step 944 a correction bitmap is generated. The corrected bitmap comprises the data bits of the current bitmap that were not accurately predicted by the predicted bitmap. The corrected bitmap is stored to the storage device at step 948. Step 948 leads to decisional step 950 where it is determined if a succeeding bitmap exists.

If a succeeding bitmap exists, the YES branch of decisional step 950 leads to step 952 where the succeeding bitmap becomes the current bitmap. Step 952 returns to step 936 where the current location of each triangle on the current bitmap is retrieved from the storage device. If a next succeeding bitmap does not exist, the NO branch of decisional step 950 leads to decisional step 954 where it is determined if a succeeding bitmap series exists. If a succeeding bitmap series does not exist, encoding is finished and the NO branch of decisional step 954 leads to step 956. If a succeeding bitmap series exists, the YES branch of decisional step 954 leads to step 958 where the CPU 22 receives the succeeding bitmap series as the current bitmap series. Step 956 returns to step 902 where the figures of the first image of the current bitmap series is identified by the operator.

The process of FIG. 26 describes generation of a sprite or master object 90 for use by encoder process 64 of FIG. 3. The process of utilizing master object 90 to form predicted objects 102 is described with reference to FIG. 28.

Figure 28:
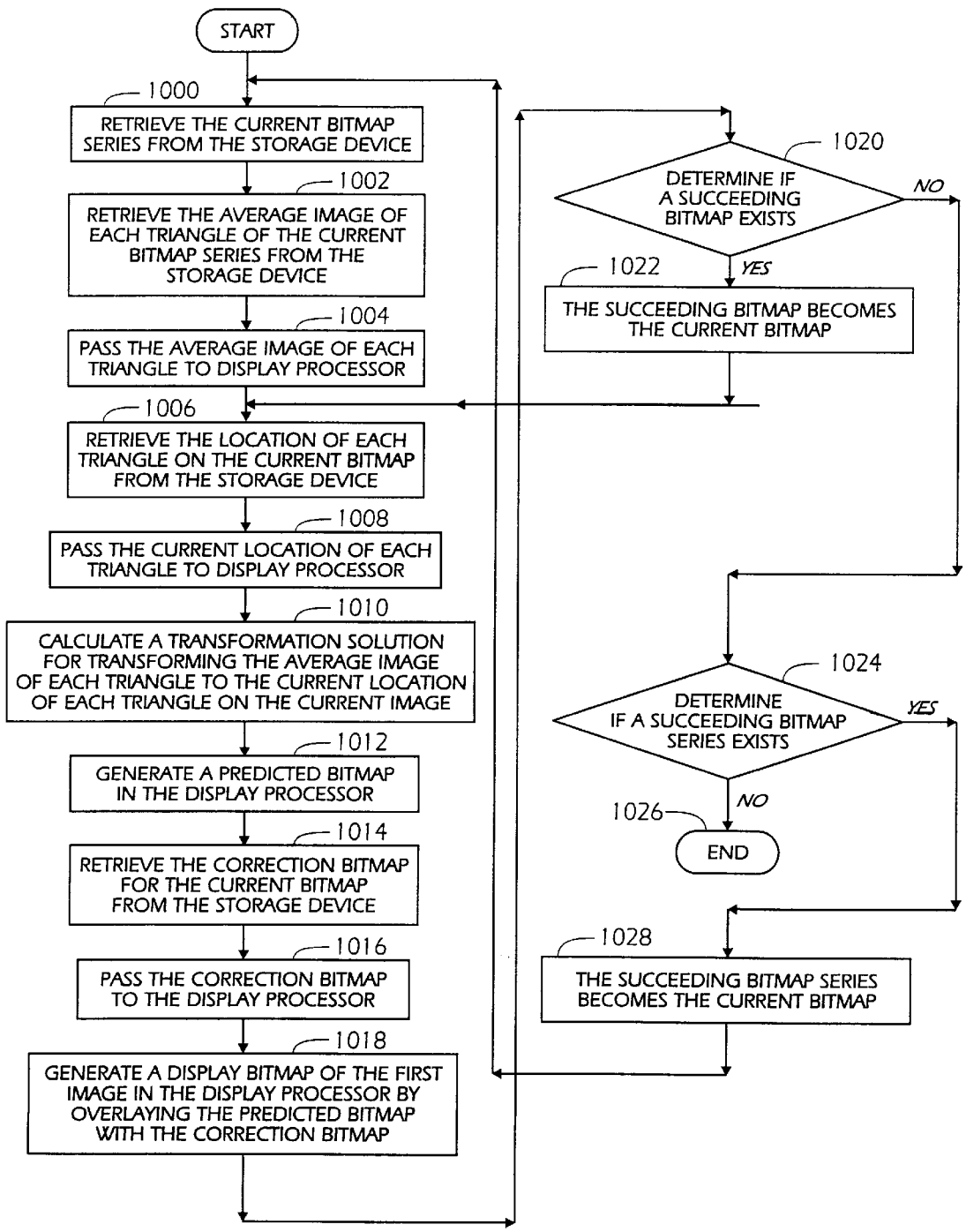
FIG. 28 is a functional block diagram of a sprite decoding process corresponding to the encoding process of FIG. 26.

As shown in FIG. 28, the procedure begins at step 1000 with a current bitmap series being retrieved. The current bitmap series comprises a plurality of sequential bitmaps of sequential images. The current bitmap series has a current bitmap that comprises a plurality of data bits which define a first image from the image source. The first image comprises at least one figure having at least one part.

At step 1002, the average image of each triangle of the current bitmap series is retrieved from the storage device. The average image of each triangle is then passed to a display processor (not shown) at step 704. It will be appreciated that computer system 20 (FIG. 1) can optionally include a display processor or other dedicated components for executing for processes of this invention. Proceeding to step 1006, the current location of each triangle on the current bitmap is retrieved from the storage device. The current location of each triangle is passed to the display processor at step 1008.

Next, an affine transformation solution for transforming the average image of each triangle to the current location of each triangle on the current bitmap is calculated by the display processor at step 1010. Proceeding to step 1012, a predicted bitmap is generated by the display processor by applying the transformation solution for transforming the average image of each triangle to the current location of each triangle on the current bitmap.

At step 1014, a correction bitmap for the current bitmap is retrieved from the storage device. The correction bitmap is passed to the display processor at step 716. A display bitmap is then generated in the display processor by overlaying the predicted bitmap with the correction bitmap. The display processor retains a copy of the average image of each triangle and passes the display bitmap to the frame buffer for display on the monitor.

Next, at decisional step 1020, it is determined if a succeeding bitmap of the current bitmap series exists. If a succeeding bitmap of the current bitmap series exists, the YES branch of decisional step 1020 leads to step 1022. At step 1022, the succeeding bitmap becomes the current bitmap. Step 1022 returns to step 1006 where the location of each triangle on the current bitmap is retrieved from the storage device.

Returning to decisional step 1020, if a succeeding bitmap of the current bitmap series does not exist, the NO branch of decisional step 1020 leads to decisional step 1024. At decisional step 1024, it is determined if a succeeding bitmap series exists. If a succeeding bitmap series does not exist, then the process is finished and the NO branch of decisional step 1024 leads to step 1026. If a succeeding bitmap series exists, the YES branch of decisional step 1024 leads to step 1028. At step 1028, the succeeding bitmap series becomes the current bitmap series. Step 1028 returns to step 1000.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit of the following claims and equivalents thereto.

We claim:

1. A method for encoding a sequence of video image frames, each frame including at least one arbitrarily shaped video object, the method comprising:

encoding video objects in each frame separately, where at least one of the objects is segmented from the frames in the video sequence and includes a mask for each of the frames defining the shape of the object in each frame, a composite bitmap formed from a combination of pixels of the object in the frames such that the composite bitmap includes portions of the object that are not visible in some of the frames, and trajectories for each frame describing a motion transform of the object for each frame used to transform the composite bitmap to a position in corresponding frames of the video sequence;

computing error signals for the object, including:
a) dividing the object into blocks of pixel locations, where at least some of the blocks overlap a boundary of the object;
b) for each block, computing motion parameters that estimate the motion between a current frame in the sequence and a previously reconstructed object from a previous frame, where the motion parameters are computed separately from the trajectories,
c) computing a predicted object for the current frame by applying the motion parameters for each block to the previously reconstructed object;
d) transforming the mask associated with the object for the previous frame to the current frame using the trajectories associated with the current frame;
e) intersecting the transformed mask with the mask for the current frame to identify at least a first portion of the current mask that is outside the transformed mask, the pixels in the first portion being represented by the composite bitmap;
f) computing a difference between an original object for the current frame and the predicted object to compute error signals for the object;
g) compressing the error signals for the object for the current frame; and
h) repeating steps a–g to compute error signals associated with the object for frames in the video sequence;

wherein a compressed version of the object for the video sequence includes a single composite bitmap for the sequence, trajectories for the frames in the sequence, error signals for the frames in the sequence, and motion parameters for each block of the object for the frames in the sequence.

2. The method of claim 1 wherein the motion parameters comprise affine transform coefficients for each block derived by:
   computing a motion vector for each pixel in the object that falls within the block;
   selecting motion vectors with an error below a predetermined threshold; and
   from the selected motion vectors, deriving the affine transform coefficients.

3. The method of claim 1 wherein the previously reconstructed object is a quantized object and further including:
   transform coding the error signals for each block in the object using a lossy, block based transform coding method;
   performing an inverse transform coding of the transform coded error signals for each block to compute quantized error signals for each block;
   adding the quantized error signals for each block with the predicted object to compute the quantized object, where the quantized object is then used as the previously reconstructed object for the next frame in the video sequence.

4. The method of claim 3 wherein error signals for the blocks that overlap the boundary of the object are extrapolated such that error signals for the block have a rectangular configuration before performing the transform coding step.

5. A computer readable medium having instructions for performing the steps of claim 1.

6. A method for decoding a sequence of video image frames, each frame including at least one arbitrarily shaped video object, the method comprising:
   decoding video objects in each frame separately, where at least one of the objects is segmented from each of the frames in the video sequence and includes a mask for each of the frames defining the shape of the object in each frame, a composite bitmap formed from a combination of pixels of the object in the frames such that the composite bit map includes portions of the object that are not visible in some of the frames, and trajectories for each frame describing a motion transform of the object for each frame used to transform the composite bitmap to a position in corresponding frames of the video sequence;
   decoding error signals for the object for a current frame, including:
   a) for each block, decoding motion parameters that estimate the motion between a current frame in the sequence and a previously reconstructed object from a previous frame, where the motion parameters are computed separately from the trajectories,
   b) computing a predicted object for the current frame by applying the motion parameters for each block to the previously reconstructed object;
   c) transforming the mask associated with the object for the previous frame to the current frame using the trajectories associated with the current frame;
   e) intersecting the transformed mask with the mask for the current frame to identify at least a first portion of the current mask that is outside the transformed mask, the pixels in the first portion being represented by the composite bitmap;
   f) decompressing the error signals for the object for the current frame;
   g) adding the decompressed error signals for the object for the current frame to the predicted object to compute a reconstructed object for the current frame; and h) repeating steps a–g to reconstruct the object for frames in the video sequence
   wherein a compressed version of the object for the video sequence includes a single composite bitmap for the sequence, trajectories for the frames in the sequence, error signals for the frames in the sequence, and motion parameters for each block of the object for the frames in the sequence.

7. A computer readable medium having instructions for performing the steps of claim 6.

8. A computer readable medium having a data structure representing a compressed sequence of video frames comprising:
   separately encoded video objects, where at least one of the objects is segmented from each of the frames in the video sequence and includes a mask for each of the frames defining the shape of the object in each frame, a composite bitmap formed from a combination of pixels of the object in each frame such that the composite bitmap includes portions of the object that are not visible in some of the frames, and trajectories for each frame describing a motion transform of the object for each frame used to transform the composite bitmap to a position in corresponding frames of the video sequence;
   encoded error signals for the object in each of the frames, where the error signals are arranged in an array of blocks of pixel locations that overlap the object in the corresponding frame, the encoded error signals including:
   for each block, motion parameters that estimate the motion between a current frame in the sequence and a previously reconstructed object from a previous frame, where the motion parameters are computed separately from the trajectories;
   for each block, error signals determined by:
       computing a predicted object for a frame by applying the motion parameters for each block to the previously reconstructed object;
       computing a difference between an original object for the current frame and the predicted object to compute error signals for the object;
       compressing the error signals for each block by using a lossy, transform coding method;
   wherein a compressed version of the object for the video sequence includes a single composite bitmap for the sequence, trajectories for each of the frames in the sequence, masks for each of the frames, compressed blocks of error signals for the frames in the sequence, and motion parameters for each block of the object for the frames in the sequence; and
   wherein the masks and corresponding trajectories are used to indicate which portion of the object is to be reconstructed from the composite bitmap for a selected frame by transforming a mask of a previously reconstructed frame and intersecting the transformed mask with a mask for the selected frame to identify whether a portion of the mask for the selected frame is outside the transformed mask, the pixels in the portion outside the transformed mask being represented by the composite bitmap.

* * * * *

UNITED STATES PATENT AND TRADEMARK OFFICE
CERTIFICATE OF CORRECTION

PATENT NO. : 5,933,535
DATED : August 3, 1999
INVENTOR(S) : Lee et al.

Page 1 of 1

It is certified that error appears in the above-identified patent and that said Letters Patent is hereby corrected as shown below:

Column 17,
Line 33, error reads "substraction" should read -- subtraction --

Column 20,
Line 26, error reads "$y_2'$, $y_2'$" should read -- $x_2'$, $y_2'$ --

Column 33,
Line 21, error reads "the" should read -- that --

Column 37,
Line 57, error reads "e)" should read -- d) --
Line 62, error reads "f)" should read -- e) --
Line 64, error reads "g)" should read -- f) --

Column 38,
Line 1, error reads "h)" should read -- g) -- and error reads "steps a-g" should read -- steps a-f --

Signed and Sealed this

Thirtieth Day of October, 2001

Attest:

NICHOLAS P. GODICI
Attesting Officer
Acting Director of the United States Patent and Trademark Office